US010743130B2

(12) United States Patent
Jain et al.

(10) Patent No.: US 10,743,130 B2
(45) Date of Patent: Aug. 11, 2020

(54) SYSTEMS AND METHODS FOR LOCATION-BASED APPLICATION MANAGEMENT

(71) Applicant: RISE SOFTWARE, LLC, Wilmington, DE (US)

(72) Inventors: Sidharth Jain, Chicago, IL (US); Prasan Kale, Chicago, IL (US)

(73) Assignee: Rise Buildings, Inc., Chicago, IL (US)

(*) Notice: Subject to any disclaimer, the term of this patent is extended or adjusted under 35 U.S.C. 154(b) by 48 days.

(21) Appl. No.: 16/143,086

(22) Filed: Sep. 26, 2018

(65) Prior Publication Data
US 2019/0098446 A1    Mar. 28, 2019

Related U.S. Application Data

(60) Provisional application No. 62/563,301, filed on Sep. 26, 2017.

(51) Int. Cl.
| | |
|---|---|
| *H04W 4/021* | (2018.01) |
| *H04W 4/02* | (2018.01) |
| *H04W 4/029* | (2018.01) |
| *G06F 16/903* | (2019.01) |
| *H04L 29/08* | (2006.01) |
| *H04W 4/50* | (2018.01) |
| *G06F 16/00* | (2019.01) |

(52) U.S. Cl.
CPC ........... *H04W 4/021* (2013.01); *G06F 16/00* (2019.01); *G06F 16/903* (2019.01); *H04L 67/34* (2013.01); *H04W 4/025* (2013.01); *H04W 4/029* (2018.02); *H04W 4/50* (2018.02)

(58) Field of Classification Search
None
See application file for complete search history.

(56) References Cited

U.S. PATENT DOCUMENTS

| | | |
|---|---|---|
| 9,479,630 B1 | 10/2016 | Chowdhury |
| 2010/0198814 A1 | 8/2010 | Petersen et al. |
| 2011/0137997 A1 | 6/2011 | Stewart |
| 2011/0201358 A1 | 8/2011 | Karaoguz et al. |
| 2013/0157736 A1* | 6/2013 | Smith .............. G06Q 30/0207 463/7 |

(Continued)

OTHER PUBLICATIONS

International Search Report and Written Opinion in corresponding International Application Na PCT/US2018/052941, dated Nov. 30, 2018 (8 pages).

*Primary Examiner* — Brian Whipple
(74) *Attorney, Agent, or Firm* — Benesch, Friedlander, Coplan & Aronoff LLP

(57) ABSTRACT

Some aspects of the present disclosure relate to systems and methods for location-based application management. A method can include receiving, at a server, location information for a user device located at a given point of interest (POI). The method can include identifying, at the server, a given application usage state from a plurality of application usage states stored in a database based on the location information. The method can include retrieving, at the server, application configuration information based on the identified given application usage state. The method can include causing the user device to set a usability of an application executing on the user device based on the application configuration information while the user device is located at the given POI.

20 Claims, 52 Drawing Sheets

(56) References Cited

U.S. PATENT DOCUMENTS

| | | | |
|---|---|---|---|
| 2013/0231139 A1 | 9/2013 | Zhang | |
| 2013/0291079 A1* | 10/2013 | Lowe | G06F 21/00 |
| | | | 726/7 |
| 2014/0066101 A1 | 3/2014 | Lyman et al. | |
| 2014/0094192 A1* | 4/2014 | Annett | H04W 4/029 |
| | | | 455/456.3 |
| 2014/0208397 A1* | 7/2014 | Peterson | G06F 21/51 |
| | | | 726/4 |
| 2015/0073709 A1 | 3/2015 | Huang | |
| 2015/0140994 A1 | 5/2015 | Partheesh et al. | |
| 2016/0054865 A1* | 2/2016 | Kerr | G06F 16/29 |
| | | | 715/739 |
| 2016/0359986 A1* | 12/2016 | Jones | G06F 16/29 |

* cited by examiner

```
┌─────────────────────────────────────────────┐
│ ₀₀₀AT&T 🔶        9:46 PM          ✻ 47% ▭  │
│  ◀          Existing Reservation      🏠    │
├─────────────────────────────────────────────┤
│          Total Records : 10            🔍   │
├─────────────────────────────────────────────┤
│        09:45 PM – Sep 18th, 2017       1001 │
│ ☐☐☐   Demo Non cal...                Booked │
│ ☐☐☐   item 04                               │
│ ☐☐☐   Date : Sep 18th, 2017                 │
│        Time : 9:45PM→10:00PM                │
├─────────────────────────────────────────────┤
│        09:36 PM – Sep 18th, 2017       1001 │
│ 📅    Party Room              Pending Approval│
│        Date : Sep 22ⁿᵈ, 2017                │
│        Time : 05:30 PM→06:45 PM         ②   │
│        Price : $ 162                        │
├─────────────────────────────────────────────┤
│        07:10 PM – Sep 18th, 2017       1001 │
│ 📅    Party Room                     Booked │
│        Date : Sep 22ⁿᵈ, 2017                │
│        Time : 07:00 PM →07:15 PM        ②   │
│        Price : $ 112                        │
├─────────────────────────────────────────────┤
│        05:12 PM – Sep 14th, 2017       1001 │
│ 📅    Party Room              Pending Approval│
│        Date : Sep 30th, 2017                │
│        Time : 07:00 PM→07:15 PM             │
│        Price : $ 113                        │
├─────────────────────────────────────────────┤
│        04:14 PM – Sep 14th, 2017       1001 │
│ 📅    Calendar amenity        Pending Approval│
│        Date : Sep 28th, 2017                │
│        Time : 07:00 PM→07:15 PM             │
│        Price : $ 7                          │
├─────────────────────────────────────────────┤
│        04:14 PM – Sep 14th, 2017       1001 │
│ 📅    Party Room                     Booked │
│        Date : Sep 29th, 2017                │
└─────────────────────────────────────────────┘
```

Reservations

| Unit Number | Service ID | Start Date | End Date | Select |
|---|---|---|---|---|

1-25 of 439

| Service Number | Amenity Name | Unit Number | Date-From-To | Time-From-To | Created Date | Created By | Status | Action | Last Comment | Add a Comment | Unrea |
|---|---|---|---|---|---|---|---|---|---|---|---|
| DC87AEC | Dhana Test Amenity | 9755 | Jun 17th, 2017 | Jun 17th, 2017 | May 25th, 2017 | Jon Gonds | Pending | Confirm / Reject | Confirming | | 0 |
| 8673833 | Dhana Test Amenity | 108 | Jun 17th, 2017 | Jun 17th, 2017 | May 22nd, 2017 | Savio kalyana | Denied | Denied | Please check | | 1 |
| 6574F41 | | 9755 | Jun 9th, 2017 | Jun 9th, 2017 | May 18th, 2017 | Jon Gonds | Confirmed | Cancel | Please cancel | | 2 |
| 6574C47 | Dhana0518 Amenity | D111 | May 24th, 2017 | May 24th, 2017 | May 18th, 2017 | Dhanaresmayeleven dhanaresmayeleven | Confirmed | Cancel | Please cancel | | 3 |
| 6574BF3 | Dhana0518 Amenity | D111 | May 20th, 2017 | May 20th, 2017 | May 18th, 2017 | Dhanaresmayeleven dhanaresmayeleven | Cancelled | Cancelled | | | 4 |
| 6574503 | Dhana Test Amenity | | Jun 15th, 2017 | Jun 15th, 2017 | May 18th, 2017 | Jon Gonds | Confirmed | Cancel | What is the status on th... | | 3 |
| 3410FA8 | Dhana Test Amenity | 9755 | Jun 8th, 2017 | Jun 8th, 2017 | May 9th, 2017 | Jon Gonds | Confirmed | Cancel | Please approve | | 0 |
| 3410B51 | | 9755 | May 28th, 2017 | May 28th, 2017 | May 9th, 2017 | Jon Gonds | Cancelled | Cancelled | We will place chairs | | 0 |
| 3410EE4 | | 9755 | Jun 15th, 2017 | Jun 15th, 2017 | May 9th, 2017 | Jon Gonds | Cancelled | Cancelled | Anything else? | | 1 |
| 3295AAA | Dhana Test Amenity | 108 | Jan 5th, 2017 | Jan 5th, 2017 | Jan 5th, 2017 | Savio kalyana | Cancelled | Cancelled | | | 1 |
| 011976F | Dhana Test | 9755 | Jan 26th, 2017 | Jan 26th, 2017 | Jan 25th, 2017 | Suman verma | Cancelled | Cancelled | | | 0 |
| 517P9A9 | Dhana Test Amenity | 9755 | Jan 19th, 2017 | Jan 19th, 2017 | Jan 11th, 2017 | Jon Gonds | Cancelled | Cancelled | | | 0 |
| C62AB83 | Cabin | D999 | Jan 24th, 2017 | Jan 24th, 2017 | Jan 24th, 2017 | Dhana Test | Cancelled | Cancelled | | | 0 |

Reservations

| Unit Number | Service ID | Start Date | End Date | Select | | |
|---|---|---|---|---|---|---|

1-25 of 439

| Service Number | Amenity Name | Unit Number | Date-From-To | Time-From-To | Created Date | Created By | Status | Action | Last Comment | Add a Comment | Unread |
|---|---|---|---|---|---|---|---|---|---|---|---|
| 3410EE4 | | 9755 | Jun 15th, 2017 | Jun 15th, 2017 | May 9th, 2017 | Jon Gonds | Cancelled | | Anything else? | | 1 |
| 3410B51 | | 9755 | May 28th, 2017 | May 28th, 2017 | May 9th, 2017 | Jon Gonds | Cancelled | | We will place chairs | | 0 |
| 3410FA8 | | 9755 | Jun 8th, 2017 | Jun 8th, 2017 | May 9th, 2017 | Jon Gonds | Confirmed | Cancel | Please approve | | 3 |
| 657455E | | 9755 | Jun 15th, 2017 | Jun 15th, 2017 | May 18th, 2017 | Jon Gonds | Confirmed | Cancel | What is the status on th... | | 3 |
| 6574C47 | | D111 | May 24th, 2017 | May 24th, 2017 | May 18th, 2017 | Dhanaresmayeleven dhanaresmayeleven | Confirmed | Cancel | Please cancel | | 2 |
| 6574F41 | | 9755 | Jun 19th, 2017 | Jun 9th, 2017 | May 18th, 2017 | Jon Gonds | Confirmed | Cancel | Please cancel | | 1 |
| 8673833 | | 108 | Jun 17th, 2017 | Jun 17th, 2017 | May 22nd, 2017 | Savio kalyana | Denied | | Please check | | 0 |
| DC87AEC | | 9755 | Jun 17th, 2017 | Jun 17th, 2017 | May 25th, 2017 | Jon Gonds | Pending | Confirm / Reject | Confirming | | 0 |
| 6574BF3 | Dhana518 Amenity | D111 | May 20th, 2017 | May 20th, 2017 | May 18th, 2017 | Dhanaresmayeleven dhanaresmayeleven | Cancelled | | | | 4 |
| 3295AAA | Dhana Test Amenity | 108 | Jun 5th, 2017 | Jun 5th, 2017 | Jun 5th, 2017 | Savio kalyana | Cancelled | | | | 1 |
| 011976F | Dhana Test | 9755 | Jan 26th, 2017 | Jan 26th, 2017 | Jan 25th, 2017 | Suman verma | Cancelled | | | | 0 |
| 517P9A9 | Dhana Test Amenity | 9755 | Jan 19th, 2017 | Jan 19th, 2017 | Jan 11th, 2017 | Jon Gonds | Cancelled | | | | 0 |
| C62AB83 | Cabin | D999 | Jan 24th, 2017 | Jan 24th, 2017 | Jan 24th, 2017 | Dhana Test | Cancelled | | | | 0 |

SYSTEMS AND METHODS FOR LOCATION-BASED APPLICATION MANAGEMENT

CROSS-REFERENCE TO RELATED APPLICATION

This application claims the benefit of U.S. Provisional Patent Application No. 62/563,301, filed on Sep. 26, 2017, entitled "SYSTEM AND METHOD FOR PROPERTY MANAGEMENT," the contents of which are incorporated herein by reference.

TECHNICAL FIELD

This disclosure generally relates to systems and methods for location-based application management.

BACKGROUND

Methodologies are currently available for delivering information and/or services to mobile devices based on location information. Typically, such devices are configured with a location system such as a global positioning systems (GPS) that acts as a source for location information. A typical example of a location-based service is the use of location information to present customized advertising to a user based on the user's location. Based on the user's location being proximate to a location (e.g., a store), the user's mobile device displays advertising information for the location.

SUMMARY

In an example, a method can include receiving, at a server, location information for a user device located at a given point of interest (POI). The method can include identifying, at the server, a given application usage state from a plurality of application usage states stored in a database based on the location information. The method can include retrieving, at the server, application configuration information from the database based on the identified given application usage state. The method can include causing the user device to set a usability of an application executing on the user device based on the application configuration information while the user device is located at the given POI.

In another example, a system can include memory to store machine readable instructions and data. The data can include an application usage database. The system can include a processor that can access the memory and execute the instructions. The instructions can include a device location component that can be configured to monitor for location information for a user device associated with a user. The instructions can include an application control component that can be configured to evaluate the location information for the user device and virtual boundary information for a given virtual boundary associated with a given POI to determine whether the user device is located within the given virtual boundary. The application control component can be configured to query the application usage database for application usage information for an application executing on the user device in response to determining that the user device is located within the given virtual boundary. The application control component can be configured to cause the user device to set a usability of the application executing on the user device based on the application usage information.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description make reference to the following drawings.

FIGS. 29-44A-C are exemplary screenshots of staff screens displayed by an application module on a staff device.

FIGS. 45-50 are exemplary screenshots of web portal screens displayed by an application module on a portal device.

DETAILED DESCRIPTION

Figure 1:
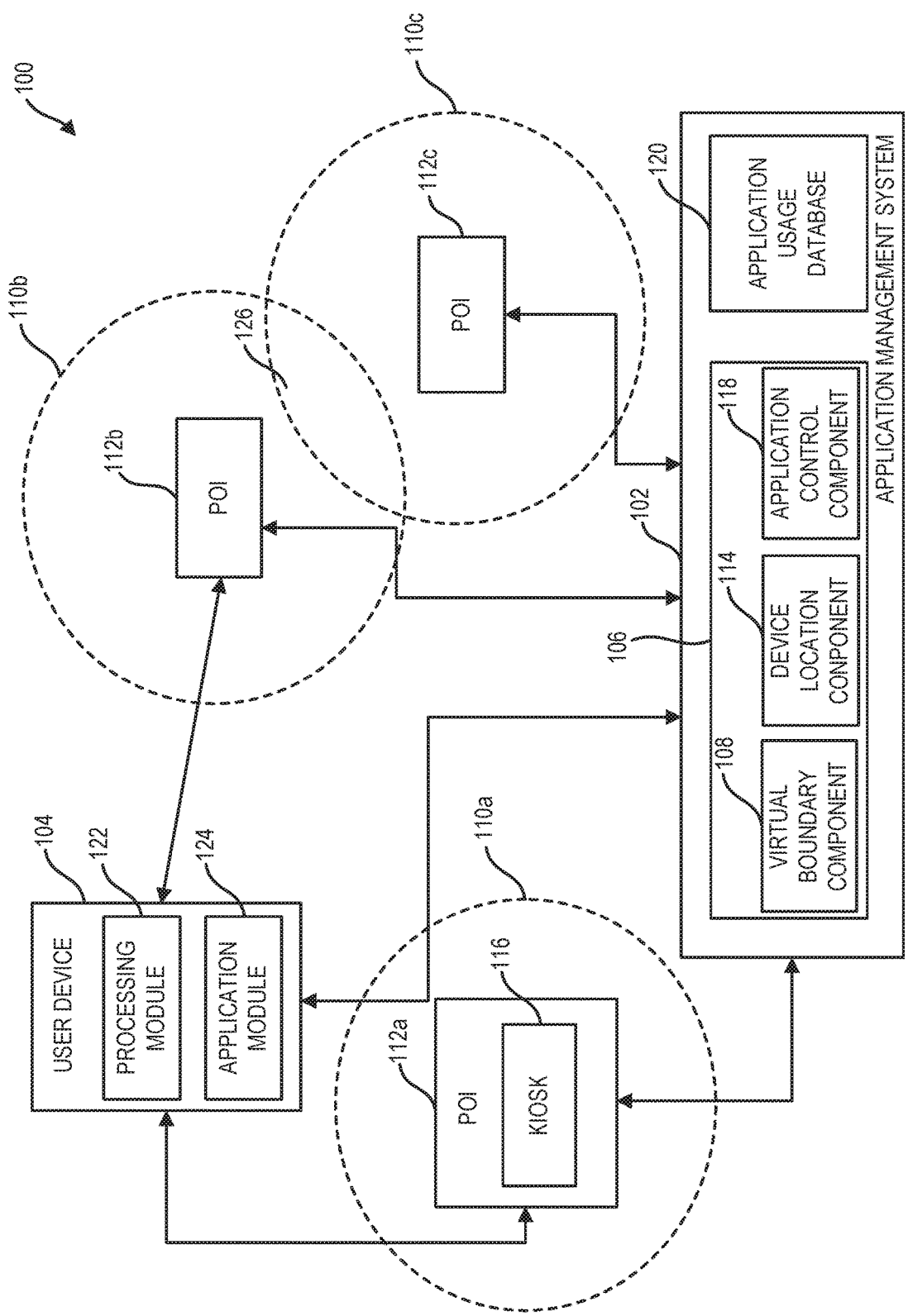
FIG. 1 illustrates an exemplary environment with an application management system.

In some examples, the present disclosure relates to systems and methods for location-based application management. The systems and method described herein can be used to manage one or more functions, features, and/or information provided by an application executing on a user device based on location information. According to the systems and methods described herein, the applications usability can be dynamically updated based on the device's location information, which, in some examples, can include actual device location information, and, in other examples, can include relative device location information. In some examples, the systems and methods described herein can be configured monitor each virtual boundary associated with a given point of interest (POI) for the user device. In some examples, the virtual boundary can correspond to a beacon range associated with a beacon device. In these examples, the beacon device can correspond to a Bluetooth low energy (BLE) device. In these examples, the systems and methods described herein can be configured to monitor for beacon information. In the examples described herein the beacon device can communicate with a user device over one or more communication protocols. The one or more communication protocols can include, but not limited to, iBeacon, Eddystone, AltBeacon, GeoBeacon, etc.

In some examples, the systems and methods described herein can be configured to detect (or determine) when the user device is located within the virtual boundary by evaluating current location information for the user device and virtual boundary information characterizing the virtual boundary. In response detecting (or determining) that the user device is located within the virtual boundary, the systems and methods described herein can be configured to communicate with the application on the user device to set the applications usability. Examples of application usability setting, according to the systems and methods described herein, can include, but not limited to, functionality, features, type of information that can be provided by the application, when the information can be provided by the application, how the information can be provided by the application, how the information can be displayed by the application on a display, and a combination thereof. The applications usability can be set and maintained for the given POI while the user device is located within the virtual boundary (or within the given POI).

In other examples, the systems and methods described herein can be configured to determine the location information for the user device based on the beacon information associated with the beacon device. When the user device is positioned within beacon range of the beacon device, the user device can be configured to receive the beacon information. Upon receiving the beacon information, in some examples, the application executing on the device can be configured to use signals strength beacon measurements for localization of the user device. The application can be configured to generate the location information for the device based on the beacon information. In other examples, upon receiving the beacon information, the application can be configured to provide the beacon information to an application management system. The application management system can be configured to evaluate the beacon information to determine the location information for the user device. As such, the beacon information can be used to provide a relative location for the user device.

In some aspects of the present disclosure, the systems and methods described herein can be configured to periodically receive the location information for the user device. In some examples, the user device can be configured to provide the location information. In other examples, a service provider (e.g., a cellular provider) for the user device can provide the location information. In even further examples, the location information for the user device can be provided by a kiosk, an access control system or an access control device, as described herein. In these examples, the location information can provide a relative location for the user device. In these examples, the kiosk, the access control system and/or the access control device can be configured with the beacon device. In some examples, the location information for the user device can be provided by a third-party system (e.g., a location-based service provider).

In some examples, upon detecting (or determining) that the user device is no longer located within the virtual boundary (or the given POI), the systems and methods described herein can update the applications usability. In some examples, the user device can be located at a first POI and the applications usability can be set to a given usage state according to the systems and methods described herein. Upon detecting (or determining) that the user device is located at a second POI, the systems and methods described herein can update the applications usability to another usage state different that the given usage state. In some examples, as described herein, the applications usability can be set to a default usage state. The default usage state can correspond to an application state of the application, for example, wherein the one or more previously provided features, functions, and/or data is no longer accessible (or available for use) by the user. The systems and methods can be configured to remove (or delete) all or a portion of the data that had been provided to the user device in response to detecting (or determining) that the user device is no longer located within the virtual boundary, at the given POI, or a failure in communication with the user device.

In some examples, the systems and methods described herein can be configured to set the applications usability to the default usage state in response to not receiving (or being provided) the location information for the user device for a given period of time. In other examples, the systems and methods described herein can be configured to set the applications usability to the default usage state in response to not receiving (or being provided) a usage message for the given period of time. In some examples, the usage message can be generated by the service provider or the third-party system. In other examples, the usage message can be generated by the user device. The usage message can provide an indication that a current application usage state should be maintained.

In some examples, the systems and methods described herein can be configured to maintain an application usage database that can include a plurality of application usage states for the application executing on the user device. The system and methods described herein can be configured to retrieve application usage information for a given application usage state of the plurality of application usage states based on the location information. Each application usage state stored in the application usage database can be associated with a corresponding POI. The systems and methods described herein can set the application to the given application usage state based on the application usage information. According to the systems and methods described herein, the applications usability can be set to a particular application usage state of the plurality of application usage states upon determining (or detecting) that the user device is located within the virtual boundary associated with the given POI. In other examples, the applications usability can be set to the particular application usage state for the given POI until the systems and methods described herein determine (or detect) that the user device is located at another POI based on the location information. The systems and methods described herein can be configured to maintain the set application usage state while the user device is located at the given POI to provide the user with an application having features, functions and/or data that are suitable for the given POI. Accordingly, the systems and methods described herein can be configured to tailor the applications usability according to the given POI based on the location information (e.g., actual location information or relative information for the user device). The technical advantages of the systems and methods described herein will be better understood and become more readily apparent according to the following examples described herein.

In other examples, the present disclosure relates to systems and methods for property management. The systems and methods described herein can be utilized to provide property management to a building (e.g., a residential building, an office building, etc.). Residents, tenants and/or visitors of the building can utilize the systems and methods described herein to communicate with staff, and possible others (e.g., guests of the building). In an example, a system and a method as described herein for managing property can include an application module that can be configured to provide a two-way communication between a resident/tenant device and a staff device. The application module can be configured to scan a package label and provide a push notification to the resident/tenant device upon scanning of the package, and/or can be configured to provide a visitor pass.

FIG. 1 illustrates an exemplary environment 100 with an application management system (AMS) 102. The AMS 102 can be configured to manage one or more functions, features, and/or data provided by an application executing on a user device 104 based on location information associated with the user device 104. Additionally, or alternatively, the AMS 102 can be configured to manage a type of information that can be provided by the application, when the information can be provided by the application, how the information can be provided the application, how the information can be displayed by the application, and a combination thereof. As such, the AMS 102 can be configured to manage a usability of the application executing on the user device 104 based on the location information. The term "application" as used herein can refer to any type of software application (e.g., a mobile application, a tablet application, a desktop-based application, etc.) that can have one or more parameters (or settings) that can be updated (or changed). The one or more application parameters can include, but not limited to, functionality parameters (e.g., actions that the application can take, not take, and/or provide), feature parameters (e.g., appearance of graphical components of the application on the display), data parameters (e.g., the type of information that can be provided by the application, when the information can be provided by the application, how the information can be provided by the application, how the information can be displayed by the application on a display), and a combination thereof.

In the examples described herein, the location information for the user device 104 can include, but not limited to, a device identifier (ID) for the user device 104, geographical coordinates (e.g., latitude and longitude coordinates), global positioning system (GPS) coordinates, relative coordinates, actual coordinates, an Internet Protocol (IP) address for the user device 104, an access point address (e.g., router), a unique n-byte Bluetooth device address, wherein n is integer greater than one, received signal strength indicator (RSSI) measurements, a universal unique identifier (UUID) associated with a beacon device, major and minor values, a beacon ID, and a combination thereof.

Figure 2:
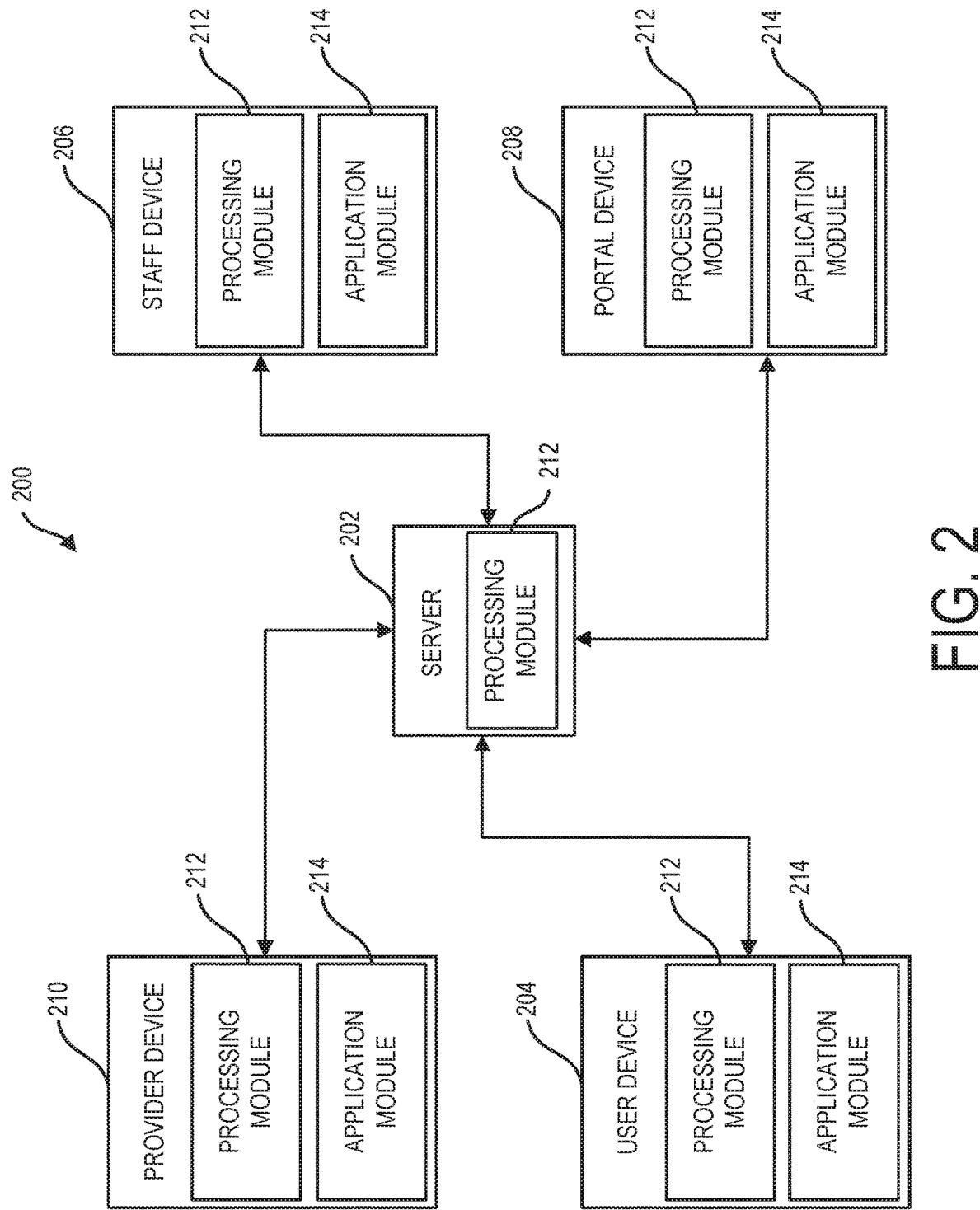
FIG. 2 illustrates an exemplary environment for providing property management.

The user device 104 can be implemented as one of a portable device such as a laptop, a tablet, a smartwatch, a cellular device, a personal digital assistant (PDA), and the like. In some examples, the application can correspond to a user-side application and can include a plurality of user screens (e.g., user screens, as illustrated in FIGS. 9-28). In some examples, the user device 104 can correspond to any device disclosed herein (e.g., a user device 204 and a staff device 206, as illustrated in FIG. 2). In other examples, the application can correspond to a staff-side application and can include a plurality of staff screens (e.g., staff screens, as illustrated in FIGS. 29-44A-C). As will be further described herein, the AMS 102 can be configured to set the application's usability based on the location information. In some examples, the AMS 102 can be configured to manage usability of the application on the user device 104 based on the device's location information and/or additional information to provide a user with suitable features, functions, and/or information, as will be further described in detail herein.

In some examples, the AMS 102 can be implemented as a software application hosted by a service provider's infrastructure, e.g. using a cloud or on-premise hosting provider, with one or more devices which are physically located at the same location or that communicate with each other from various locations. In some examples, the AMS 102 can be implemented in the cloud, e.g., as hosted by an AMAZON Web Service (AWS), or other secure cloud services platform, which can provide compute power, database storage, location calculation/determination, content delivery and/or other functionality of the AMS 102. In other examples, the AMS 102 can correspond to a server or form part of a server.

The AMS 102 can include a processing module 106. The processing module 106 can be configured to execute instructions comprising a plurality of software components stored in memory of the AMS 102. The AMS 102 can include a virtual boundary component 108. The virtual boundary component 108 can be configured to determine a virtual boundary 110a, 110b and 110c (or a geo-fence) for each point of interest (POI) 112a, 112b and 112c. FIG. 1 illustrates an example wherein the virtual boundary component 108 determines three virtual boundaries 110-110c, in other examples, the virtual boundary component 108 can be configured to determine only a single virtual boundary for a given POI (e.g., the geographical POI 112a). As such, the examples described herein should not be construed and/or limited by FIG. 1. In some examples, any number of virtual boundaries can be determined by the virtual boundary component 108 for any number of POIs.

In some examples, the virtual boundary 110a, 110b, and 110c can correspond to a beacon range associated with a given beacon device at or near a corresponding POI 112a, 112b and 112c. In these examples, the virtual boundary component 108 can be configured to set the beacon range for the beacon device (e.g., the virtual boundary component 108 can be configured to set the beacon range to a few meters such as 2-3 meters up to 70 meters based on the particular environment, and requirements). In an example, the beacon device can correspond to a BLE beacon device.

In some examples, the virtual boundary component 108 can be configured to set a virtual boundary for each POI 112a, 112b and 112c that is substantially circular, as illustrated in FIG. 1. In other examples, the virtual boundary component 108 can be configured to set a virtual boundary for each POI 112a, 112b and 112c that has any shape including a polygon shape or a non-polygon shape. In some examples, the virtual boundary component 108 can be configured to modify a defined virtual boundary for a given POI by contracting or expanding the defined virtual boundary based on one of properties associated with the user device 104, a type of user of the user device 104, an attribute of the POI, data from a service provider, and a combination thereof. In some examples, an associated virtual boundary can have a substantially similar footprint as the given POI. As such, in some examples, the virtual boundary can have a virtual geographical area that is substantially similar to a physical geographical area of a building.

In a non-limiting example, each POI 112a, 112b and 112c can correspond to one of a building, a business, an attraction site (e.g., an amusement park, a zoo, etc.) a scenic site, a park, a hiking path, and a combination thereof. As used herein the term "building" can include any enclosed structure having outer walls, and at least one room. In some examples, a building can include a commercial building, a residential building, a complex (e.g., an apartment or office complex), an office building, property, and a combination thereof. The commercial, residential, and/or office buildings can have a single floor or multiple floors. The residential building can include any residence from a single-family home to a mid-rise and/or a high-rise building. In some examples, according to the systems and methods described herein, user devices, staff devices and/or provider devices can be configured to communicate to facilitate property management, as illustrated in FIG. 2.

The AMS 102 can include a device location component 114. The device location component 114 can be configured to monitor for the location information and/or user device information, e.g., from the user device 104 or a kiosk 116. In some examples, the user device information can be part of the location information, or vice-versa. In some examples, the device location component 114 can be configured to periodically communicate (e.g., every 20 seconds, every minute, etc.) with the user device 104 to receive (or retrieve) the location information and/or the user device information.

In other examples, the user device 104 can be configured to periodically provide the location information and/or the user device information to the device location component 114. In these examples, the application executing on the user device 104 (e.g., an application module 124), can be configured to generate the location information based on beacon information received from the given beacon device. When the user device 104 is positioned within beacon range of the given beacon device, the user device 104 can be configured to receive the beacon information. The beacon information can include, but not limited to, a unique n-byte Bluetooth device address, wherein n is integer greater than one, an UUID for the given beacon device, major and minor values, and/or a beacon ID, and a combination thereof.

Figure 3:
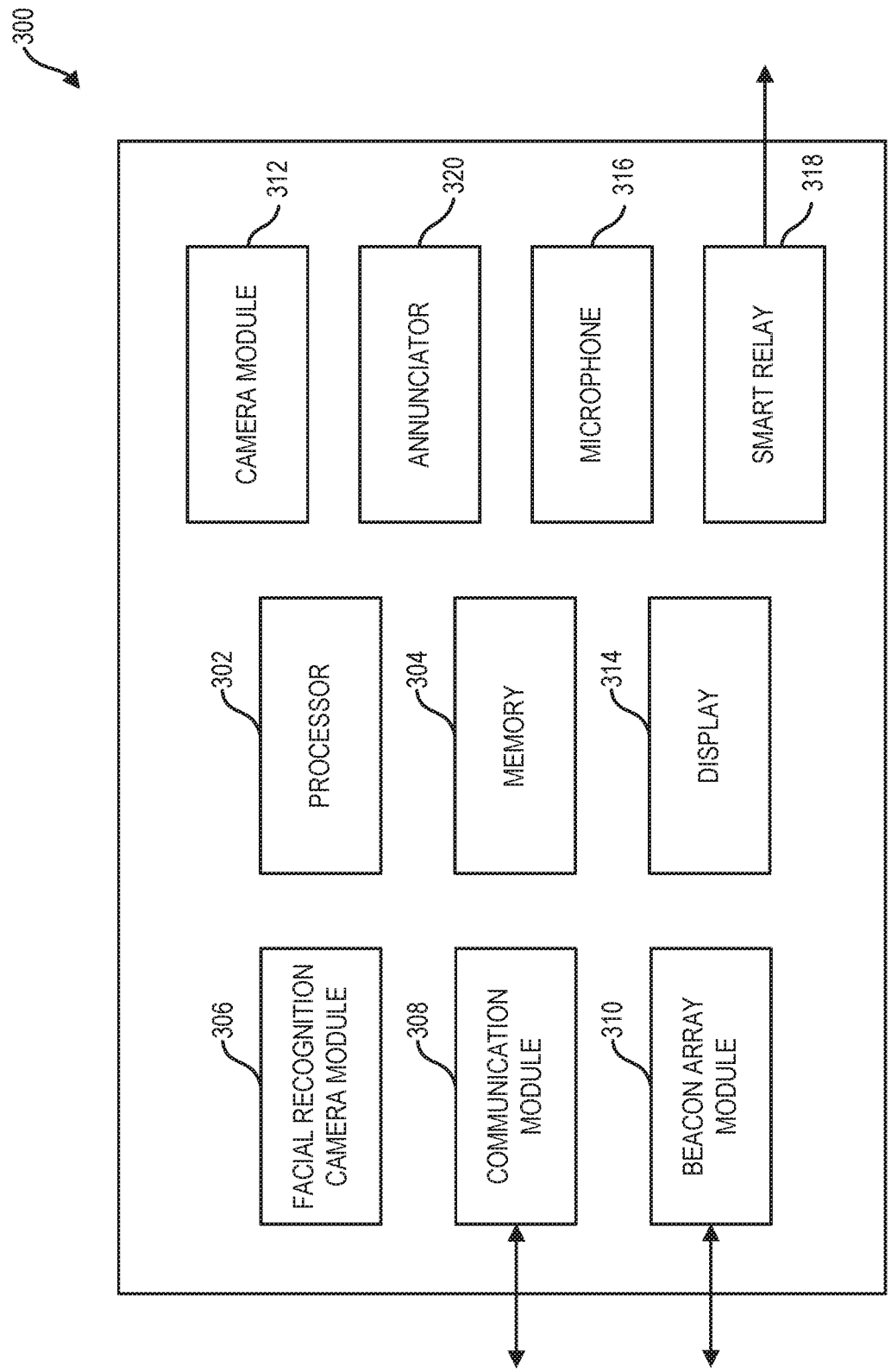
FIG. 3 illustrates an exemplary access control system.
Figure 4:
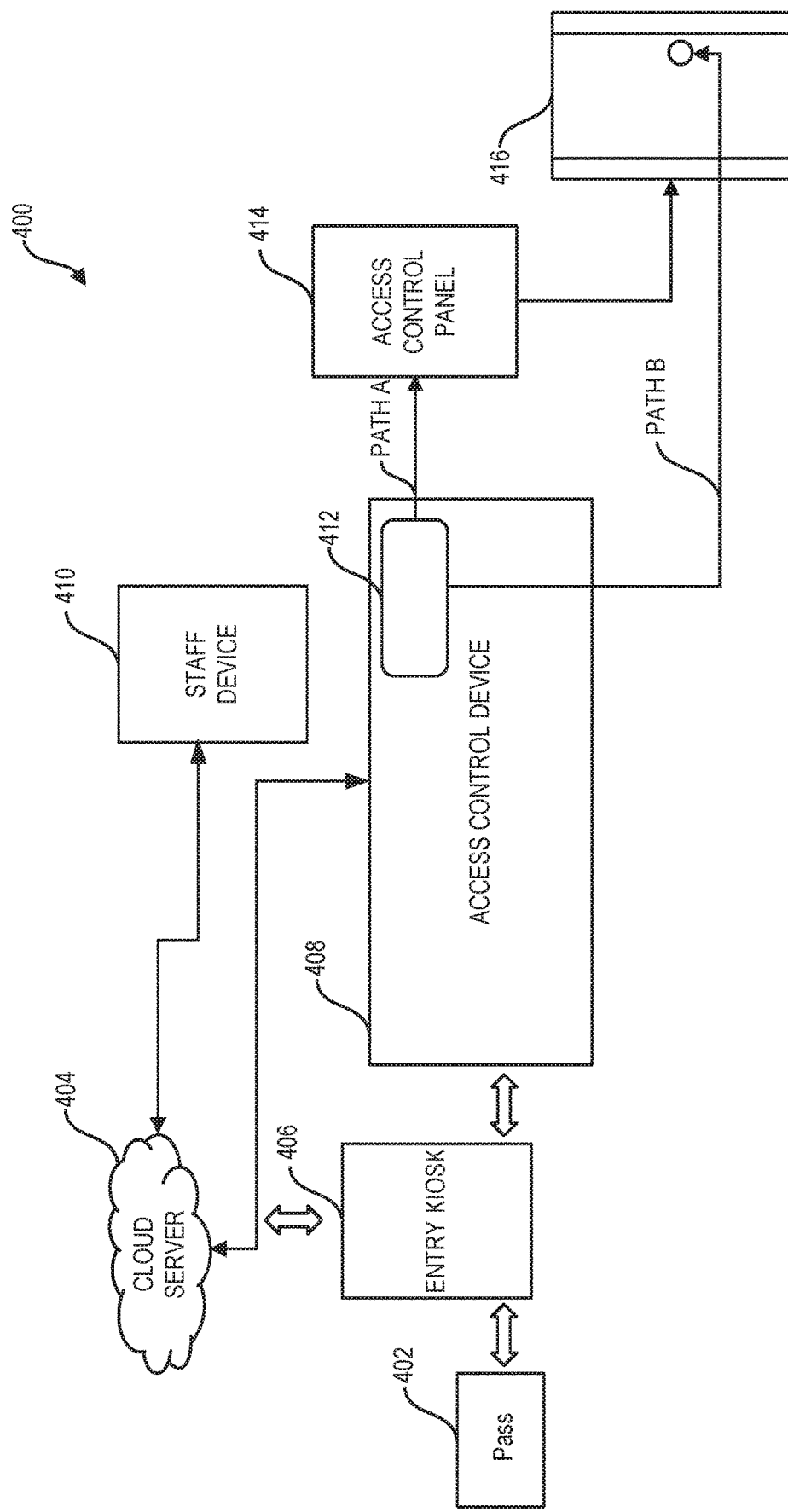
FIG. 4 illustrates an exemplary environment with an exemplary access device.
Figure 5:
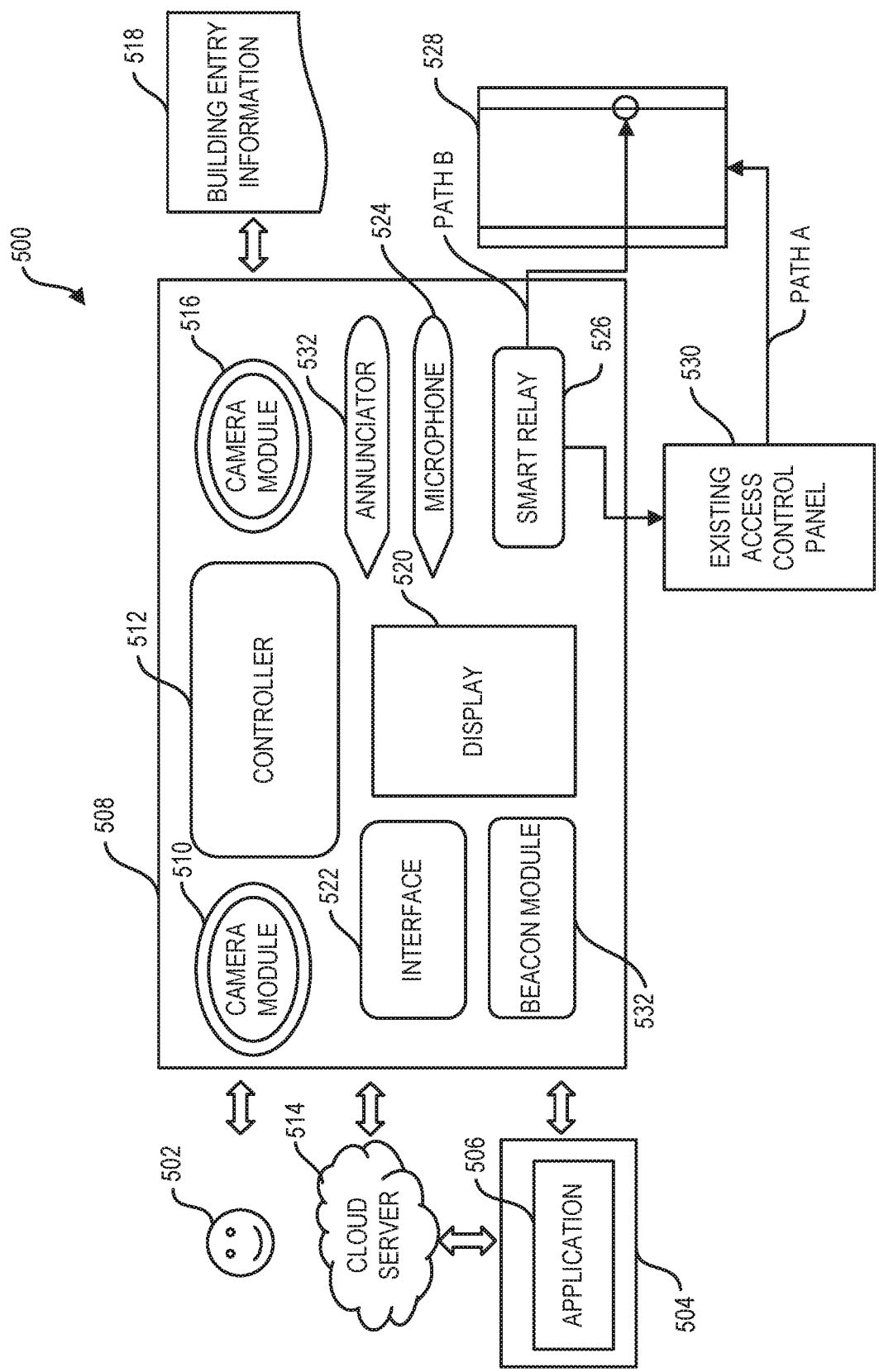
FIG. 5 illustrates another exemplary environment with an exemplary access control device.

Upon receiving the beacon information, in some examples, the application executing on the user device 104 can be configured to use signals strength beacon measurements for localization. The application can be configured to generate the location information for the user device 104 based on the beacon information. In other examples, upon receiving the beacon information, the application can be configured to provide the beacon information to the device location component 114 for further processing and evaluation to determine the location information for the user device 104. In even further examples, the location information for the user device 104 can be provided by a kiosk 116 or an access control system/device (e.g., an access control system 300, as illustrated in FIG. 3, or an access control device 412 and 508, as illustrated in FIGS. 4 and 5, respectively). In some examples, the location information for the user device 104 can be provided by a service provider (e.g., cellular provider) or a third-party system (e.g., a location-based service provider).

The kiosk 116 (or the access control system/device) can be located within a given virtual boundary (e.g., the virtual boundary 110a). In some examples, the kiosk 116 can form part of an access control system/device. In other examples, the kiosk 116 is the access control system/device. In an example, the kiosk 116 can be configured to provide the location information and/or the user device information to the device location component 114. In some examples, as illustrated in FIG. 1, the kiosk 116 can be located at the given POI (e.g., the POI 112a). However, in other examples, the kiosk 116 can be located within the given virtual boundary and/or near the given POI. In some examples, each given POI and/or associated virtual boundary can include a corresponding kiosk.

The kiosk 116 can be placed at a strategic location at the given POI (e.g., a building) to control access to the given POI, locations around the given POI, or one or more features of devices, objects, and the like at the given POI. To gain access, for example, to the given POI, the user can interact with the kiosk 116, in some examples, as described herein. In some examples, the kiosk 116 can be configured to generate the location information and/or the user device information based on the user interactions with the kiosk 116 and/or information received from the user device 104. In some examples, the location information can correspond to location information for the kiosk 116 and can be used to provide relative location information for the user device 104. In some examples, the user interactions can include inputting information at the kiosk 116, which can include the location information and/or the user device information.

In other examples, the kiosk 116 can include the beacon device. In these examples, upon the user device 104 being within range of the beacon device, the user device 104 can be configured to receive the beacon information and evaluate the beacon information to determine the location information. In some examples, the evaluation can include communicating with the AMS 102 to determine the location information. The user device 104 can be configured to provide the location information to the kiosk 116, the AMS 102, or a combination thereof, for further processing. In some examples, the kiosk 116 can be configured to generate the location information upon determining that the user device 104 is within a given distance of the kiosk 116. For example, the kiosk 116 can be configured to monitor for one or more wireless signals (e.g., WiFi, cellular signals, Bluetooth signals, etc.) generated by user device 104. In some examples, the one or more wireless signals can include the location information and/or the user device information. As such, the kiosk 116 can be configured to receive the location information from the user device 104. In some examples, the device location component 114 can be configured to provide the kiosk 116 the location information for the user device 104. In other examples, the one or more wireless signals can include only the user device information, and the device location component 114 can be configured to provide the kiosk 116 the location information.

In some examples, the user device 104 can be configured to provide the user device information to the kiosk 116. The kiosk 116 can be configured to evaluate the user device information to validate the user. As such, the kiosk 116 can be configured to validate the user for the given POI. For example, the kiosk can request that a user present the user device information which can include a quick response (QR) code (e.g., on a display of the user device 104). In some examples, the QR code can be presented on the user device 104 upon the user interacting with the application (or another application executing on the user device 104). In other examples, the QR code can be provided to the user as a web link via email and/or a short service message (SMS). In this example, another user associated with the given POI (e.g., a building occupant) can provide the QR code. The user using the user device 104 can provide the QR code to the kiosk 116. The kiosk 116 (or the AMS 102) can be configured to analyze the QR code to verify the user device 104 and thereby the user.

In other examples, the kiosk 116 can be configured to recognize the user based on user facial characteristics and validate the user based on the user's facial characteristics. In other examples, the kiosk 116 can be configured to capture user facial characteristics and provide the captured user facial characteristics to the AMS 102 for evaluation. The AMS 102 can be configured to evaluate the captured user facial characteristics to validate the user. In other examples, the kiosk 116 can be configured to present on a display of the kiosk 116 a numerical key-pad which the user can interact with to enter a passcode. Upon successful entry of the passcode, the user can be considered to be validated. Upon the user being validated, the user can be granted access to all or a portion of the given POI (e.g., upon an occupant being verified at an entry-point to the building, the occupant can be granted access only to portions of the building, such as a common walkway, living quarters for the occupant, etc.). A valid user can correspond to a user that can be permitted access (e.g., permanent or temporarily) to all or a portion of the given POI.

In some examples, the kiosk 116 can be configured to notify the AMS 102 that the user has been validated and that access should be permitted to all or a portion of the given POI. As described in greater detail herein, the AMS 102 can be configured to set the usability of the application according to which portions of the given POI that the user has been granted access. In some examples, the kiosk 116 can be configured to notify the user that the validation has been completed and access is permitted to all or a portion of the given POI. In an example, the kiosk 116 can be configured to provide a map, a graphical representation, and a combination thereof on a display of the kiosk 116 to which portions of the given POI the user has been granted access.

In a non-limiting example, wherein the given POI is a building, the kiosk 116 can be configured to generate an unlock signal in response to validating the user. The unlock signal can be provided to one or more relays associated with an entry point to the building (e.g., a door). In some examples, the relay can be housed at an existing access control panel in the building. The relay can be actuated based on the unlock signal to unlock the door. In other examples, the unlock signal can be provided to a magnetic or electronic door strike. The magnetic or electronic door strike can be configured to unlock the door in response to the signal.

In some examples, upon validating the user, the kiosk 116 or the application control component 118 can be configured to generate a validation confirmation message. The validation confirmation message can provide an indication that the user device 104 has been validated for the given POI. In some examples, the validation confirmation message can include access information characterizing which portions of the given POI that the user has been granted access, which can include all of the given POI, in some examples. In some examples, the validation confirmation message can be provided to the user device 104 which can be configured to display the validation confirmation message on the user device 104. In some examples, the application control component 118 can be configured to set the usability of the application according to which portions of the given POI that the user has been granted access.

In some examples, the application control component 118 can be configured to validate the user based on the location information for the user device 104. For example, the application control component 118 can be configured to retrieve (or request) the location information for the user device 104 (e.g., via device location component 114). In some examples, the application control component 118 can be configured to evaluate the location information and virtual boundary information to confirm that the user device 104 is located within the given virtual boundary and thereby validating the user. In other examples, the application control component 118 can be configured to evaluate location information that includes the beacon location information and beacon identification information to validate the user. The beacon identification information can include, but not limited a unique n-byte Bluetooth device address for the given beacon device, wherein n is integer greater than one, an UUID for the given beacon device, major and minor values, and/or the beacon ID for the given beacon device, and a combination thereof. The virtual boundary information and the beacon identification information can be stored locally at the AMS 102 or a cross a plurality of systems.

Upon validating that the user is within the given virtual boundary or at the given POI, the application control component 118 can be configured to query an application usage database 120 for application usage information relevant for the given POI. In some examples, the application usage database 120 can be stored in memory of the AMS 102. In other examples, a portion of the application usage database 120 can be stored in the memory of the AMS 102 while a remaining portion of the application usage database 120 can be stored on a different system (e.g., a server, a cloud, a device, etc.). In some examples, the application usage database 120 can be distributed across multiple systems and components.

The application usage database 120 can include a plurality of application usage states for the application executing on the user device. Each application usage state can be associated with one or more POIs, which can include the given POI. In some examples, each application usage state can be associated with one or more virtual boundaries, which can include the given virtual boundary. In other examples, each application usage state can be associated with beacon identification information for one or more beacon devices, which can include the given beacon device. In some examples, each application usage state can be associated with user identification information (e.g., an email associated with the user, a username, a password, a device ID associated with the user device 104, a unique key assigned to the user, and a combination thereof).

Each application usage state can be associated with unique POI information for the given POI and/or one or more application rules (referred to herein as "application configuration information"). In some examples, if the given POI is a building, the POI information can include building information that can include, but not limited to, building name information, building logo information, background picture information, building unit information, building newsfeed information, building work order information, building reservation information, building visitors information, building package order/delivery information, concierge information, building events information, custom link information, and a combination thereof.

The one or more application rules can define an availability (or use) of the one or more features and/or functions of the application, for example, when the user device 104 is located within the given virtual boundary (or located within the given POI), and/or when the user is not located within the given virtual boundary (or not located within the given POI). Additionally, or alternatively, in some examples, the one or more application rules can define the type of information that can be provided to the application, when the information can be provided to the application, how the information can be provided to the application, and how the information can be displayed, and a combination thereof. As such, in some examples, the one or more application rules can be used to set the one or more application parameters of the application. In some examples, at least two application usage states can be associated with the given POI. In this example, the application control component 118 can be configured to communicate with the user via the user device 104 and query the user as to which application state of the at least two application usage states are desired.

In some examples, the application control component 118 can be configured to identify a given application usage state of the plurality of application usage states based on the user device information and/or the location information. The user device information can include, but not limited to, an email associated with the user, a username, a password, a device ID associated with the user device 104, a unique key assigned to the user, and a combination thereof. For example, the application control component 118 can be configured to compare the user device information and the user identification information stored in the application usage database 120 to identify the given application usage state. In some examples, the application control component 118 can be configured to identify the given application usage state of the plurality of application usage states based on the beacon identification information and/or the beacon information. For example, the application control component 118 can be configured to compare the beacon information and the beacon identification information stored in the application usage database 120 to identify the given application usage state. In some examples, the application control component 118 can be configured to compare the location information and the virtual boundary information to identify the given application usage state. The application control component 118 can be configured to retrieve application configuration information associated with the given application usage state. The application configuration information can include, but not limited to, the POI information, the one or more application rules, and a combination thereof. The application control component 118 can be configured to provide the application configuration information to the user device 104 for configuring the application.

The user device 104 can include a processing module 122. The processing module 122 can be configured to receive the application configuration information. The processing module 112 can be configured to instruct an application module 124 based on the application configuration information. The processing modules 124 can be configured (e.g., by instructing the application module 124) to set the applications usability based on the application configuration information while the user device 104 is located within the given virtual boundary or within the given POI. In some examples, to set the applications usability, the processing module 124 can be configured to update (or change) the one or more application parameters of the application based on the application configuration information while the user device 104 is within the given virtual boundary (or the given POI). The processing module 124 of the mobile device 104 can configure the one or more application parameters for the application to set the applications usability for the given POI.

Upon detecting (or determining) that the user device 104 is no longer within the given virtual boundary (or the given POI), the application control component 118 can be configured to set the applications usability (e.g., by updating or changing the one or more application parameters of the application). The application control component 118 can be configured to communicate with the processing module 122 to set the applications usability to a default usage state. In some examples, the application control component 118 can be configured to cause the processing module 122 to remove (or delete) all or a portion of the data that has been provided while the user device 104 was within the given virtual boundary (or the given POI). As such, the application control component 118 can reduce storage of unused data at the user device 104 while securing the data from unprivileged users or applications by proactively deleting the data (e.g., hackers, malware software, etc.).

In some examples, upon detecting (or determining) that the user device 104 is no longer located within the given virtual boundary (or beacon range of the beacon device), the application control component 118 can update the applications usability, e.g., to the default usage state. In some examples, the user device 104 can be located at a first POI (e.g., the POI 112a) and the applications usability can be set to a given usage state by the application control component 118. Upon detecting (or determining) that the user device 104 is located at a second POI (e.g., the POI 112b), the application control component 118 can set the applications usability to another usage state different than the given usage state.

In some examples, the application control component 118 can be configured to periodically monitor for the location information for the user device 104 (e.g., from the device location component 114) and validate that the user device 104 is located within the given virtual boundary (e.g., by comparing the location information and the virtual boundary information), or is located within the given POI (e.g., by comparing the location information and the beacon identification information). The device location component 114 can be configured to periodically retrieve (or request, e.g., by issuing a location request) the location information for the user device 104. In other examples, the application module 124 can be configured to periodically provide the location information for the user device 104. The application control component 118 can be configured to set the applications usability to the default usage state in response to not receiving (or being provided) the location information for the user device 104 for a given period of time.

In other examples, the application control component 118 can be configured to set the applications usability to the default usage state in response to not receiving (or being provided) a usage message for the given period of time. The usage message can provide an indication that a current application usage state should be maintained. In some examples, the usage message is generated by the service provider or the third-party system. In other examples, the usage message can be generated by the processing module 122 of the user device 104. As such, the processing module 122 can be configured to periodically generate the usage message. In some examples, the processing module 122 and the application control component 118 can be configured to periodically perform a validation communication. Upon the processing module 122 failing to validate, the processing module 118 can be configured to change the applications usability to the default usage state. In an example, the application control component 118 can be configured to remove (or delete) all or a portion of the data that had been provided to the user device 104 in response to detecting (or determining) that the user device 104 is no longer within the virtual boundary, within the given POI, or a failure in communication with the user device 104. The user device 104, each kiosk 116, and the AMS 102 can be configured to communicate with each other using wireless and/or wired protocols including but not limited to cellular, WIFI, Bluetooth, Ethernet, public switched telephone network, etc.

In some examples, the user device 104 can be located in an overlap region 126. The overlap region 126 can correspond to a region that is defined by a portion of the virtual boundary 112b and a portion of the virtual boundary 112c. The device location component 114 can be configured to receive the location information for the user device 104 while the user device 104 is located in the overlap region 126. The device location component 114 can be configured to notify the application control component 118 that the user device 104 is located within the overlap region 126. The application control component 118 can be configured to evaluate the location information and user frequency information associated with the user of the user device 104 to 104 to decide as to which application usage state should be utilized from the application usage database 120. The application control component 118 can be configured to provide the application usage state associated with the POI 112b or the application usage state associated with the POI 114b based on the evaluation, and further based on the processes described herein. The user frequency information can characterize an amount of time that the user has visited each POI (e.g., the POI 112b and the POI 112c). For example, if the user more frequently visited the POI 112b, the application control component 118 can be configured to identify the application usage state for the POI 112b for configuring the usability of the application.

Accordingly, the application control component 118 can be configured to identify a given application usage state of the plurality of application usage states upon the user device 104 being located within the given virtual boundary or located within the given POI (e.g., based the location information for the user device 104). The application control component 118 can set the usage state of the application to the given application usage state based on the one or more rules and/or the POI information, which can be unique for the given POI. Accordingly, the application control component 118 can be configured to set the applications usability to a particular application usage state of the plurality of application usage states while the user device 104 is located within the given virtual boundary (or the given POI). The AMS 102 can be configured to set the applications usability (e.g., by updating and/or changing the one or more application parameters) so that the applications features/functions/data is more suitable for the given POI (e.g., if the user is within an apartment building at which the user is an occupant, the application can be updated to provide the user with apartment usability screens (e.g., property management), however, if the user is within a shopping mall, the application can be updated to provide the user with shopping mall usability (e.g., store management)).

FIG. 2 is a block diagram of an exemplary environment 200 for providing management at a point of interest (POI). In some examples, the POI can correspond to one of the POI 112a, 112b and 112c, as illustrated in FIG. 1. In a non-limiting example, the POI can be a building (e.g., an apartment unit). In some examples, the environment 200 can include a server 202. The server 202 can be configured to communicate with a user device 204, a staff device 206, a portal device 208 and a provider device 210 (e.g., a vendor and/or service provider device). In some examples, the user device 204 and/or the staff device 206 can correspond to the user device 104, as illustrated in FIG. 1. The user device 204 can be associated with a user. In some examples, the user can correspond to a visitor (e.g., a guest). In other examples, the user can correspond to a host (e.g., a permanent resident). In some examples, the staff device 206 can be associated with a staff member at the POI.

The devices 204, 206, 208 and 210 can be configured to communicate with each other and the server 202 using wireless and/or wired protocols including but not limited to cellular, WIFI, Bluetooth, Ethernet, public switched telephone network, etc. In some examples, the server 102 can be implemented on a computer, such as a laptop computer, a desktop computer, a server, a tablet computer, a workstation, a mobile device (e.g., cellular device), or the like. In other examples, the server 102 can be implemented on a cloud. Each of the devices 204, 206, 208 and 210 can be implemented as one of a portable device such as a laptop, a tablet, a smartwatch, a cellular device, a personal digital assistant (PDA), and the like.

In some examples, the server 202, the user device 204 and the staff device 206 can include one or more processing module(s) 212 for executing instructions stored in software provided by application module 214, to perform building and/or property management logic described herein. In some examples, the application module(s) 214 provide logic for one or more of a two-way communication channel, e.g., using Transmission Control Protocol/Internet Protocol (TCP/IP), between the user device 204 and the staff device 206, package logging and automatic notifications, visitor passes, concierge services, etc., as described in more detail herein. In some examples, the processing module 212 and the application 214 of the user device 204 can correspond to the processing module 122 and the application module 124, as illustrated in FIG. 1. Thus, the processing module 212 and the application 214 of the user device 204 can be configured to perform one or functions as described with respect to FIG. 1.

In some examples, the server 202 can be implemented as software applications hosted by the service provider's infrastructure, e.g. using a cloud or on premise hosting provider, with one or more devices which are physically located at the same location or that communicate with each other from various locations. In some examples, the server 202 can be implemented in the cloud, e.g., as hosted by an AMAZON Web Service (AWS), or other secure cloud services platform, which can provide compute power, database storage, content delivery and/or other functionality of the server 202. In some examples, the server 202 can correspond to an application management system, such as the application management system 102, as illustrated in FIG. 1. In other examples, the application management system can form part of the server 202.

In addition to the user device 204 and the staff device 206, the server 202 can be configured to communicate with other devices, for example, the portal device 208 and the provider device 208. Additional or alternative devices can be included in the environment 200, e.g., based on an implementation. The application module 214 can be stored locally on the devices 204, 206, 208 and/or 210 for providing the building and/or property management functionality. In other implementations, some or all of the application module 214 can be stored remote to the devices 204, 206, 208 and/or 210. In some examples, a property manager has access to the portal device 108. In some examples, the portal device 108 is a web portal. Additionally, in some examples, the application module 214 can be configured to enable the user device 104 to connect directly with the provider device 210 to schedule a service, e.g., instead of having to request a work order from the staff device 206. The application module 214 can be configured display hyper-local reviews to help the resident/tenant choose the vendor/service provider, e.g., reviews from residents/tenants within the building. The application module 114 can be configured to allow the user to leave reviews of vendors/service providers.

FIG. 3 illustrates an exemplary access control system 300 for a point-of-interest (POI). In some examples, the access control system 300 can include all or part of the kiosk 116, as illustrated in FIG. 1. In other examples, the kiosk 116 can include all or part of the access control system 300. In further examples, the access control system 300 is the kiosk 116. In an example, the POI can correspond to one of the POI 112a, 112b and 112c, as illustrated in FIG. 1. In a non-limiting example, the POI is a building. As described herein, the access control system 300 can be configured to control access to the POI based on location information for a user device (e.g., the user device 104, as illustrated in FIG. 1) and/or user device information associated with the user device (or user). In some examples, the location information for the user device can include actual location information for the user device or relative location corresponding to the location for the access control system 300.

Figure 6:
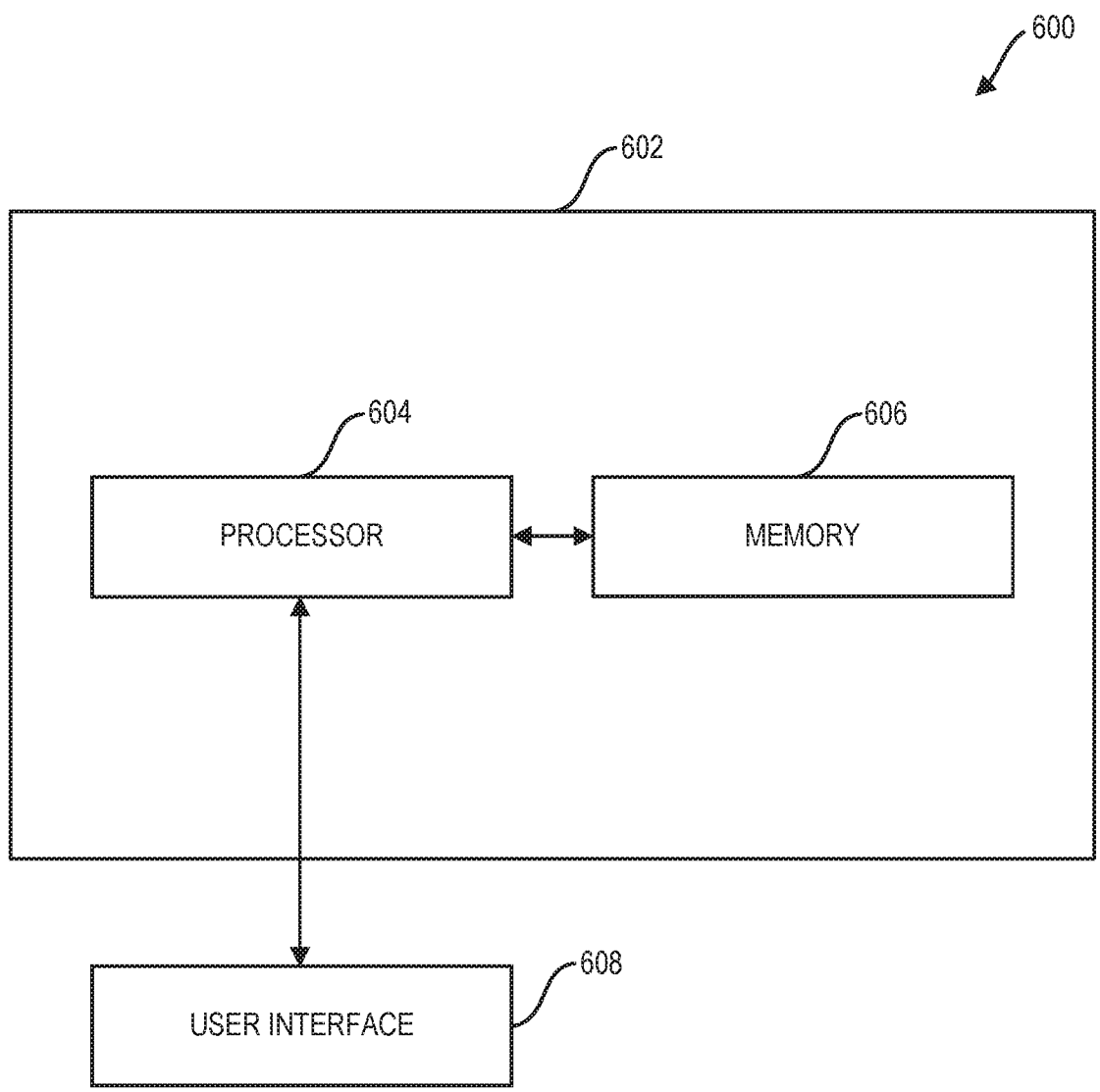
FIG. 6 is a block diagram of an exemplary environment that includes exemplary processing circuitry.

The access control system 300 can include a processor 302. The processor 302 can be configured to access the memory 304 and execute the machine-readable instructions stored in the memory 304. The processor 302 can be implemented, for example, as one or more processor cores. In the present example, although the components of the access control system 300 are illustrated as being implemented on the same system, in other examples, the different components could be distributed across different systems and communicate, for example, over a network, including a wireless, wired, or a combination thereof. In some examples, the processor 302 can correspond to a processor 604, as illustrated in FIG. 6.

The access control system 300 can include a facial recognition camera module 306. The user can approach the facial recognition camera module 306 for validation to a given POI. The facial recognition camera module 306 can be configured to capture one or more images of a scene. In some examples, the scene can include one or more faces. The one or more faces can correspond to a face of the user. The processor 302 can be configured to evaluate the one or more captured image of the scene that includes the face of the user relative to stored facial data for the user to validate the user for the given POI. In other examples, an application management system such as the application management system 102, as illustrated in FIG. 1 can be configured to validate the user by evaluating the captures images of the scene and stored facial data, which can be stored at the application management system. In these examples, the application management system can communicate an access notification message to the processor 302 indicative of whether the user should be provided access to all or a portion of the POI.

The access control system 300 can further include a communication module 308. The communication module 308 can be configured to facilitate one of wireless, wired, or a combination, between the access control system 300 and the application management system, as described herein. In some examples, the access control system 300 can be configured to communicate via the communication module 308 with the user device. The access control system 300 can further include a beacon array module 310. The beacon module can include, but not limited to, a ZigBee module, a Bluetooth module, a Bluetooth Low Energy (BLE) module, a WiMax module, and a combination thereof. In some examples, as described herein, the beacon array module 310 can be used to provide beacon information to the user device when the user device is in range. In some examples, the user device can be configured to provide the location information (e.g., which can include the transmitted beacon information) and/or the user information to the application management system or the access control system 300.

The access control system 300 can include a second camera module 312. In some examples, the second camera module 312 can be used to validate the user for the given POI. The camera module 312 can be configured to validate the user associated with the user device based on user device information. In some examples, the user device information can include pass information. In an example, the processor 302 can be configured to provide on a display 314 a request that the user present a quick response (QR) code corresponding to the pass information. The user device can be configured with the QR code according to the systems and methods described herein. For example, the QR code can be rendered on a display of the user device. The display of the user device can be positioned relative to the camera module 312 such that the camera module 312 can detect the QR code. The processor 302 can be configured to analyze the QR code to validate the user device and thereby the user. The processor 302 can be configured to communicate via the communication module 308 a status of the validation (e.g., pass or fail) to the application management system. In other examples, the processor can be configured to transmit the QR code to the application management system, which can be configured to analyze the QR code to authenticate the user device and thereby the user. In some examples, all Image processing and code detection can be done on a Raspberry Pi, which can be configured to process about 5-10 images per second for instances of new QR codes.

The access control system 300 can include a microphone 316. The microphone 316 can be configured to receive sound information from the user. The sound information can be provided to the processor 302 for processing. In some examples, the user can be validated based on the sound information. For example, the processor 302 can be configured to evaluate the received sound information relative to known sound information stored in the memory 304 to validate the user. In other examples, the application management system can be configured to evaluate the received sound information relative to known sound information stored at the system. Upon a success validation, the processor 302 (or the system) can be configured to validate the user. The processor 302 (or the system) can be configured to generate a validation confirmation message for display on the display 314 to provide the user with a visual confirmation that the user has been validated.

The access control system 300 can include a smart relay 318. Upon a success validation of the user for the POI, the processor 302 (or the application management system via the processor 302) can be configured to communicate with the smart relay 318 to generate a relay signal. The relay signal can be provided to a relay associated with an entry point to the POI such as a door. In some examples, the relay can be located at an existing access control panel at the POI (e.g., a building). The relay can be actuated based on the relay signal to unlock the door. In other examples, the relay signal can be provided to a magnetic or electronic door strike. The magnetic or electronic door strike can be configured to unlock the door in response to the signal.

The access control system 300 can include an annunciator 320. The annunciator 320 can be configured to provide information on a state or a condition of the POI. In some examples, upon the relay, the magnetic door strike, or the electronic door strike activating, the annunciator can be configured to provide an indication that an associated door has been unlocked. In some examples, the annunciator 320 can correspond to a speaker. In this example, the speaker can provide an audible indication that one of the user has been authenticated, the relay has been activated, the magnetic strike has been activated, the electronic door strike has been activated, and a combination thereof. In some examples, the access control system 300 can be configured to send the user information (e.g., visitors' credentials), and additional information to a staff device (e.g., the staff device 206, as illustrated in FIG. 2).

FIG. 4 illustrates an exemplary environment 400 for providing building access to a visitor. In some examples, as described herein, a pass 402 can be issued for a visitor. The pass 402 can be issued in the exemplary environment 400 as a weblink via email and/or text by a building occupant (e.g., a tenant). In some examples, the building occupant can interact with an application executing on a building occupant device. In some examples, the pass 402 can include a QR code. In some examples, the building occupant device can correspond to the user device 104, as illustrated in FIG. 1, or the user device 204, as illustrated in FIG. 2. In some examples, the application can correspond to a user-side application and can be configured to provide a plurality of user screens (e.g., the user screens, as illustrated in FIGS. 29-44A-C). As such, the application can be used to generate the pass 402.

In some examples, upon generating the pass 402, the application executing on the building occupant device can be configured to provide the pass 402 to a cloud server 404. In some examples, the cloud server 404 can correspond to an application management system (e.g., the application management system 102, as illustrated in FIG. 1). In other examples, the cloud server 404 can correspond to the server 202, as illustrated in FIG. 2. The cloud server 404 can be configured to store the pass 402 in a database (e.g., the application usage database, as illustrated in FIG. 1) as pass validation information. Upon entry of the building, the visitor can present the pass 402 on a mobile device (e.g., on a display of the user device) to an entry kiosk 406. In some examples, the mobile device can correspond to the user device 104, as illustrated in FIG. 1. In some examples, the entry kiosk 406 can correspond to the kiosk 116, as illustrated in FIG. 1. In other examples, the entry kiosk 406 can include part of the features or all of the features of an access control system (e.g., the access control system 300, as illustrated in FIG. 3).

In some examples, the entry kiosk 406 can be configured to communicate with the mobile device associated with the visitor over one or more communication protocols (e.g., WiFi protocol, Bluetooth protocol, etc.,) as described herein. The mobile device can be configured to provide the pass 402 to the entry kiosk 406. In some examples, the mobile device can be configured with a visitor-side application that can be configured to communicate with the kiosk 402 over the one or more communication protocol to provide the pass 402.

In some examples, the kiosk 406 and the cloud server 404 can be configured to communicate over a two-way communication channel, e.g., using Transmission Control Protocol/Internet Protocol (TCP/IP). The kiosk 406 can be configured to communicate the pass 402 to the cloud server 404. The cloud server 404 can be configured to evaluate the pass validation information and the pass 402. Based on the evaluation, the cloud server 404 can be configured to determine whether the visitor should be granted access to all, a portion of the building, or not granted access at all to the building. Upon a match, the cloud server 404 can be configured to notify the kiosk 406. The kiosk 406 can be configured to notify the user that access has been granted to all or a portion of the building, and in some examples, which portion of the building. The cloud server 404 can be configured to log visitor entry information into the database characterizing the visitor entry. The visitor entry information can include, but not limited to, a day, a time, who the user is, a type of mobile device that the visitor is using, an entry point of the building at which the user was granted access, how long access will be granted to all or the portion of the building, and a combination thereof.

The cloud server 404 can be configured to communicate with a staff device 410. In some examples, the cloud server 404 and the staff device 410 can be configured to communicate over a two-way communication channel, e.g., using Transmission Control Protocol/Internet Protocol (TCP/IP). In some examples, the staff device 410 can correspond to one of the user device 104, as illustrated in FIG. 1 or the staff device 206, as illustrated in FIG. 2. In some examples, the staff device 410 can be configured with a staff-side application, as described herein. The staff-side application can be configured to provide a plurality of staff screens (e.g., the staff screens, as illustrated in FIGS. 29-44A-C). The cloud server 404 can be configured to communicate the visitor entry information stored in the database to the staff-side application, e.g., for viewing on the staff device 410.

The cloud server 404 can be configured to communicate with the access control device 408. In some examples, the access control device 408 can be part of the entry kiosk 406. In other examples, the entry kiosk 406 can be partially or fully integrated into the access control device 408. In some examples, the access control device 408 can correspond to the access control system 300, as illustrated in FIG. 3. In some examples, the entry kiosk 406 and the access control device 408 can be configured to communicate facilitate the access of the visitor to all or a portion of the building.

In some examples, the cloud server 404 and the access control device 408 can be configured to communicate over a two-way communication channel, e.g., using Transmission Control Protocol/Internet Protocol (TCP/IP). The cloud server 404 can be configured to provide access information in response to determining that the visitor should be granted access to all or a portion of the building. In some examples, the activation information can include device user information and/or location information for the mobile device. The access control device 408 can be configured to activate a smart relay 412 based on the activation information. The smart relay 414 can be configured to generate a relay signal. In some examples, the relay signal can be provided along "PATH A" (e.g., a wire, an optical fiber cable, etc.) to an access control panel 414 in the building to unlock a door 416. In other examples, the relay signal can be provided along "PATH B" (e.g., a wire, an optical fiber cable, etc.) to a magnetic or electronic door strike associated with the door 416. The magnetic or electronic door strike can be configured to unlock the door 416 in response to the relay signal. Accordingly, access to the building can be controlled (e.g., by the tenant) to restrict access only to granted individuals (e.g., visitors).

FIG. 5 illustrates an exemplary environment 500 for providing building access to a user 502. In some examples, the user 502 can correspond to a visitor and/or a tenant. The visitor and/or the tenant can be associated with a respective user device 504. The user device 504 can correspond to the user device 104, as illustrated in FIG. 1, or the user device 204, as illustrated in FIG. 2. In some examples, the user 502 can interact with an application 506 executing on the user device 504. In some examples, the application 506 can correspond to a user-side application and can be configured to provide a plurality of user screens (e.g., the user screens, as illustrated in FIGS. 29-44A-C). Upon entry of the building, the user 502 can approach an access control device 508. In some examples, the access control device 508, the cloud server 514, and/or the user device 504 can be configured to communicate over a two-way communication channel, e.g., using Transmission Control Protocol/Internet Protocol (TCP/IP) using the interface module 522. In some examples, the access control device 508 can correspond to a kiosk (e.g., the kiosk 116, as illustrated in FIG. 1, or the entry kiosk 406, as illustrated in FIG. 1). In other examples, the access control device 508 can be integrated into the kiosk, or form part of the kiosk. In further examples, the access control device 508 can correspond to an access control system (e.g., the access control system 300, as illustrated in FIG. 3) or an access control device (e.g., the access control device 408, as illustrated in FIG. 4).

In some examples, the access control device 508 can include a facial recognition camera module 510 for validation of the user 502 to the building. The facial recognition camera module 510 can be configured to capture one or more images of a scene. In some examples, the scene can include one or more faces. The one or more faces can correspond to a face of the user 502. In some examples, the access control device 508 can include a processor 512. The processor 512 can be configured to evaluate the one or more captured image of the scene that includes the face of the user 502 relative to facial data for the user to validate the user 502 for building access. In other examples, the processor 512 can be configured to provide the one or more captured images of the scene to a cloud server 514. In some examples, the cloud server 514 can correspond to an application management system (e.g., the application management system 102, as illustrated in FIG. 1). In other examples, the cloud server 514 can correspond to the cloud server 404, as illustrated in FIG. 4. In even further examples, the cloud server 514 can correspond to the server 202, as illustrated in FIG. 2. The cloud server 514 can be configured to validate the user 502 by evaluating the one or more captured images of the scene and the facial data, which can be stored locally at the cloud server 514. In these examples, the cloud server 514 can be configured to communicate an access notification message to the processor 512 indicative of whether the user should be provided access to all or a portion of the building.

In some examples, the access control device 508 can include a second camera module 516. In further examples, the second camera module 516 can correspond to the second camera module 312, as illustrated in FIG. 3. In some examples, the second camera module 516 can be used to validate the user for the building. The second camera module 516 can be configured to validate the user associated with the user device based on user device information. In some examples, the user device information can include building entry information 518. In some examples, building entry information 518 can correspond to the pass 402, as illustrated in FIG. 4. In some examples, the building entry information 518 can include guess entry information or occupant entry information. In some examples, the guess entry information can be used to provide access to only a portion of the building. The occupant entry information can be used to provide access to all of the building or less than all of all the building but more portions of the building than the guess entry information.

In an example, the processor 512 can be configured to provide on a display 520 of the access control panel 508 a request that the user present the building entry information 518 (e.g., a quick response (QR) code). The user device 504 can be configured with the building entry information 518 according to the systems and methods described herein. For example, the building entry information 518 can be rendered on a display of the user device 504 (e.g., on the application 506). The display of the user device 504 can be positioned relative to the second camera module 516 to permit the second camera module 516 to detect the building entry information 518. The processor 512 can be configured to evaluate the building entry information 518 relative to building access information to validate the user device 504 and thereby the user 502. The building access information can identify to which portions of the building that the user 502 can access. For example, for a visitor, the building access information can identify a given portion of the building that the visitor can access. In other examples, the processor 512 can be configured to transmit the building entry information to the cloud server 514, which can be configured to evaluate the building entry information and the building access information to validate the user 502. In these examples, the building access information can be stored at the cloud server 514.

The cloud server 514 can be configured to determine whether the visitor should be granted access to all, a portion of the building, or not granted access at all to the building based on the evaluation of the building entry information. For example, upon a successful validation, the cloud server 514 can be configured to notify the processor 512. The processor 512 can be configured to notify the user that access has been granted to all or a portion of the building, and in some examples, which portion of the building. The cloud server 514 can be configured to log entry information into a database characterizing the building entry. The log entry information can include, but not limited to, a day, a time, an identity of the user 502, a type of mobile device that the user 502 is using, an entry point of the building at which the user 502 was granted access, how long access will be granted to all or the portion of the building for the user 502, and a combination thereof. In some examples, the access control device 508, the cloud server 514, and/or the user device 504 can be configured to communicate over a two-way communication channel, e.g., using Transmission Control Protocol/Internet Protocol (TCP/IP) using the interface module 522.

The access control device 508 can include an interface module 522. The interface module 522 can be configured to facilitate one of wireless, wired, or a combination, between the processor 512, the cloud server 514, and/or the user device 504, as described herein. The access control device 508 can include a microphone 524. In some examples, the microphone 524 can correspond to the microphone 316, as illustrated in FIG. 3. The microphone 524 can be configured to receive sound information from the user 502. The sound information can be provided to the processor 512 for processing. In some examples, the user 502 can be validated based on the sound information. For example, the processor 502 can be configured to evaluate the received sound information relative to known sound information associated with the user 502 to validate the user 502. In other examples, the processor 512 can be configured to communicate the sound information to the cloud server 514. The cloud server 514 can be configured to evaluate the received sound information relative to known sound information, which can be stored locally at the cloud server 514, or remotely. The processor 512 (or the cloud server 514) can be configured to generate a validation confirmation message for display on the display 520 to provide the user with a visual confirmation that the user has been validated.

The access control device 508 can include a smart relay 526. Upon a success validation of the user for the building, the processor 512 (or the cloud server 514) can be configured to communicate with the smart relay 526 to generate a relay signal. In an example, the relay signal can be provided to a relay associated with an entry point to the building corresponding to a door 528. In some examples, the relay can be located at an existing access control panel 530 at the building. The relay can be actuated based on the relay signal to unlock the door 528. In other examples, the relay signal can be provided to a magnetic or electronic door strike associated with the door 528. The magnetic or electronic door strike can be configured to unlock the door 528 in response to the signal. In some examples, the relay signal can be provided along "PATH A" (e.g., a wire, an optical fiber cable, etc.) to the access control panel 526 in the building to unlock the door 528. In other examples, the relay signal can be provided along "PATH B" (e.g., a wire, an optical fiber cable, etc.) to a magnetic or electronic door strike associated with the door 528. The magnetic or electronic door strike can be configured to unlock the door 528 in response to the relay signal.

The access control device 508 can include an annunciator 532. The annunciator 532 can be configured to provide information on a state or a condition of the building. In some examples, upon the relay, the magnetic door strike, or the electronic door strike activating, the annunciator 532 can be configured to provide an indication that the door 528 has been unlocked. In some examples, the annunciator 532 can correspond to a speaker. In this example, the speaker can provide an audible indication that one of the user 502 has been authenticated, the relay has been activated, the magnetic strike has been activated, the electronic door strike has been activated, and a combination thereof.

In some examples, the access control device 508 can include a beacon module 532. In some examples, the beacon module 532 can be associated with unique beacon identification information. The beacon location information can be used to provide relative location information for the user device 502. In some examples, the cloud server 514 can be configured to store in a database (e.g., the application usage database 120, as illustrated in FIG. 1) the beacon identification information. The beacon module 532 can include, but not limited to, a ZigBee module, a Bluetooth module, a BLE module, a WiMax module, and a combination thereof. In some examples, the beacon module 532 can correspond to the beacon device described herein (e.g., with respect to FIG. 1).

When the user device 504 is positioned within beacon range of the beacon module 532, the user device 504 can be configured to receive beacon information generated by the beacon module 532. Upon receiving the beacon information, in some examples, the application 506 executing on the user device 504 can be configured to use signals strength beacon measurements for localization of the user device 504. The application 506 can be configured to generate the location information for the user device 504 based on the beacon information. In other examples, upon receiving the beacon information, the application 506 can be configured to provide the beacon information to the access control device 508, which can relay the beacon information to the cloud server 514. In other examples, the user device 504 can be configured to provide the beacon information directly to the cloud server 514. The cloud server 514 can be configured to evaluate the beacon information to determine the location information for the user device 504, as described herein. As such, the beacon information can be used to provide a relative location for the user device 504 or provide an indication that the user device 504 is at the building.

In some examples, the cloud server 514 can be configured to identify a given application usage state of a plurality of application usage states stored in the database based on an evaluation of beacon identification information and beacon information associated with the beacon device (e.g., the beacon module 532). For example, the cloud server 514 can be configured to evaluate the beacon information and the beacon identification information stored in the database to identify the given application usage state. The cloud server 514 can be configured to retrieve application configuration information associated with the given application usage state. The cloud server 514 can be configured to provide the application configuration information to the user device 504 for configuring the applications usability. The user device 504 can be configured to set the applications usability based on the application configuration information while the user device 504 is located within the building. In some examples, to update the applications usability, the user device 504 can be configured to update (or change) one or more application parameters of the application 506 based on the application configuration information while the user device 504 is located within the building.

FIG. 6 is a block diagram of an exemplary environment 600 that includes exemplary processing circuitry 602. In some examples, an application management system (e.g., the application management system 102, as illustrated in FIG. 1), a server (e.g., the server 202, as illustrated in FIG. 2), devices disclosed herein (e.g., the user device 104/204, as illustrated in FIGS. 1 and 2, the staff device 206, as illustrated in FIG. 2, the portal device 208, as illustrated in FIG. 2, and/or the user device 504, as illustrated in FIG. 5), and/or an access control system/panel (e.g., the access control system 300, as illustrated in FIG. 3 and/or the access control device 408/508, as illustrated in FIGS. 4 and 5) can include the processing circuitry 602. The systems and methods described herein may be implemented in many different ways in many different combinations of hardware, software firmware, or any combination thereof. In an example, the processing module 122 and/or the processing module 212 may enable functions of the application module 124 and/or the application module 214. It can be appreciated that the components, devices or elements illustrated in and described with respect to FIG. 6 below may not be mandatory and thus some may be omitted in certain examples. Additionally, some examples may include further or different components, devices or elements beyond those illustrated in and described with respect to FIG. 6.

In some examples, a processing module can be configurable to perform actions in accordance with one or more example embodiments disclosed herein. In some examples the processing circuitry 602 can include a microcontroller or other processor. The processing circuitry 602 may be configured to perform and/or control performance of one or more functionalities of the systems and/or devices disclosed herein. The processing circuitry 602 may be configured to perform data processing, application execution and/or other processing and management services according to one or more examples described herein. In some examples, the processing circuitry 602, may correspond to or include one or more chipsets and/or other components that may be provided as integrated circuits.

In some examples, the processing circuitry 602 can include a processor 604 and, in some embodiments, such as that illustrated in FIG. 6, can further include memory 606. The processor 604 can be embodied in a variety of forms.

For example, the processor 604 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it can be appreciated that the processor 604 may include a plurality of processors. The plurality of processors can be in operative communication with each other and may be collectively configured to perform one or more functionalities as described herein. In some example embodiments, the processor 604 can be configured to execute instructions that may be stored in the memory 606, or that can be otherwise accessible to the processor 604. As such, whether configured by hardware or by a combination of hardware and software, the processor 604 is capable of performing operations according to various embodiments while configured accordingly.

In some examples, the memory 606 can include one or more memory devices. The memory 606 can include fixed and/or removable memory devices. In some embodiments, the memory 606 can provide a non-transitory computer-readable storage medium that can store computer program instructions that can be executed by the processor 604. In this regard, the memory 606 can be configured to store information, data, applications, instructions and/or the like for enabling the systems and/or deices described herein to carry out various functions in accordance with one or more examples. In some examples, the memory 606 can include a database (e.g., the application usage database 120, as illustrated in FIG. 1). In some examples, the memory 606 can be in communication with one or more of the processor 604, the user interface 608 for passing information among components of the processing module 212. The user interface 608 can include one or more of a keyboard, a keypad, a mouse, a trackball, a touchscreen, a stylus, etc.

Figure 7:
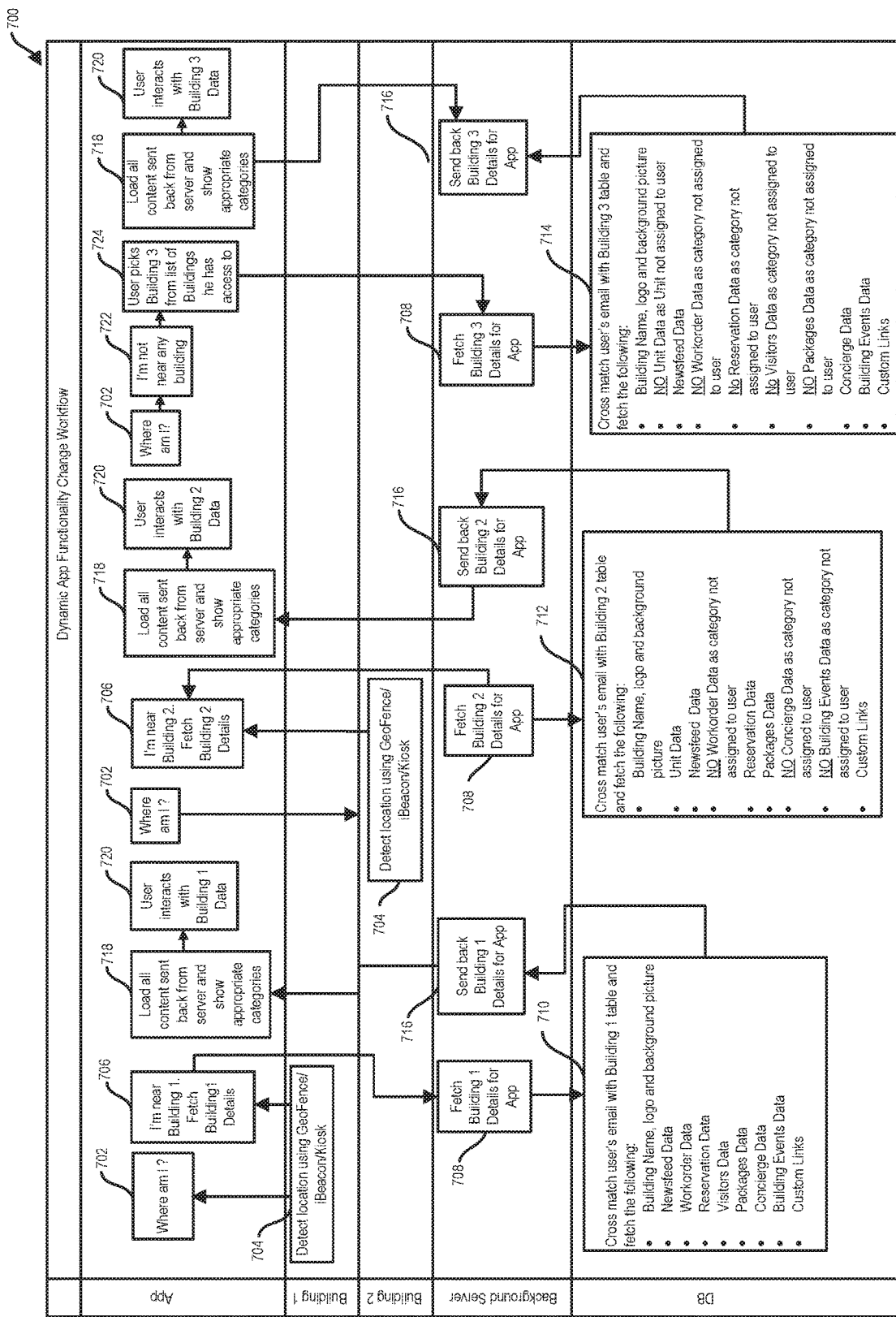
FIG. 7 is an exemplary block and signaling diagram for providing location-based application management.

FIG. 7 is an exemplary block and signaling diagram 700 according to the systems and methods described herein for providing location-based application management. It should be understood and appreciated that the illustrated signaling diagram, in other examples, may occur in different orders or concurrently with other actions. Additionally, not all features including block diagram and/or signaling illustrated in FIG. 7 may be required to provide location-based application management. In some examples, at block 702, a user can position a user device (e.g., the user device 104, as illustrated in FIG. 1, the user device 204, as illustrated in FIG. 2, and/or the user device 504, as illustrated in FIG. 5) at a given building ("Building 1" and/or "Building 2", as illustrated in FIG. 7). In some examples, at block 702, the user device can be configured to execute an application, in some instances, as described herein. At block 704, a location of the user device can be detected (or determined) according to the systems and methods described herein. In some examples, the user devices location can be detect using geo-fencing. Upon detecting the location information for the user device, at block 706, the application can be configured to notify (or inform) the user (e.g., on a display of the user device) that the user is near (or at) the first building.

At block 708, the application can be configured to communicate with a backend server. In some examples, the backend server can correspond to an application management system (e.g., the application management system 102, as illustrated in FIG. 1). In other examples, the backend server can correspond to the server 202, as illustrated in FIG. 2. In further examples, the backend server can correspond to the cloud server 404, as illustrated in FIG. 4 or the cloud server 514, as illustrated in FIG. 5. In a non-limiting example, the backend server can be configured to evaluate user device information (e.g., a user's email) relative to information stored a database, as described herein. In some examples, the database can correspond to the application usage database 120, as illustrated in FIG. 1.

In some examples, at block 710, the backend server can be configured to identify (e.g., query) and fetch building information that is relevant (or appropriate) for a first building (e.g., "Building 1," as illustrated in FIG. 7). In other examples, at block 710, the backend server can be configured to identify and fetch building information that is relevant (or appropriate) for a second building (e.g., "Building 2," as illustrated in FIG. 7). In further examples, at block 714, the backend server can be configured to identify and fetch building information that is relevant (or appropriate) for a third building (e.g., "Building 3," as illustrated in FIG. 7).

At block 716, the backend server can be configured to provide the fetched building information to the application. At block 718, the application can be configured to display the fetched building information on the user device. At block 720, the user can interact with the configured application to use the fetched building information. In some instances, at block 722, the user device can be configured to display building information 714 when the user device is not located within the third building (or any building, in other examples). At block 724, in some examples, the application executing on the user device can provide a list of one or more buildings that the user can access. At block 708, the backend server can be configured to identify and fetch building information that is relevant (or appropriate) for the third building. At block 718, the application can be configured to display the fetched building information on the user device. At block 720, the user can interact with the configured application to interact with the fetched building information for the third building.

Figure 8:
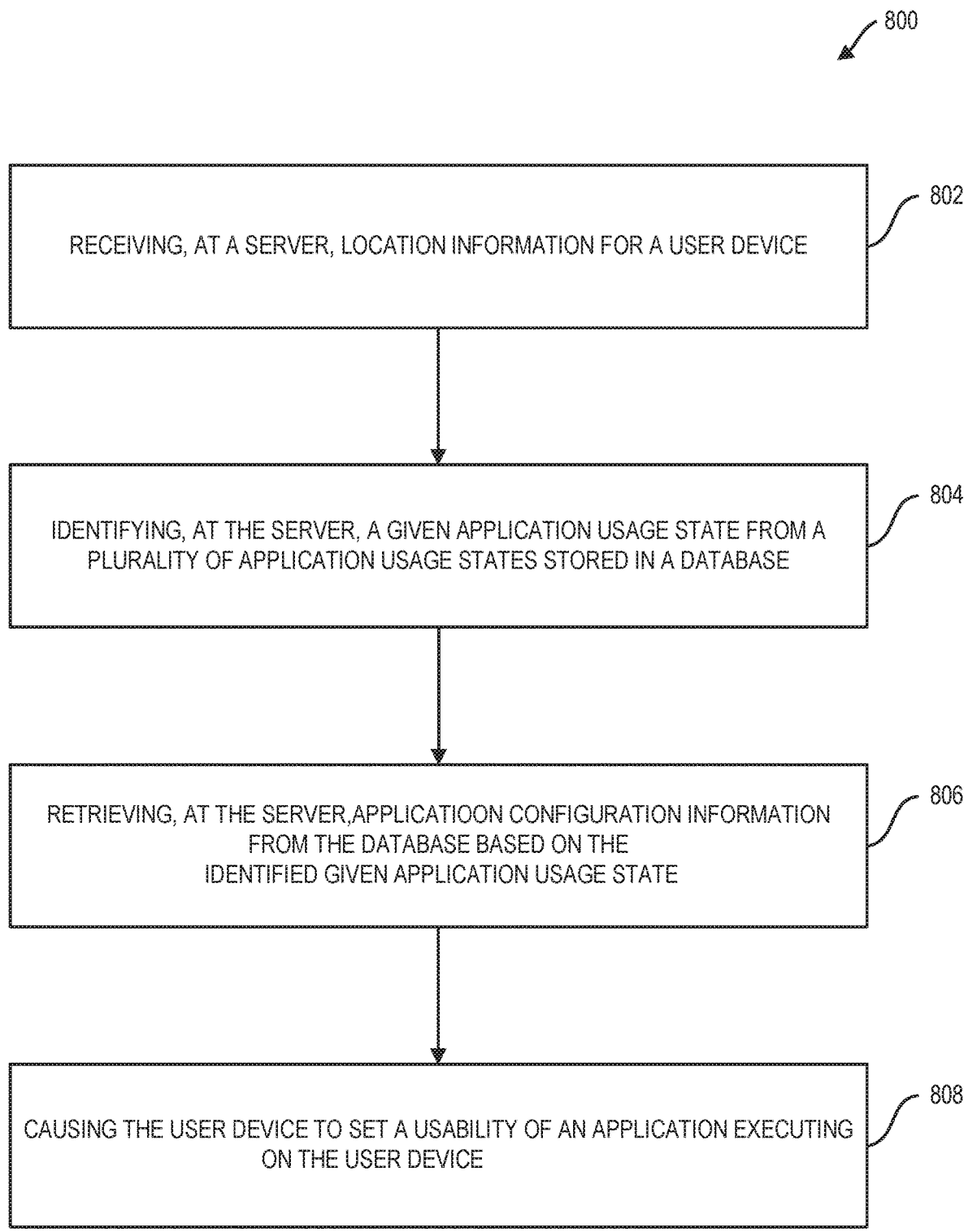
FIG. 8 is a flow diagram illustrating an exemplary method for location-based application management.

In view of the foregoing structural and functional features described above, methods that can be implemented will be better appreciated with reference to FIG. 8. While, for purposes of simplicity of explanation, the method of FIG. 8 is shown and described as executing serially, it is to be understood and appreciated that such method is not limited by the illustrated order, as some aspects could, in other examples, occur in different orders and/or concurrently with other aspects from that shown and described herein. Moreover, not all illustrated features may be required to implement the method. The method or portions thereof can be implemented as instructions stored in one or more non-transitory storage media as well as be executed by a processing resource (e.g., a processing module) of a system (e.g., the application management system 102, as illustrated in FIG. 1).

FIG. 8 is a flow diagram illustrating an exemplary method for location-based application management. In some examples, the method 800 can be implemented by an application management system (e.g., the application management system 102, as illustrated in FIG. 1). The method can begin at 802, by receiving, at a server, location information for a user device (e.g., the user device 104, as illustrated in FIG. 1 and/or the user device 204, as illustrated in FIG. 2) located at a given point of interest (POI). At 804, identifying, at the server, a given application usage state from a plurality of application usage states stored in a database (e.g., the application usage database 120, as illustrated in FIG. 1) based on the location information associated with the user device. At 806, retrieving, at the server, application configuration information from the database based on the identified given application usage state. At 808, causing the user device to set a usability of an application executing on the user device based on the application configuration information while the user device is located at the given POI.

Figure 9:
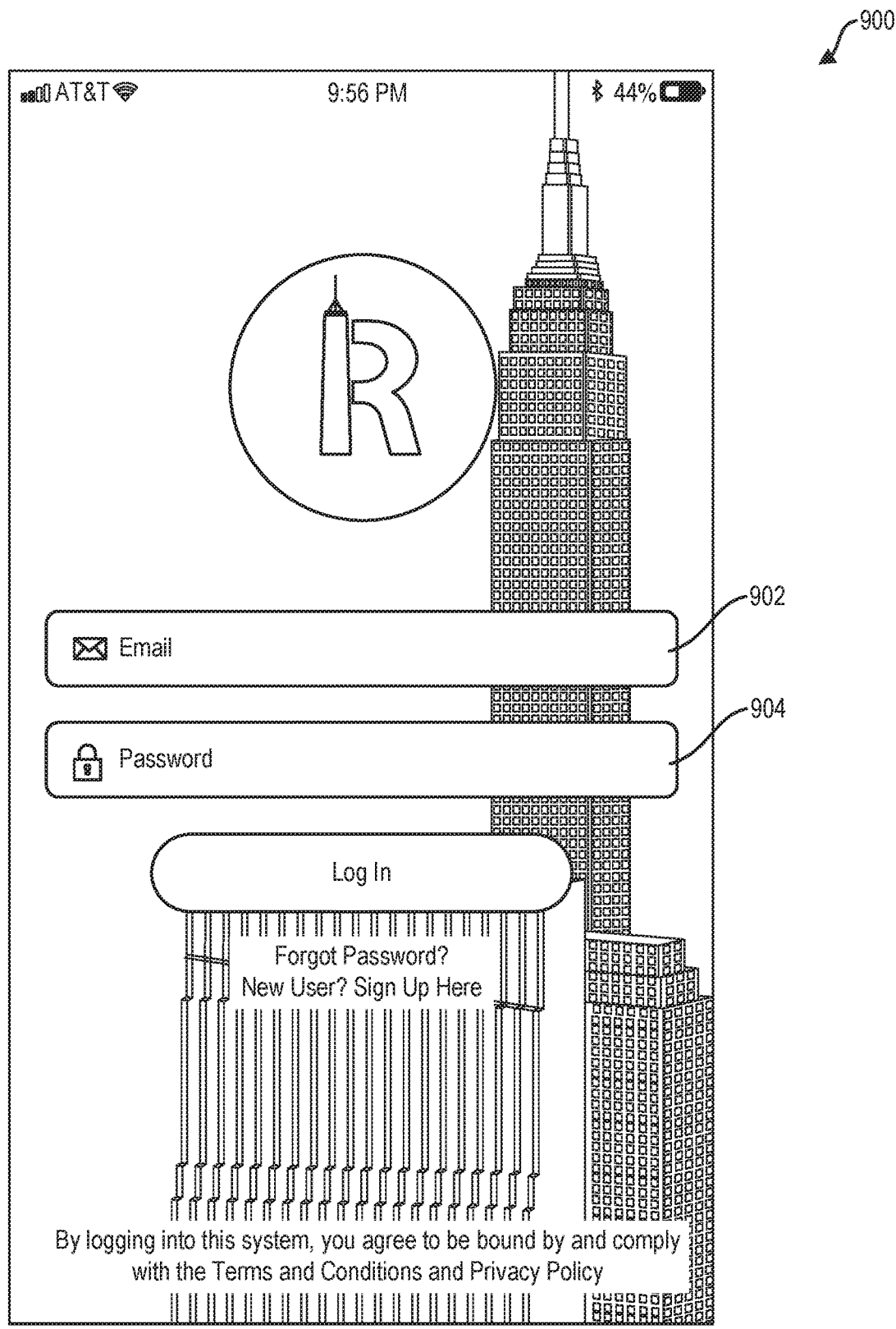
FIGS. 9-28 are exemplary screenshots of user screens displayed by an application module on a user device.
Figure 10:
Figure 11:
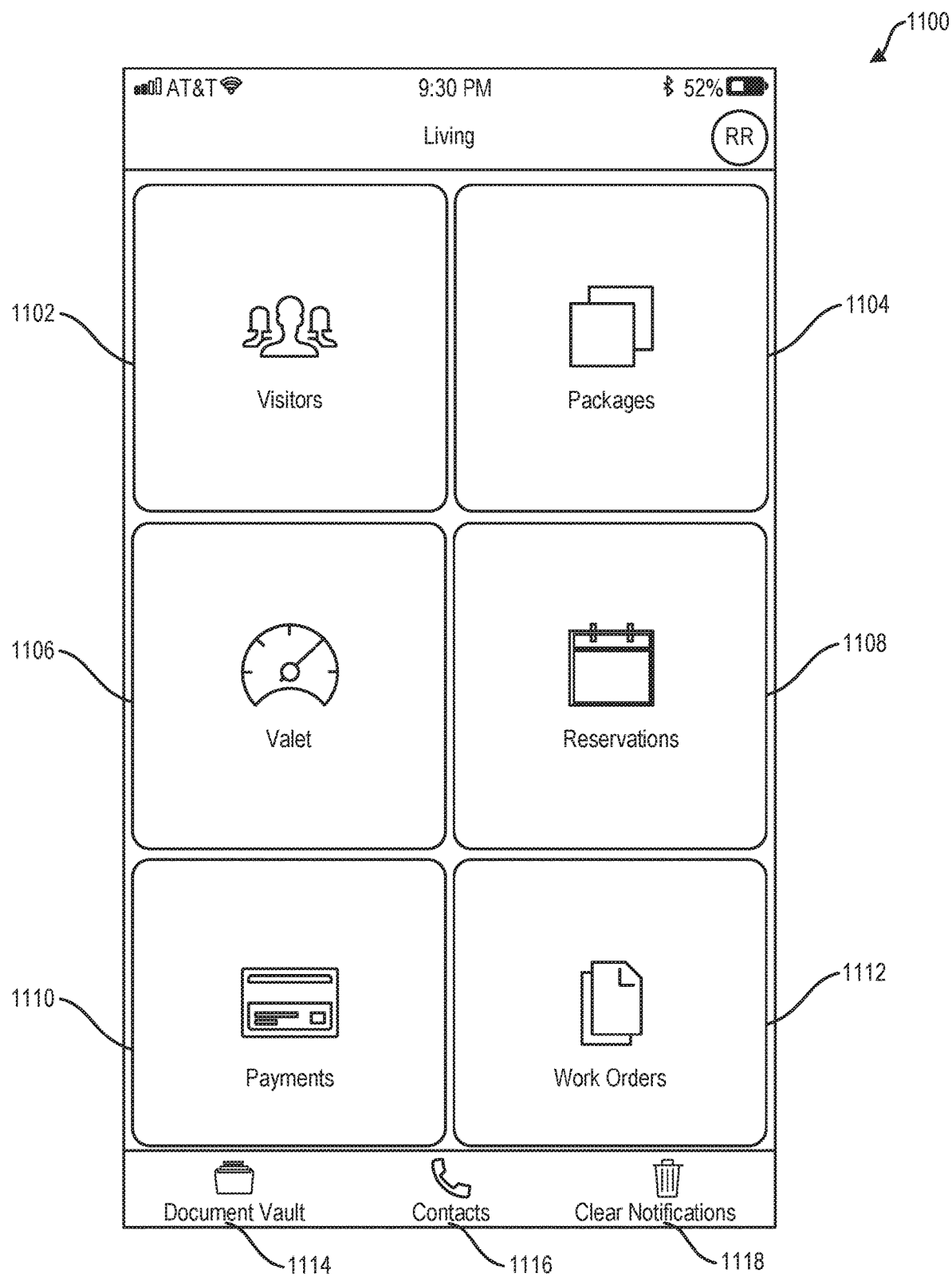

FIGS. 9-28 are exemplary screenshots of user screens displayed by the application module 214 on the user device 204. FIG. 9 is an example login screen 900 displayed by the application module 214. The login screen 900 can include a user name field 902, e.g., to receive an entered email address, and a password field 904, e.g., to receive an entered password. In some examples, the application module 614 can be configured to determine if the staff device 206 or the user device 204 is logging in based on received email and password. The server 202 can be configured to store one of the user names, passwords, staff information, tenant information, and a combination thereof, for providing access to the application module 214. The application module 214 can provide subsequent screenshots and functionality based on whether the user device 104 and/or the staff device 106 is logged in.

In FIG. 1000, for the user device 206, the application module 214 can be configured to display a welcome screen 1000. In FIG. 1100, after the welcome screen 1000, the application module 114 can be configured to display a home screen 1100. The home screen 1100 can provide various tiles to the resident/tenant to choose from, including but not limited to, one or more of visitors 1102, packages 1104, valet 1106, reservations 1108, payments 1110 and work orders 1112. The application module 814 can be configured to can change a size and/or position of the tiles depending on the features available to the devices 204, 206, 208 and 210, e.g., via a side menu bar. In some examples, the application module 214 can display an icon for a document vault 1114, contacts 1116, clear notifications 1118, etc. To choose an option, in some examples, the user (e.g., resident, tenant, visitor, etc.) can touch the option and/or icon.

Figure 12:
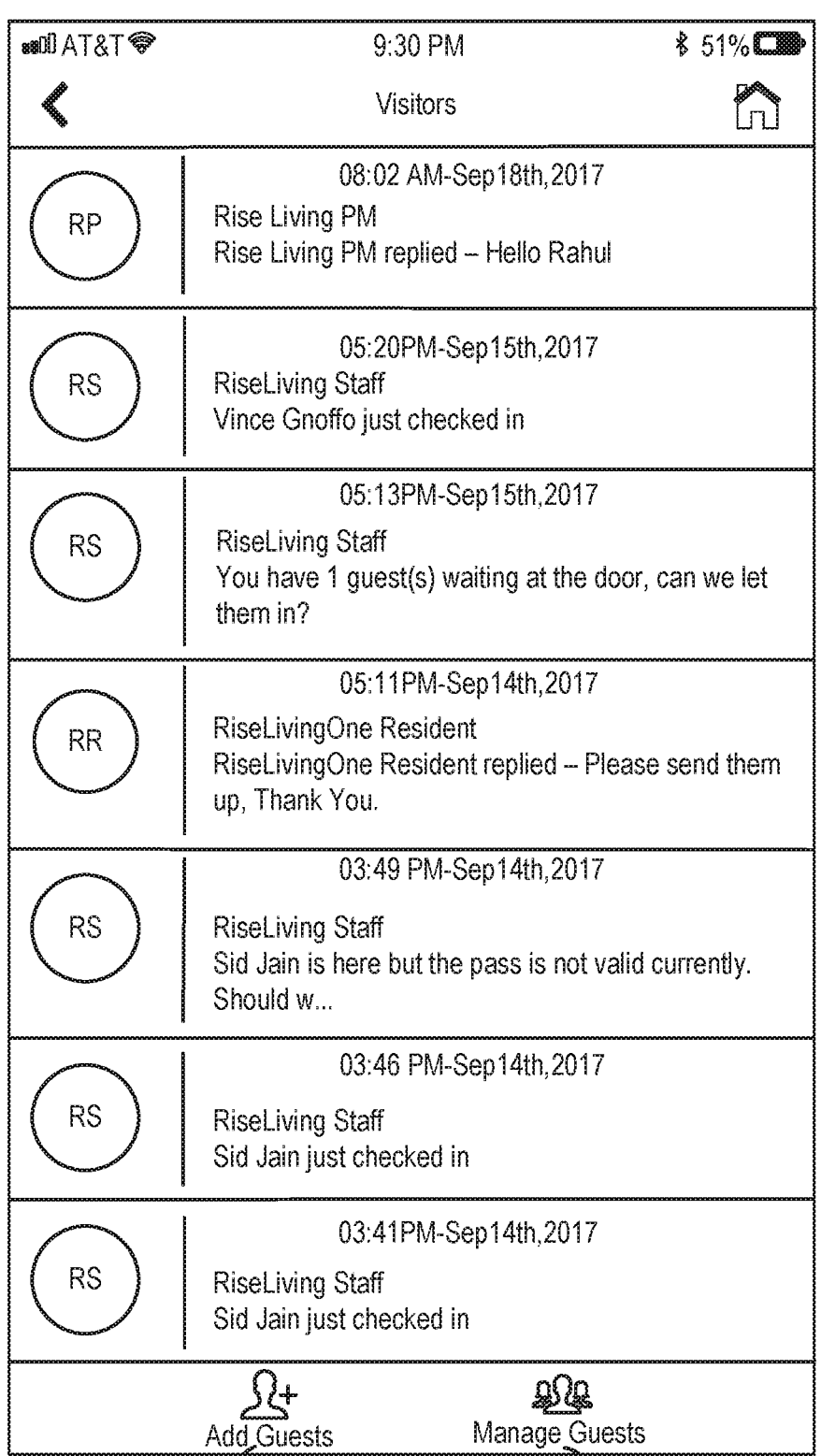

In FIG. 12, the application module 214 displays a visitor screen 1200, e.g., if the visitors option 1202 is touched. The visitor screen 1200 provides a list of guests of the resident/tenant, and the application module 214 displays an add guest icon 1202 and a manage guest icon 1204 to the user device 204, for the application module 214 to perform those functions. In some examples, the user device 104 can be configured to add one of a guest to the list, including a name of the guest, email, phone number, special instructions to the doorperson, duration the guest is allowed access to the building, and a combination thereof. The server 202 can be configured to store the visitor information.

Figure 13:
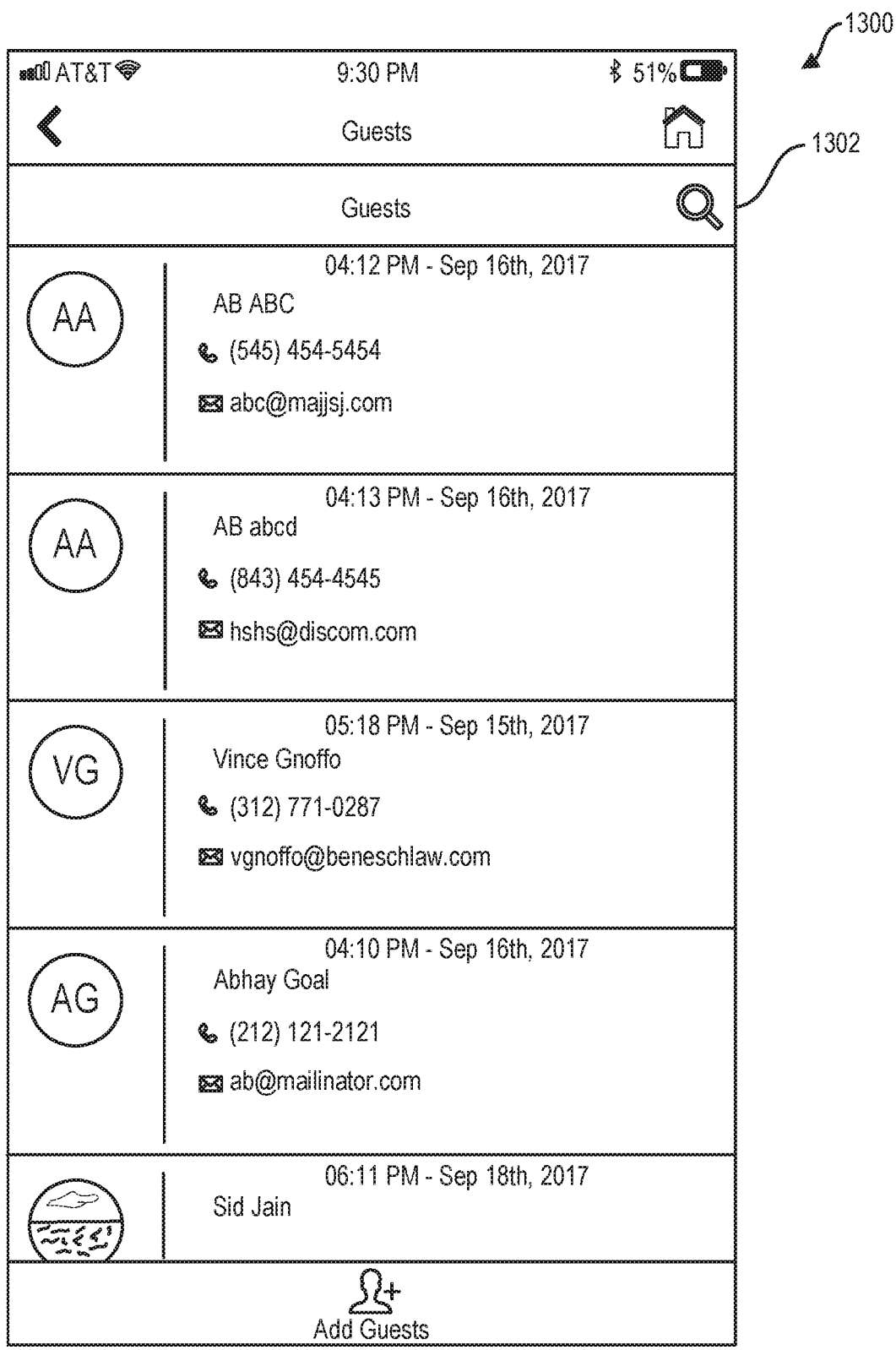
Figure 14:
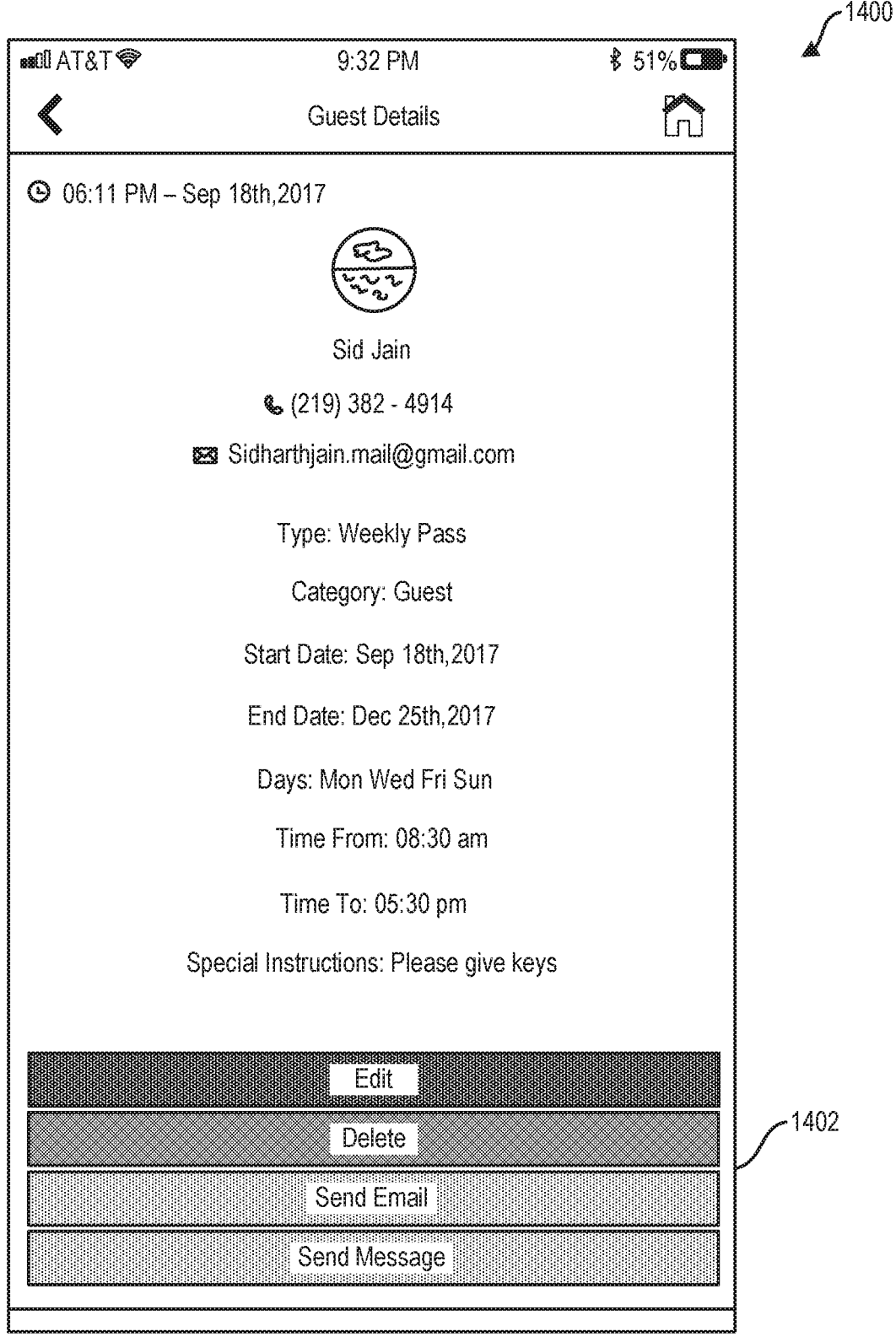
Figure 15:
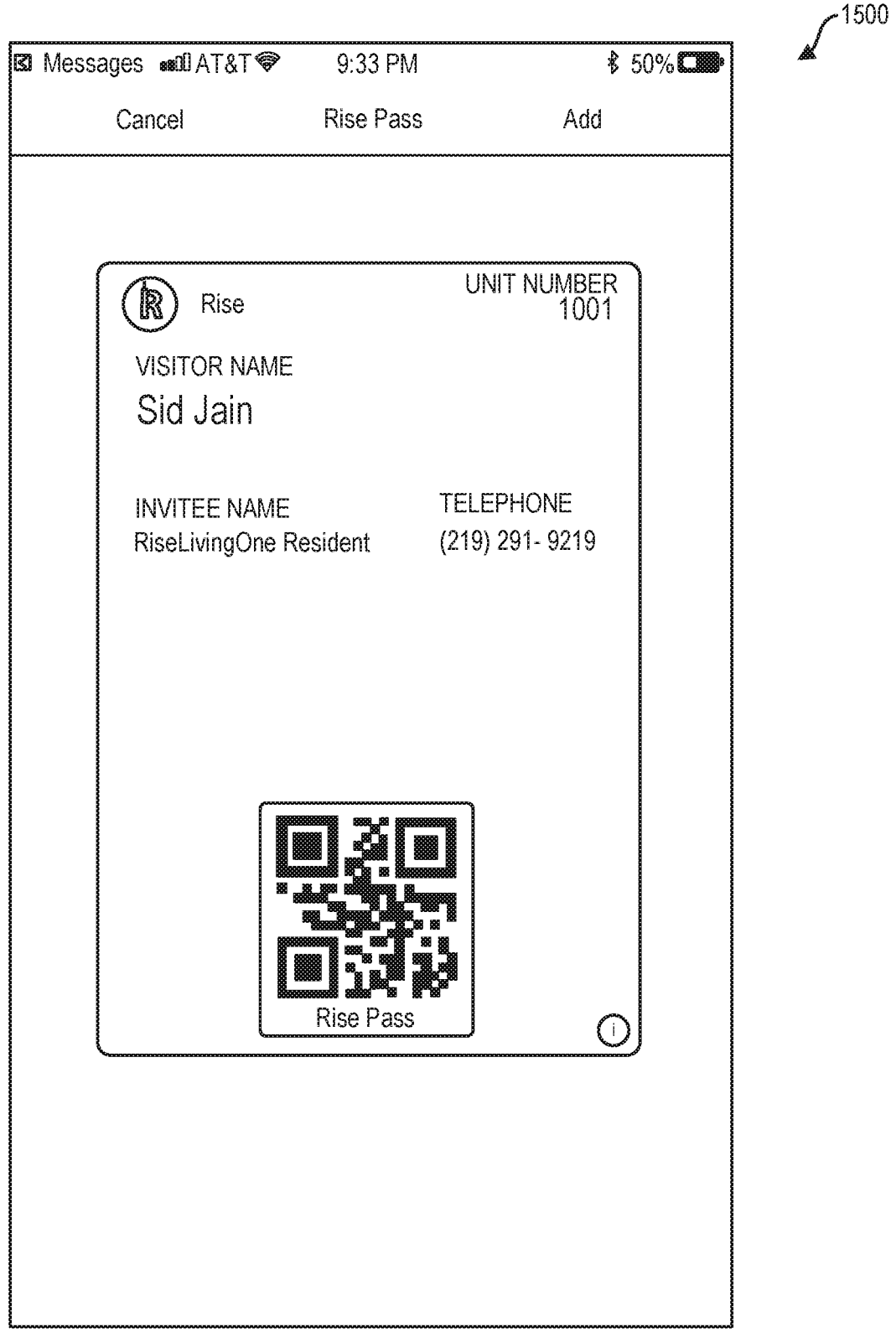

In FIG. 13, the application module 214 can be configured to display an add guest screenshot 1300. The application module 214 can be configured to display contacts to the user device 204 to choose from as a guest, e.g., contacts stored on the device 204. The application module 214 can be configured display a search icon 1302 for searching for a guest name, and/or the user can scroll through the contact names. In FIG. 1400, the application module 114 can be configured to display a guest details screenshot 1400. The application module 114 can be configured to display icons 1402 for editing pass information, e.g., type, category, e.g., guest, service, contractor, delivery, also start date, end date, days, time from, time to, and special instructions, e.g., give the guest keys. The server 202 can be configured to store the pass information. The display icons 1402 can also be used to delete a pass, send an email to the guest, send a message to the guest, etc.

In FIG. 1500, the application module 114 can be configured to produce a pass 1500 sent to the guest. The pass 1500 can include, but not limited to, the visitor name, the user name, a telephone number, and/or a bar code. In some examples, the application module 114 can be configured to send the pass 1500 to the guest via a link. When the guest pulls up the link the guest can access the pass 1500 which can include a quick response (QR) code. The guest can also download the pass 1500 to their mobile device, e.g., through Apple Wallet on iOS devices or PassWallet on Android devices, etc. When the guest enters the building the pass 1200 can automatically display on their phone since the pass can be location aware by building address. When the guest arrives at the building the guest may only need to display the pass 1500 to the staff, who can then scan the bar code, e.g., using a camera of the staff device 210. In some examples, a self-serve kiosk in the building can help expedite visitor entry in the building. Once the scan is successful, the application module 214 of the user device 204 can be configured to receive a push notification, e.g., using TCP/IP, alerting the user that the guest is on his way. In some examples, the application module 214 can be configured to provide real-time communication between the user device 204, the staff device 210 and the portal device 208 on the specific request.

Figure 16:
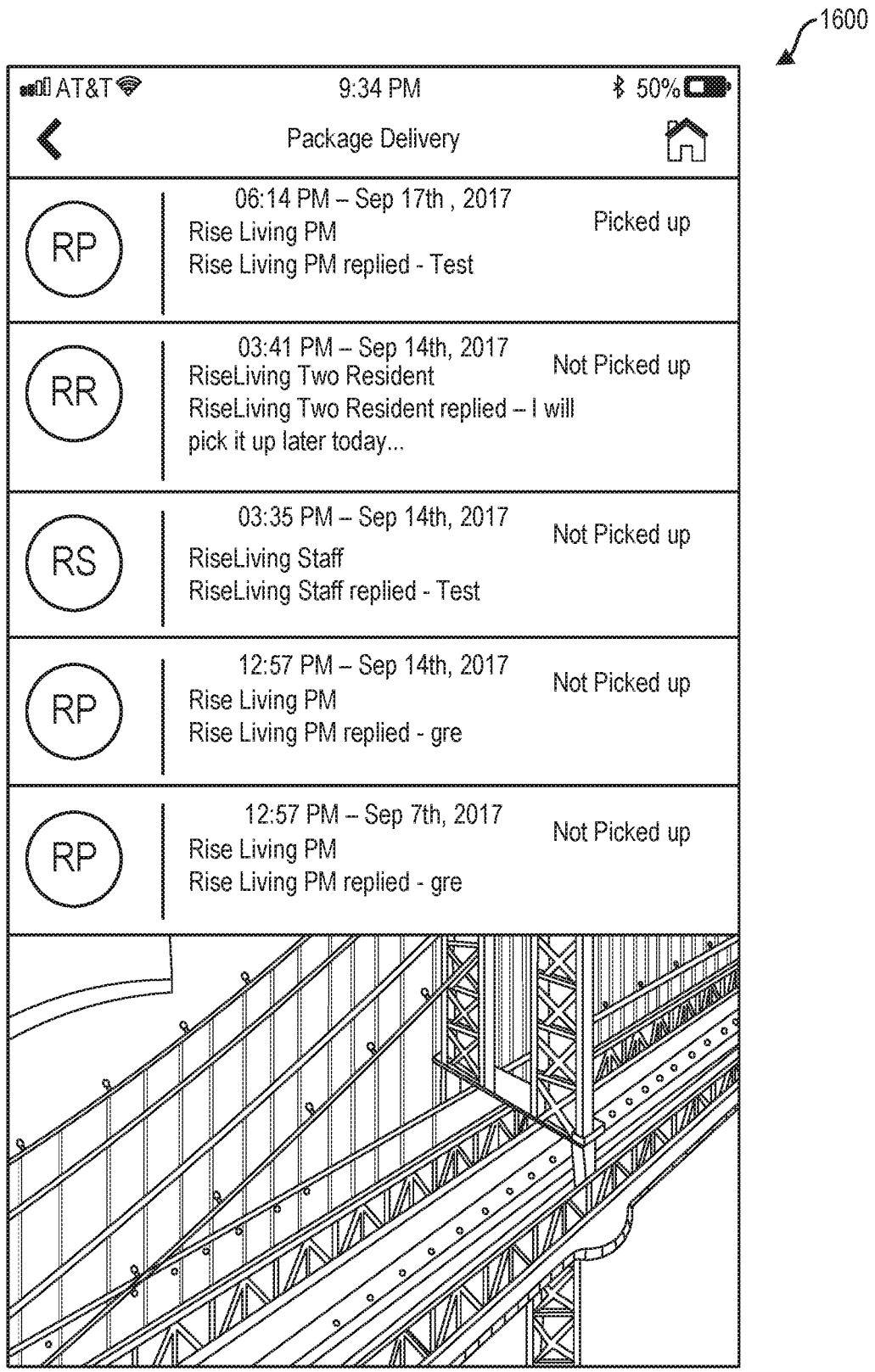

In FIG. 16, the application module 214 can be configured to display a package delivery list 1600 on the user device 204. As described in more detail below, the application module 214 can automatically add a package notice to the package delivery list 1600 to the user device 204 upon scanning in a package label. The application module 214 can be configured to use OCR of the scanned package label to determine the shipped to resident/tenant from the label information. The application module 214 can be configured to provide the package notice to the user device 104 through a push notification, e.g., using TCP/IP, e.g., a real-time notification for the application module 214 to display as soon as the staff scans the package.

Figure 17:
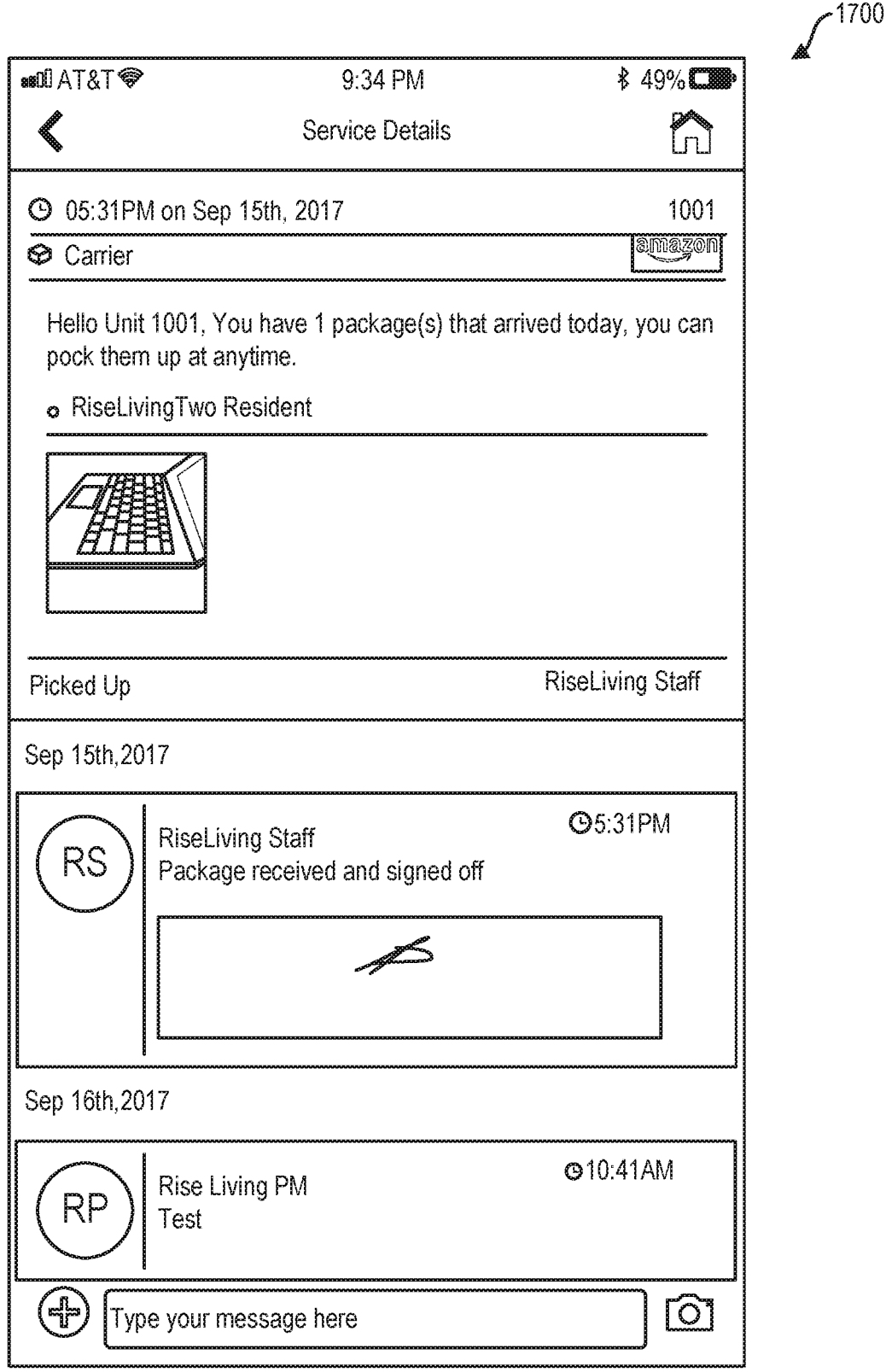

In FIG. 17, the application module 214 can be configured to display package details, e.g., when the user touches the listed package. Package details can include one or more of notes displayed to the user, a date and time that the package was scanned, a carrier, a status of pickup, a signature upon pickup, etc. The application module 214 can be configured to provide real-time communication between the user device 204, the staff device 210 and the portal device 208 on this specific request.

Figure 18:
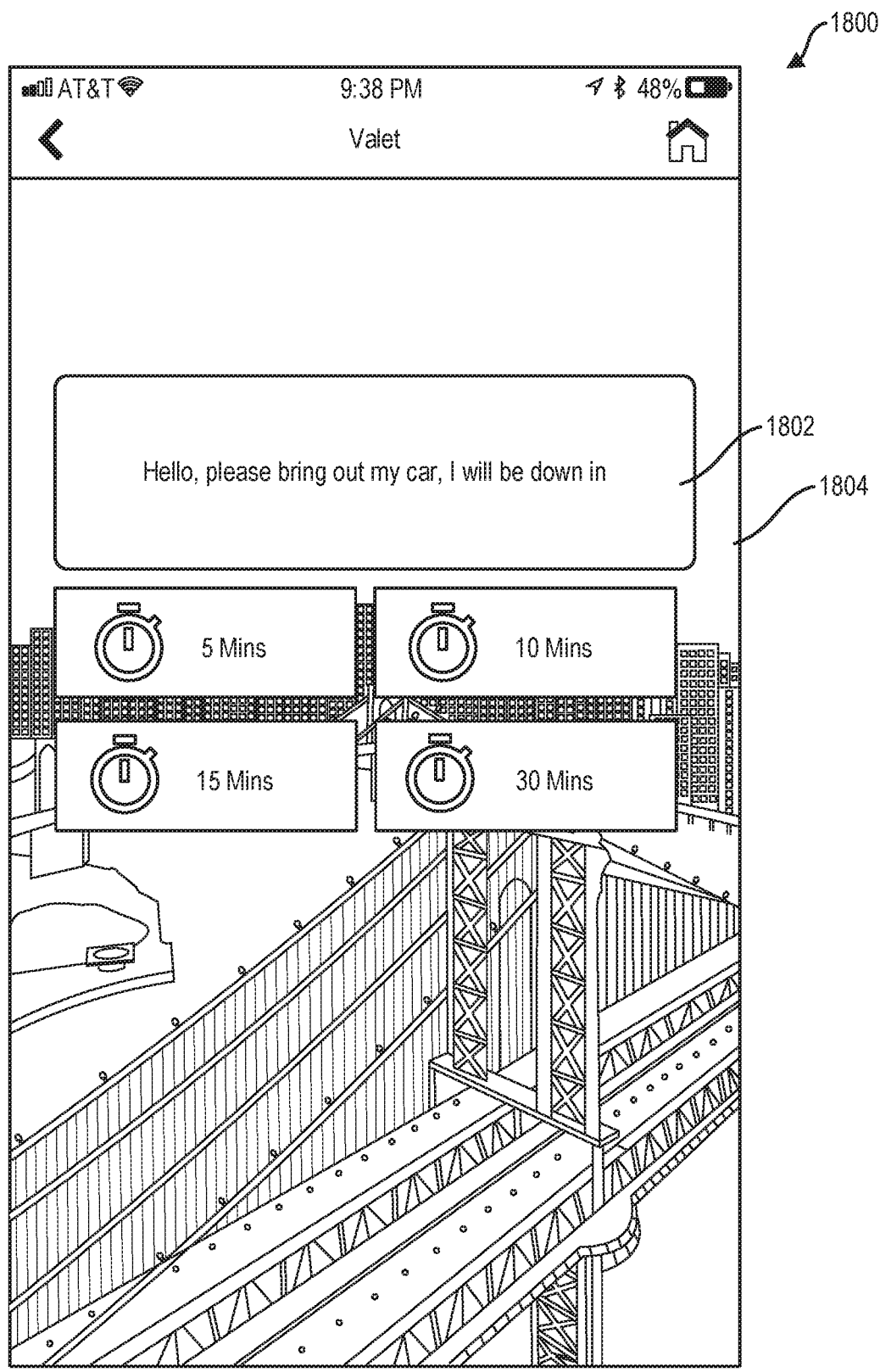
Figure 19:
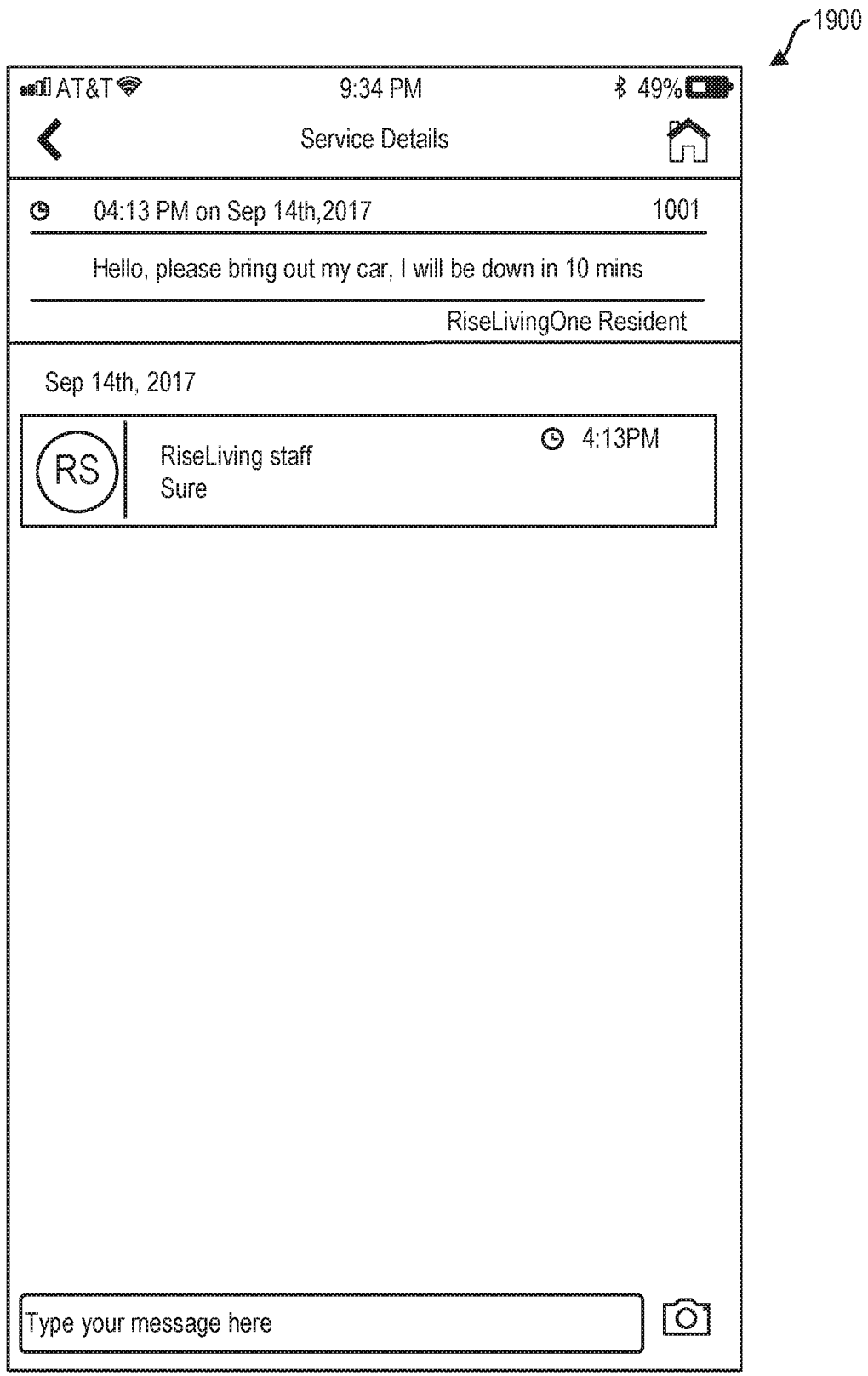

In FIG. 18, the application module 114 can be configured to display a valet request screenshot 1800 on the user device 104. The application module 214 can be configured to provide a field 1802 for the user to include a note to the staff, and time icons 1804 to select a specified time for the valet service. The server 202 can be configured to store the valet service information. The staff is then alerted via a push notification using TCP/IP of the user's valet request. The application module 214 can be configured to provide real-time communication between the user device 204, the staff device 206 and the portal device 208 on this specific request. In FIG. 19, the application module 214 can be configured to display service details 1900 on the user device 204 after the user device 204 sends the valet request.

Figure 20:
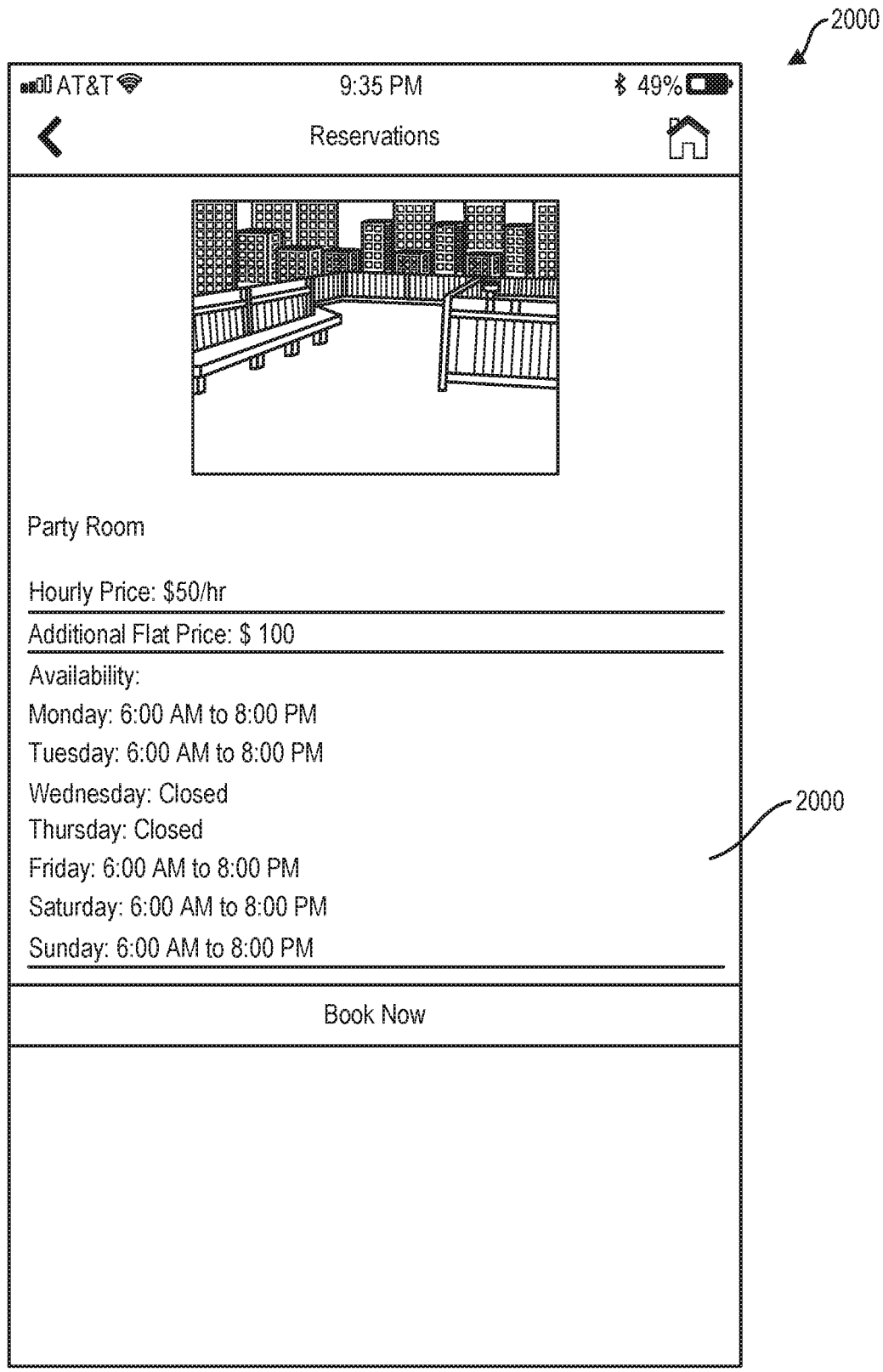
Figure 21:
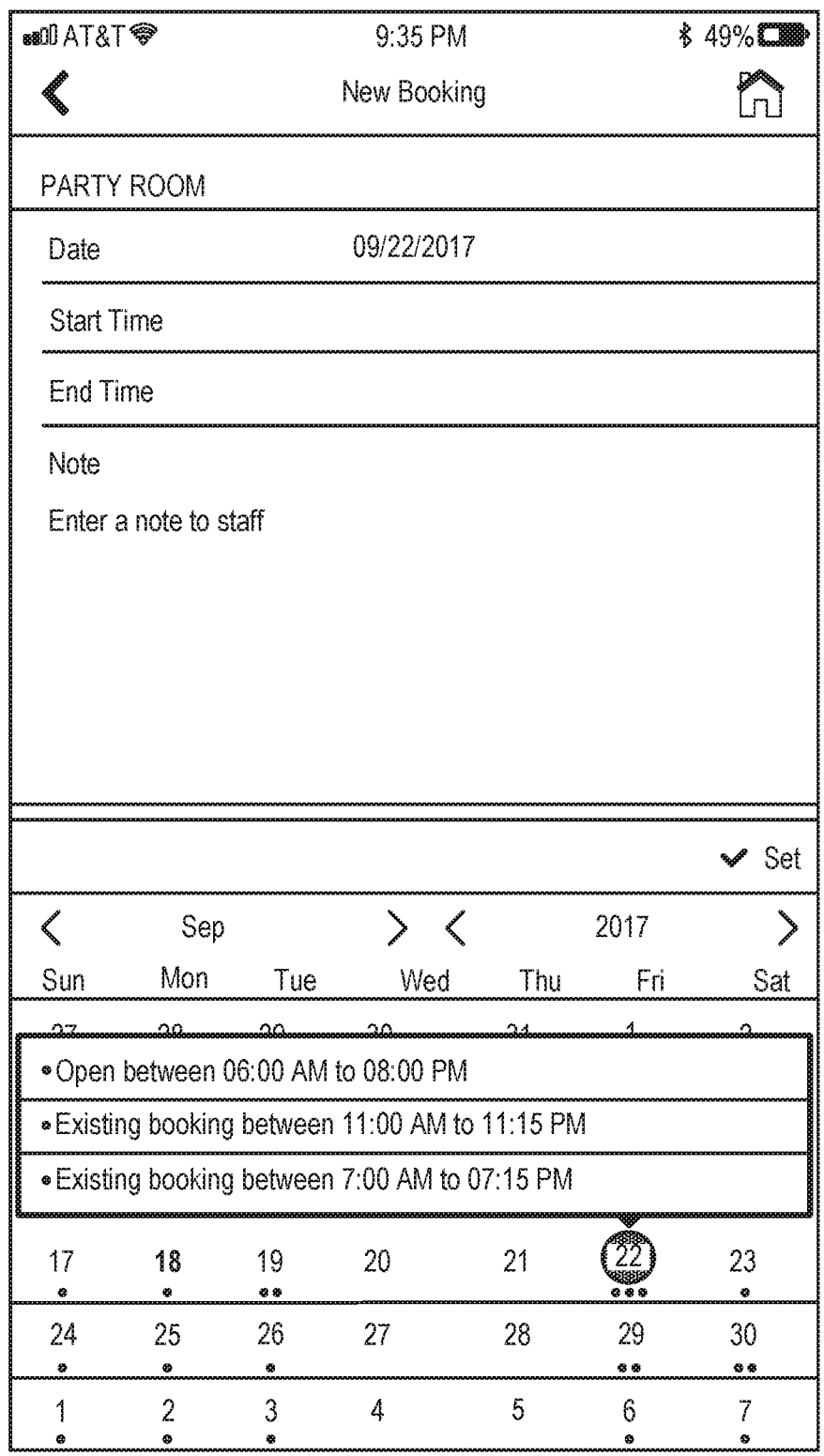

In FIG. 20, the application module 214 can be configured to display a reservation screen 2000 on the user device 214. The user can interact with the reservation screen 2000 to reserve various spaces of the building, including but not limited to a party room, a conference room, etc. The application module 214 can be configured to display reservation information, including but not limited to price, availability, etc., which is set by the manager through the portal device 210 for the building and can be modified at any time. In FIG. 21, the application module 214 can be configured to display a calendar screen 2100 to indicate currently available and booked times, and/or to allow the user to input reservation information to the user device 204, including a date and times.

Figure 22:
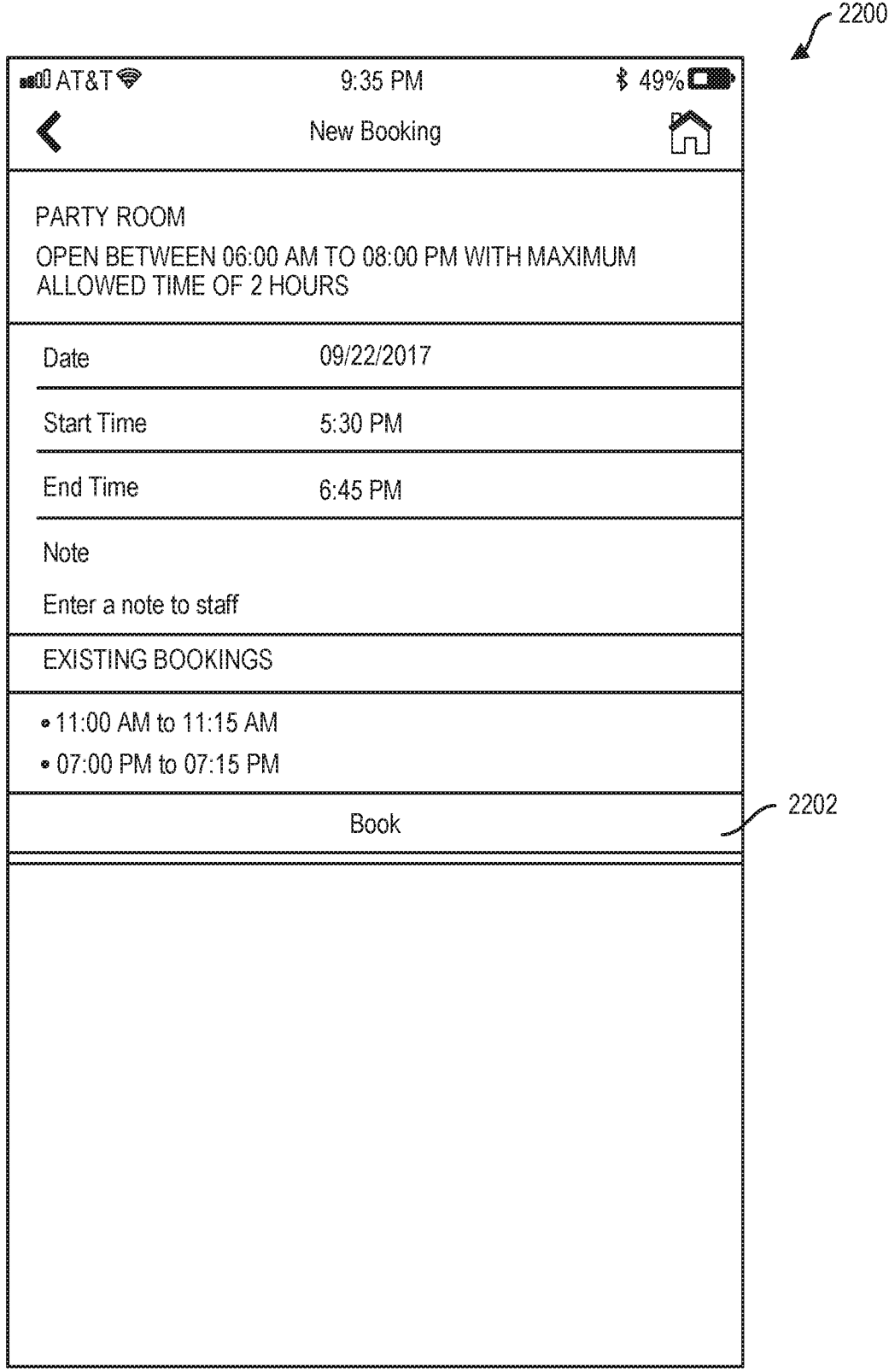
Figure 23:
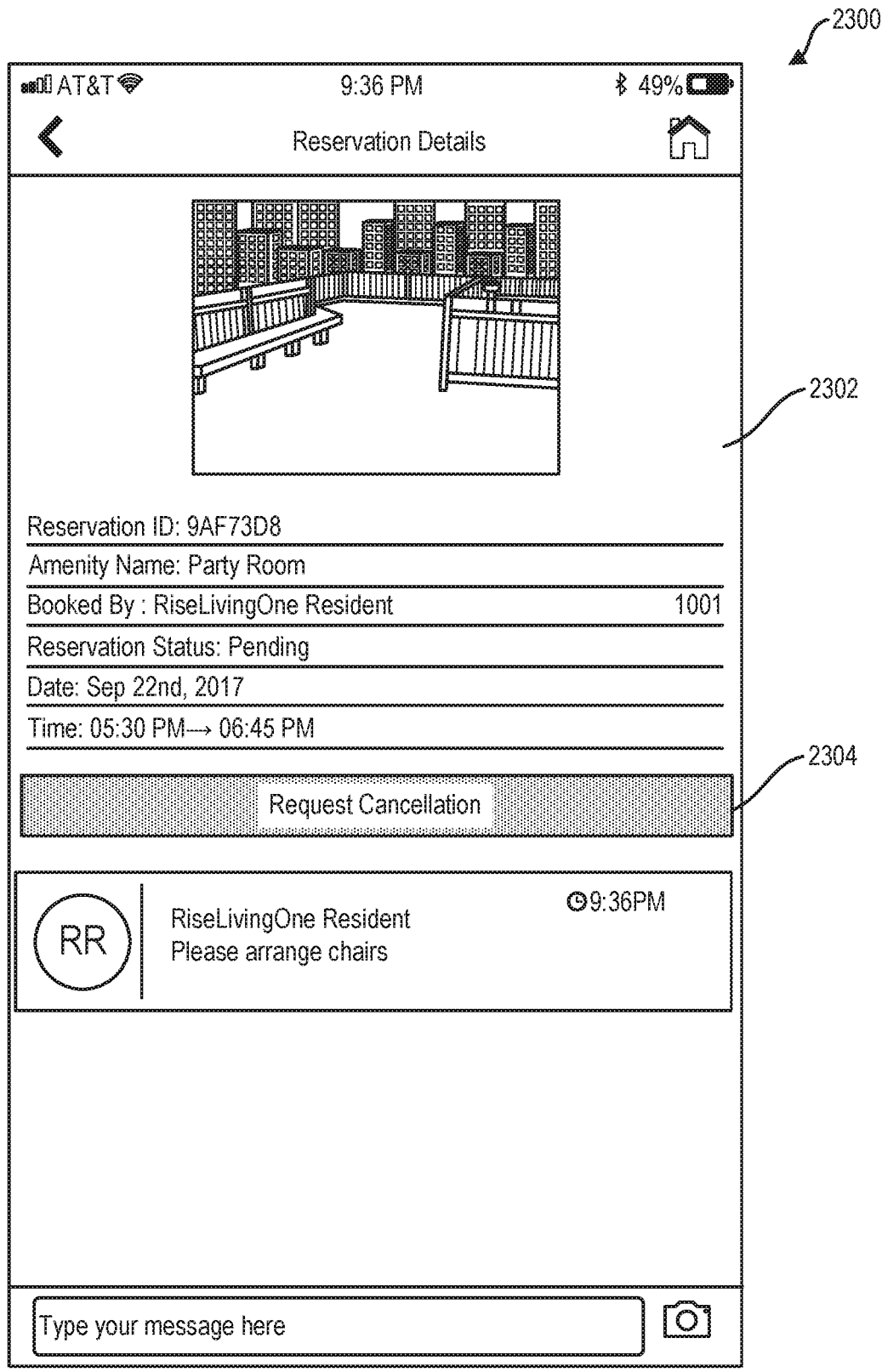

In FIG. 22, the application module 214 can be configured to display a new booking screen 2200 on the user device 204 with a book icon 2202 for the user touch to book the space via the application module 214. In FIG. 23, once the space is booked, the application module 214 can be configured to display a reservation details screen 2300. The reservation details screen 2300 can include reservation information 2302 and a request cancellation icon 2304 for the user to touch to cancel reservation of the space. The application module 214 can be configured to push the reservation request to the staff device 206 and the portal device 208. As described in more detail below, staff through the staff device 206 and/or the manager through portal device 208 can respond to the reservation request by accepting or rejecting the reservation request, and the application module 214 can push the staff member response to the user device 204. The application module 214 can be configured to also provide real-time communication between the user device 204, staff device 206 and the portal device 208 on this specific request.

Figure 24:
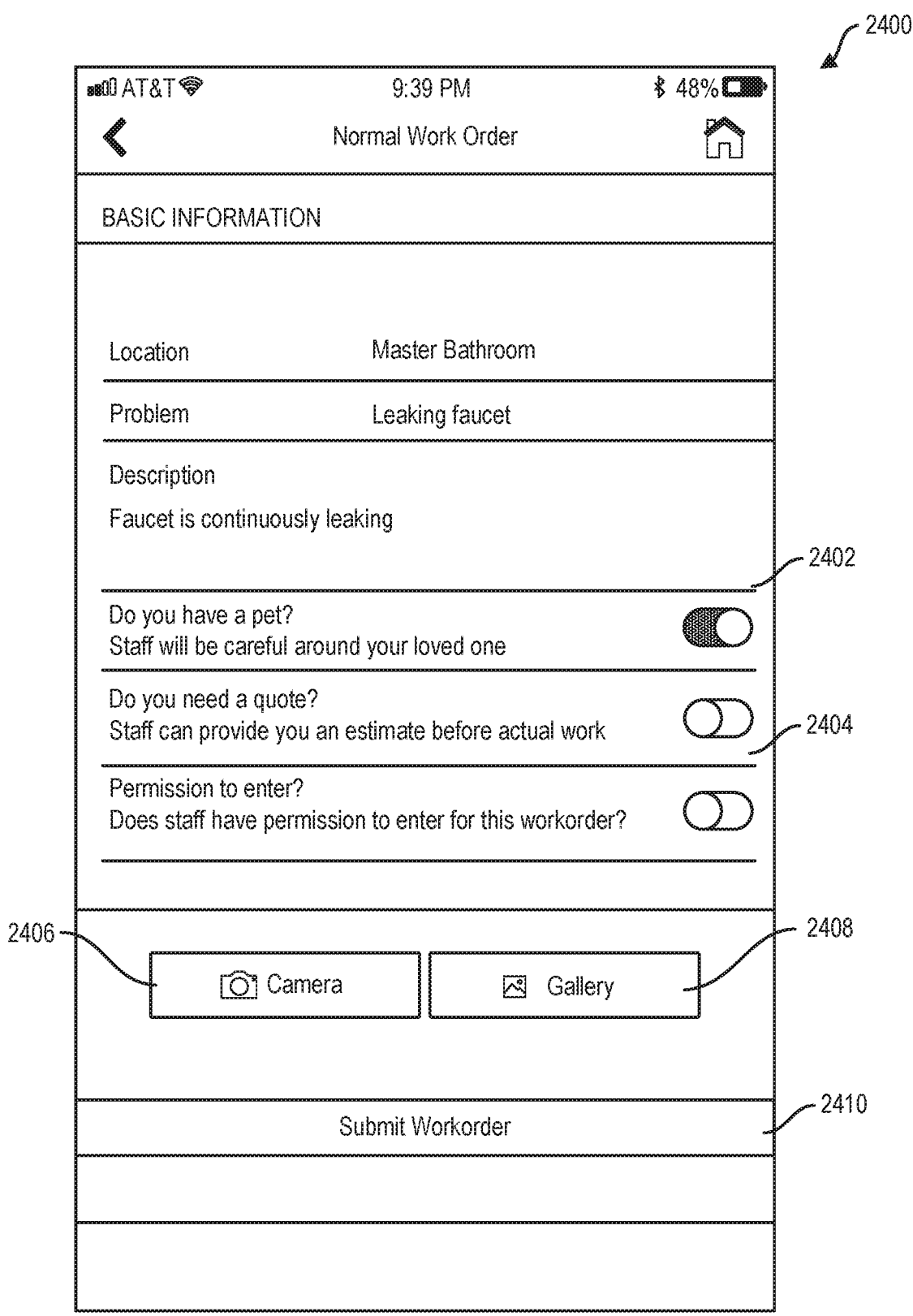

In FIG. 24, the application module 214 can be configured to display a work order screen 2400 on the device 204 for the user. The work order screen 2400 can display fields 2402 for entering work order related information, e.g., location, problem to be fixed, description of problem, etc. The application module 214 can be configured to provide buttons 2404 to the user device 204 for the user to engage to determine if the user has pets, needs a price quote, provide permission to enter the premises, etc. The application module 214 can be configured to also provide icons on the user device 214 for other functionality including camera 2406, e.g., to take a picture of the problem, gallery 2408, e.g., to save the pictures, and submit work order 2410.

Figure 25:
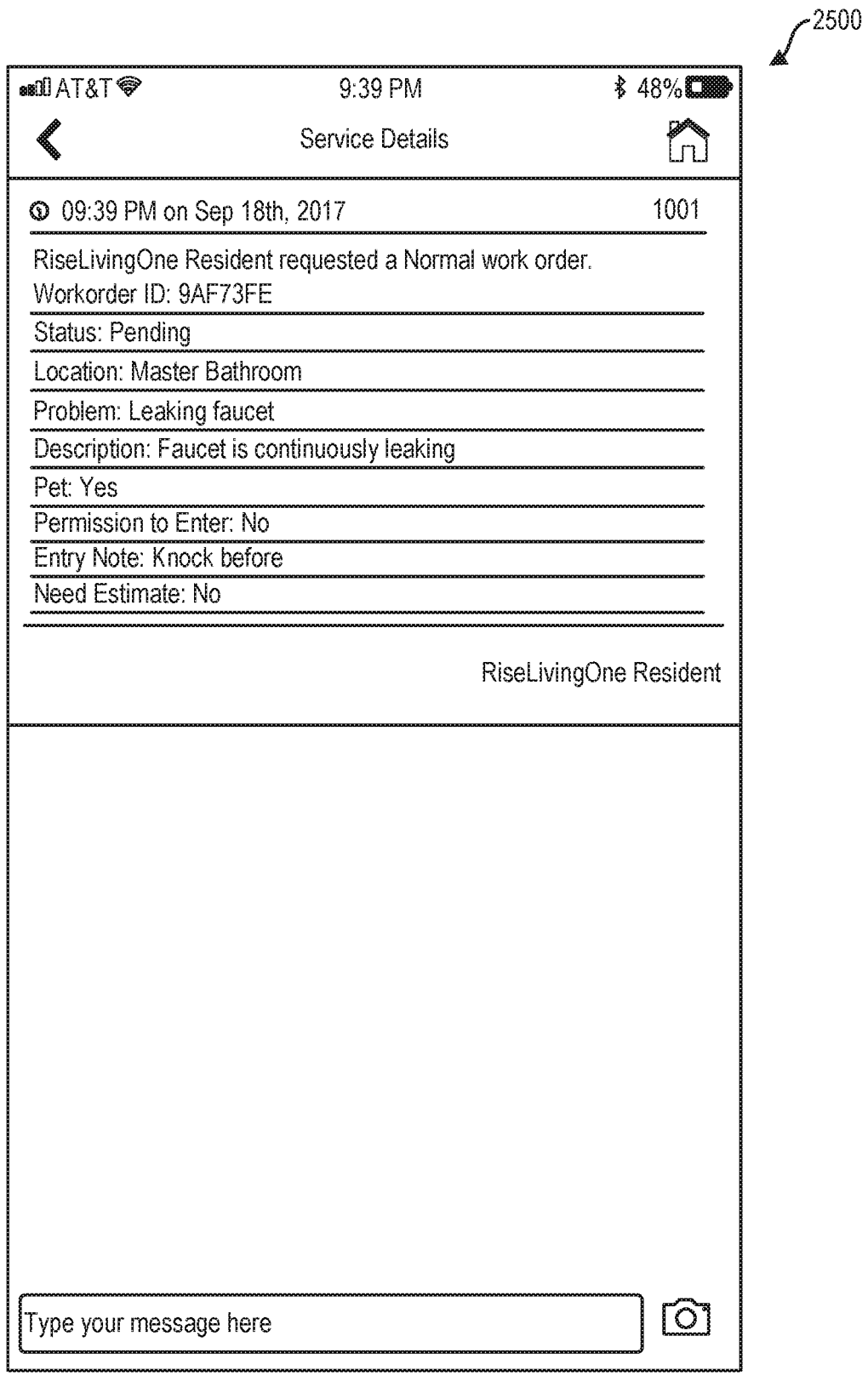

In FIG. 25, the application module 214 can be configured to display a work order summery screen 2500 on the user device 104 for the user. The application module 214 can be configured to send a push notification using TCP/IP to the staff device 206 upon creation of the work order. Therefore, the staff member does not have to search through emails to find the work order. Thereafter, the application module 214 can be configured to make the work order available on the staff device 206 and the portal device 208 so that the staff can start/close/re-open, etc. work orders, assign tasks to other staff members, review status of tasks and communicate directly with other members on those tasks. The application module 214 can be configured to provide real-time communication between the user device 204, the staff device 206 and the portal device 208 on this specific request.

Figure 26:
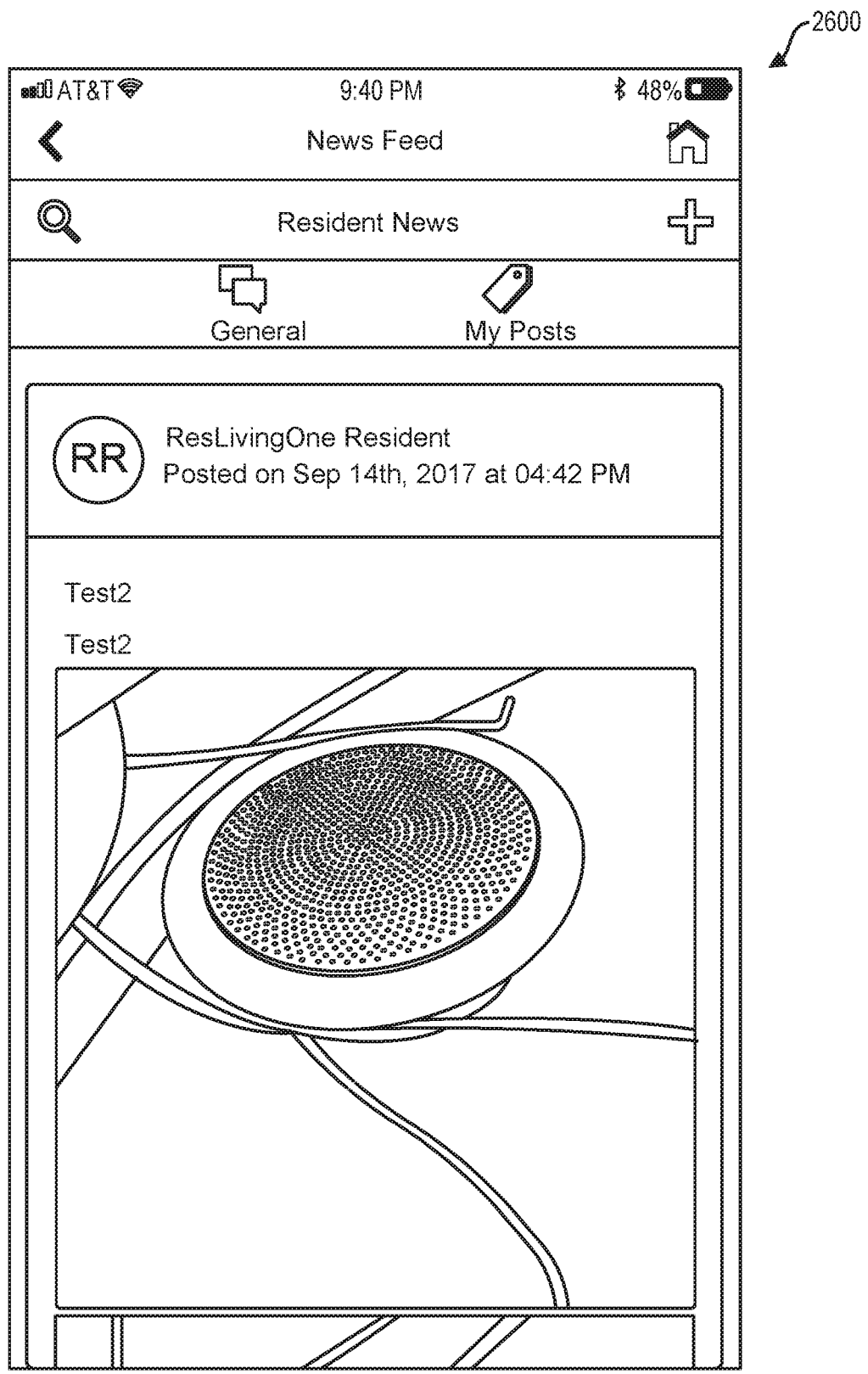
Figure 27:
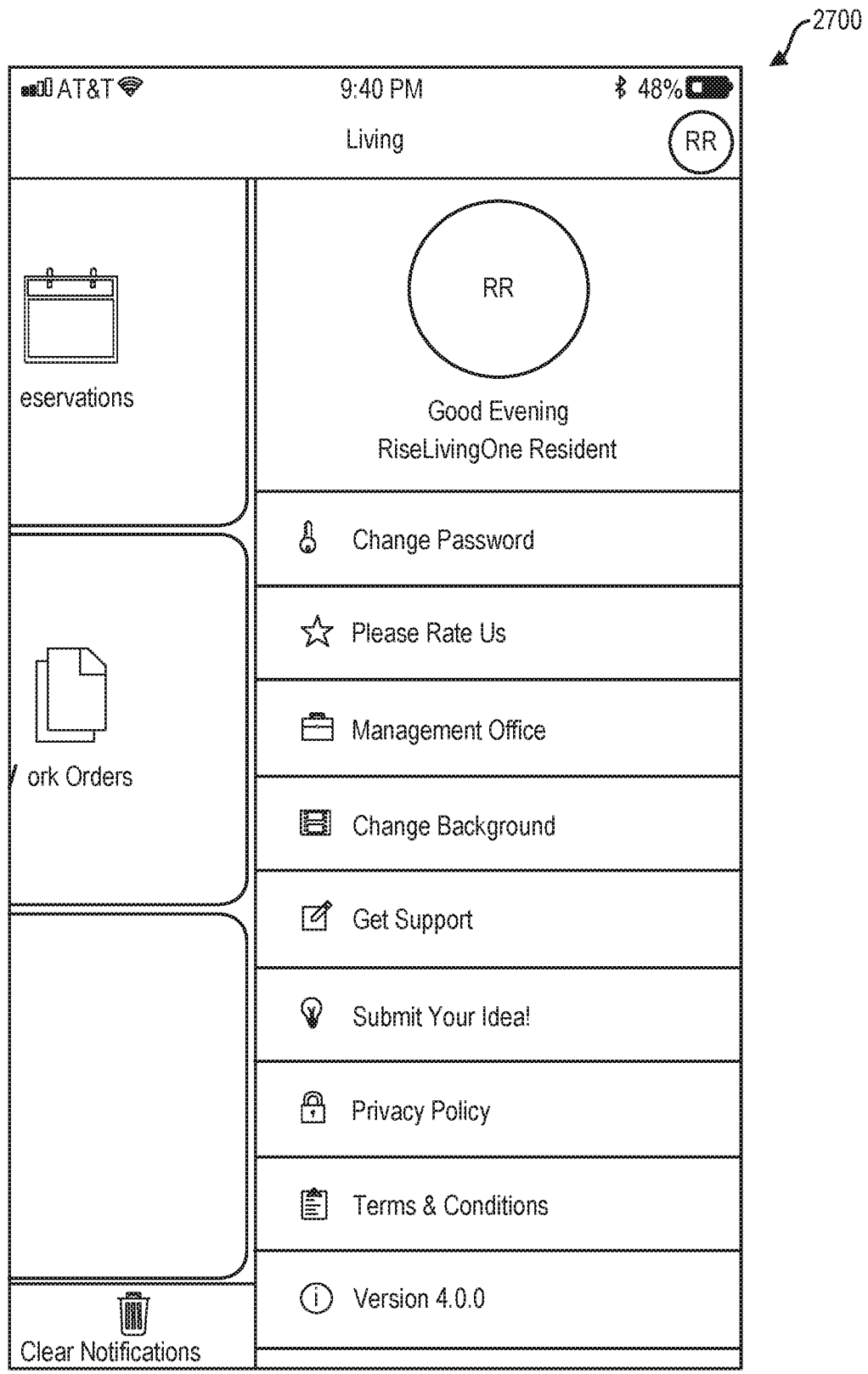
Figure 28:
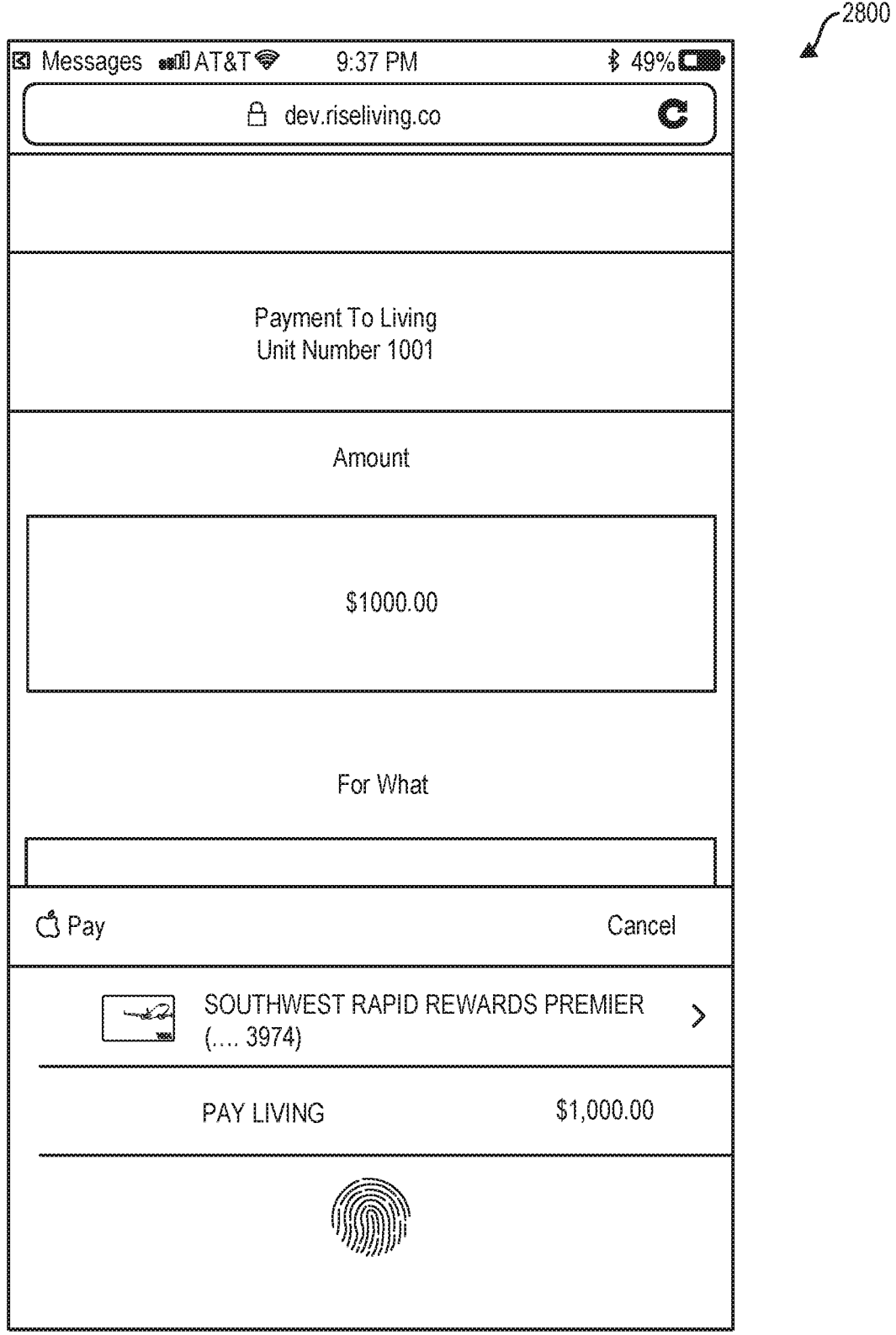

In FIG. 26, the application module 214 can be configured to display a news feed page 2600 on the user device 204 for the user. This newsfeed can be used by the user and other users (e.g., building's tenants, residents, staff and Property Manager) to post and update building news for the whole community. In FIG. 27, the application module 214 can be configured to display a settings screen 2700, including, but not limited to, options for changing the password, providing a rating, contacting the management office, changing background, getting application support, submitting an idea, privacy policy, terms and conditions, and version. In FIG. 28, the application module 214 can be configured to display a rent payment screen 2800. The user can then make payments directly to their property or association, e.g., either through Credit Card, Debit Card, Apple Pay and Bank Transfers via the application module 214. Appropriate fees can be assessed depending on the amount that is being paid. The application module 214 can be configured to connect with an on-line security company, e.g., Stripe, to provide a secure way to make payments.

Figure 29:
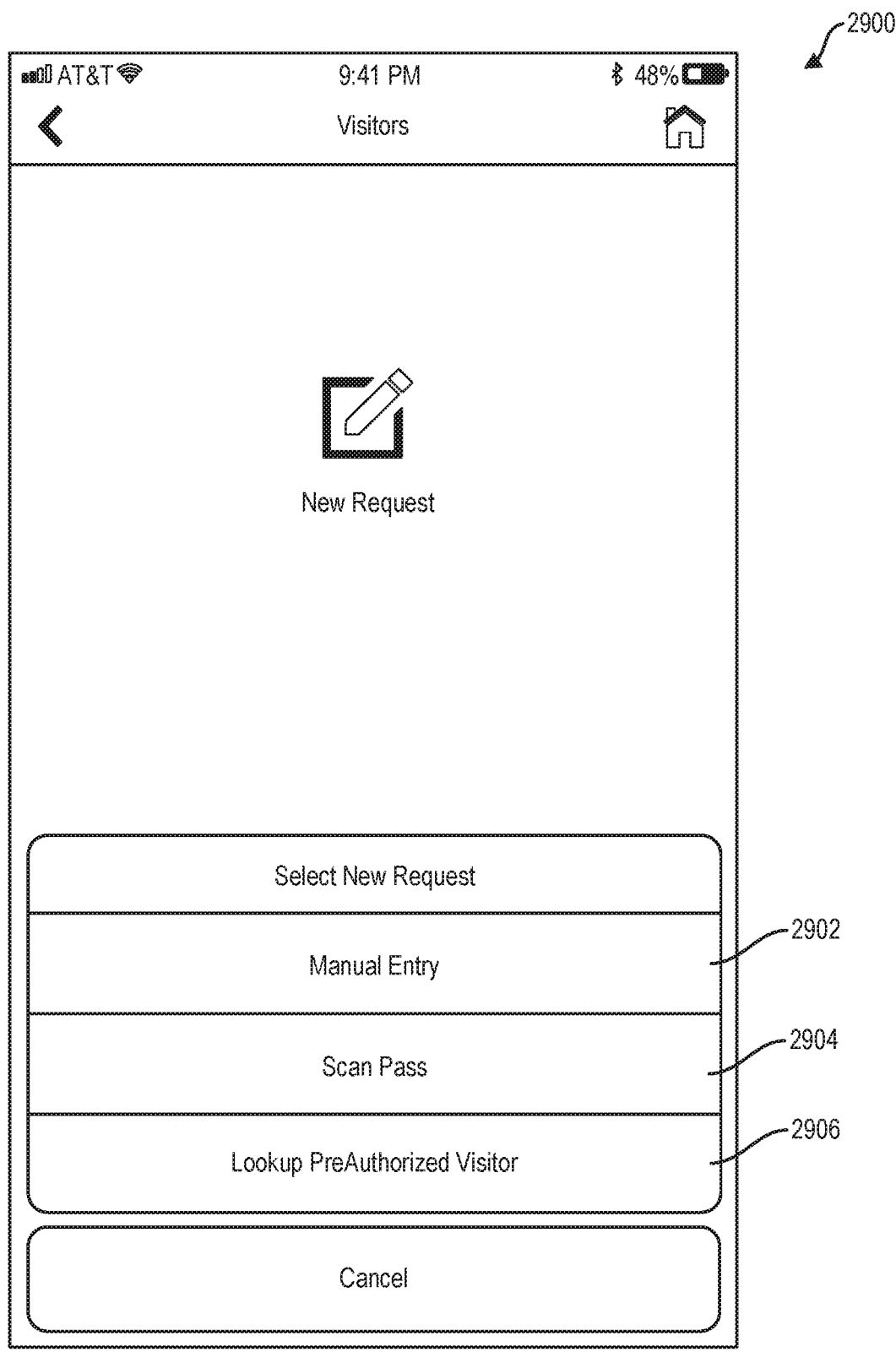
Figure 30:
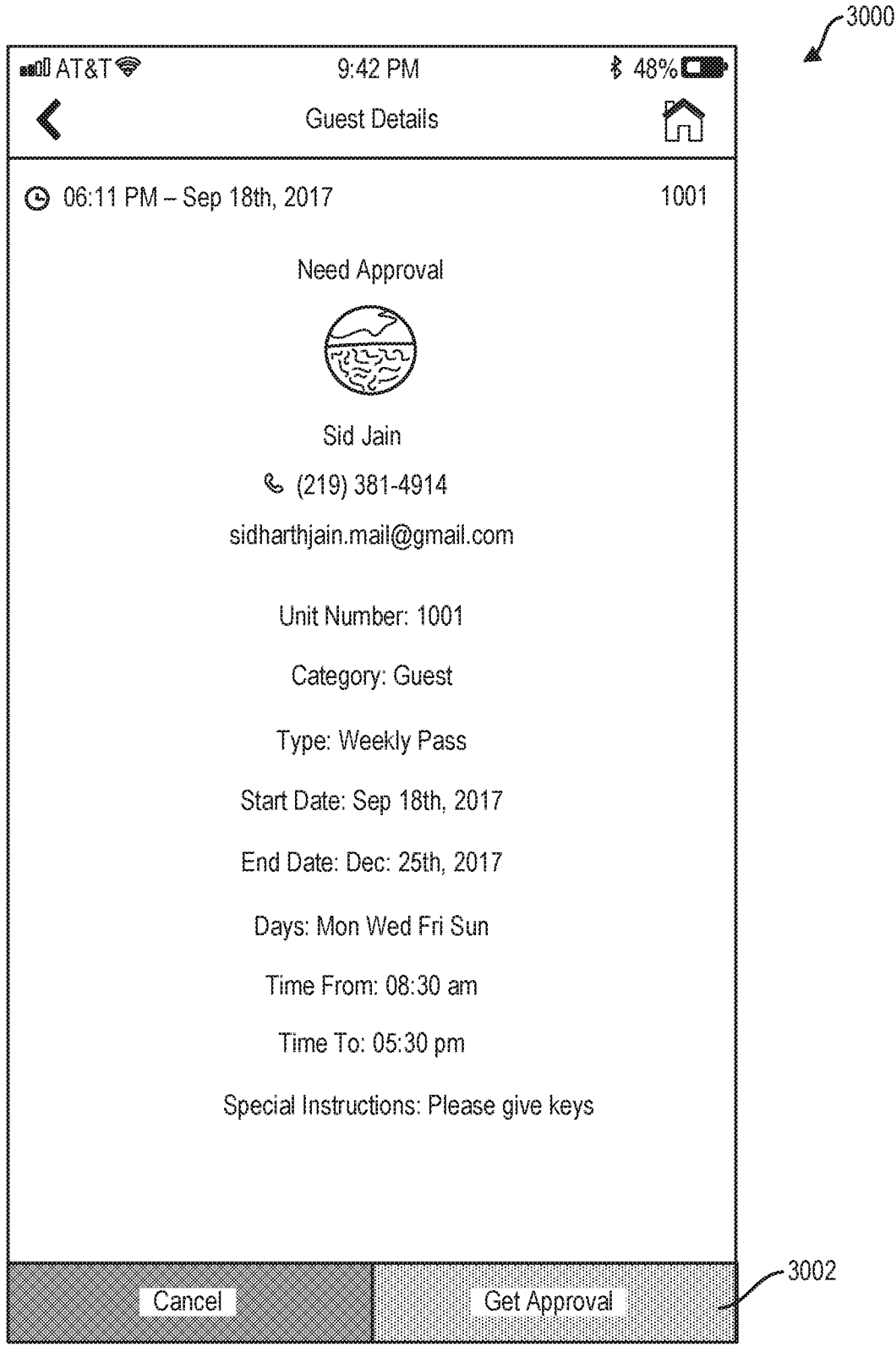
Figure 31:
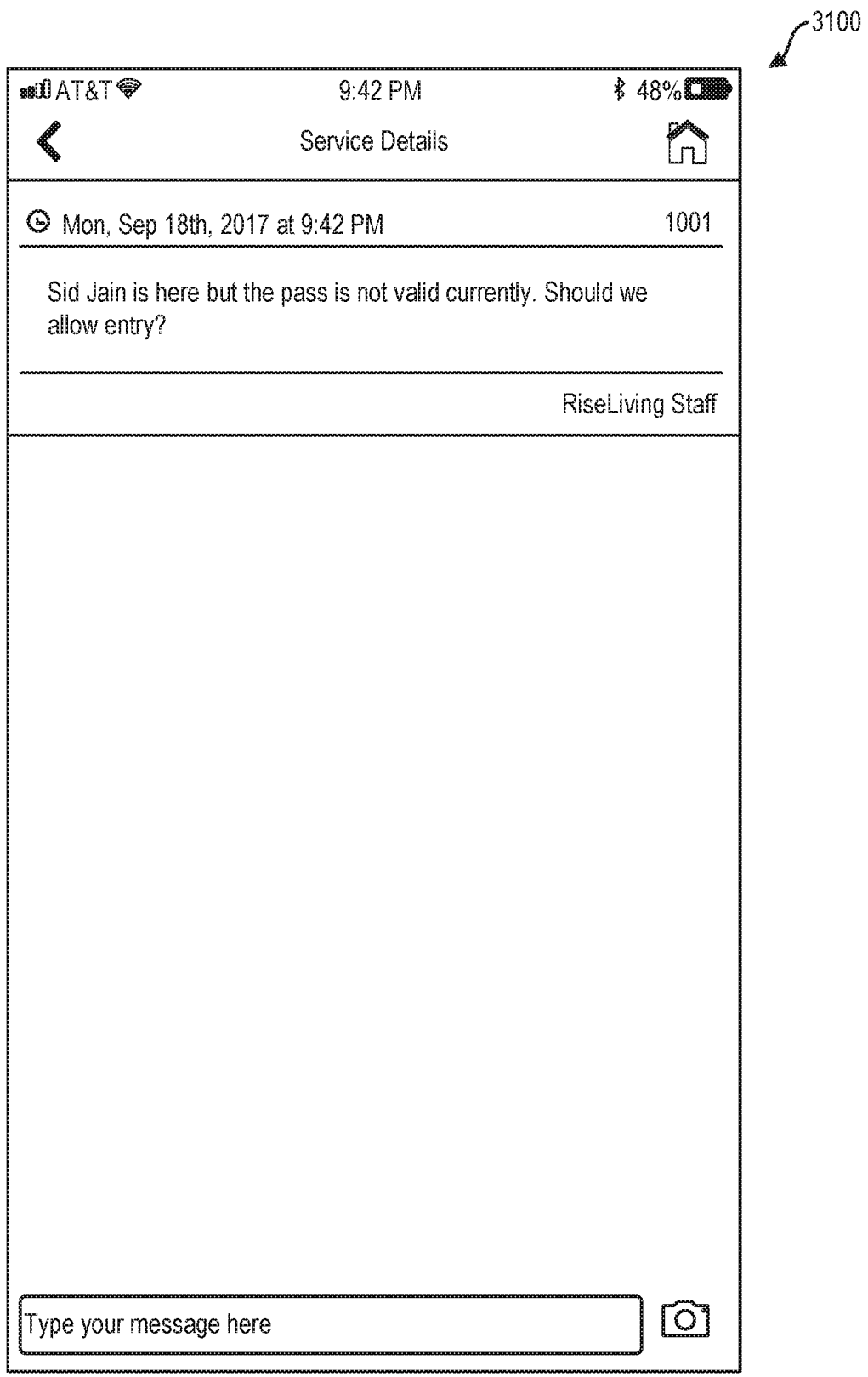

FIGS. 29-44A-C are exemplary screenshots of staff screens displayed by the application module 214 on the staff device 206. In FIG. 29, the application module 214 can be configured to display a visitor screen 2900 to the staff. The application module 214 can be configured to provide the staff with options for manual entry 2902 of guest information, scanning the guest pass 2904 and for looking up pre-authorized visitors 2906. In FIG. 30, the application module 214 can be configured to display a screen 3000 indicating if the entered/scanned guest is approved or needs approval. A color of the screen 3000 may change depending on the status, e.g., green for approved and red for needs approval. The screen 3000 can provide information about the unit number being visited, the type of pass, the start and end times, any special instructions, etc. The application module 214 can be configured to display a get approval button 3002 so that if the guest needs approval, the application module 214 can be configured to open a new screen 3100 in FIG. 28, e.g., to open a two-way communication with the user device 204 to communicate to obtain approval. The application module 214 can be configured to update the building entry log so that there is no need for the guest or staff to enter the details manually. The application module 214 and/or the portal device 208 can be configured to pull up the log any time.

Figure 32:
Figure 33:
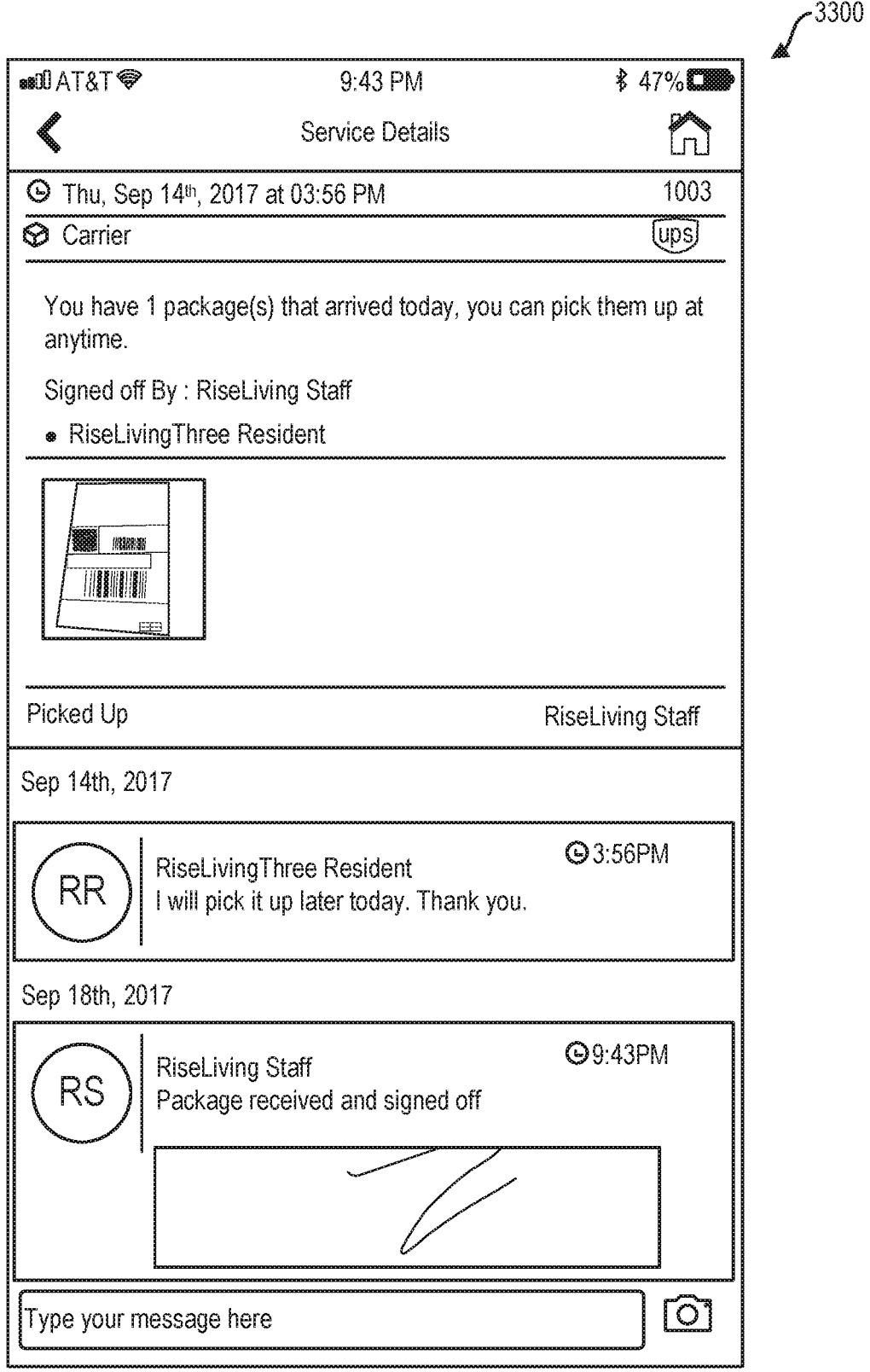

In FIG. 32, the application module 214 can be configured to scan a package label 3200, e.g., using a camera and scan function of the staff device 206. The application module 214 can be configured to display the scanned package 3200 on the staff device 206. In FIG. 33, upon scanning the package label, the application module 214 can be configured to send the label to the server 202 to perform an OCR on the package label and determine the user (e.g., resident or tenant) the package is for. The server 202 can be configured to send the results to the application module 214. If the server 202 successfully found the user device 204, the application can automatically send a message 3000 to the user device 204 via a push notification so that the user device 204 receives the message in real time and the user (e.g., resident/tenant) does not have to search through emails to find the package notification. If the server 202 is not able to find the user, the staff can manually select the user on the application module 214 through the staff device 206 to send a push notification via TCP/IP to the user on the user device 204. The application module 214 can be configured to set a status of the package to unpicked. When the user picks up the package and signs for the package on the staff device 206, the application module 214 can be configured to change the status of the packed to picked up and also send a push notification via TCP/IP to all user devices 204 alerting them that the package has been picked up. The application module 214 can be configured to display unpicked and picked up identifiers. This can help the staff easily identify which packages have been picked up and which have yet to be picked up.

Figure 34:
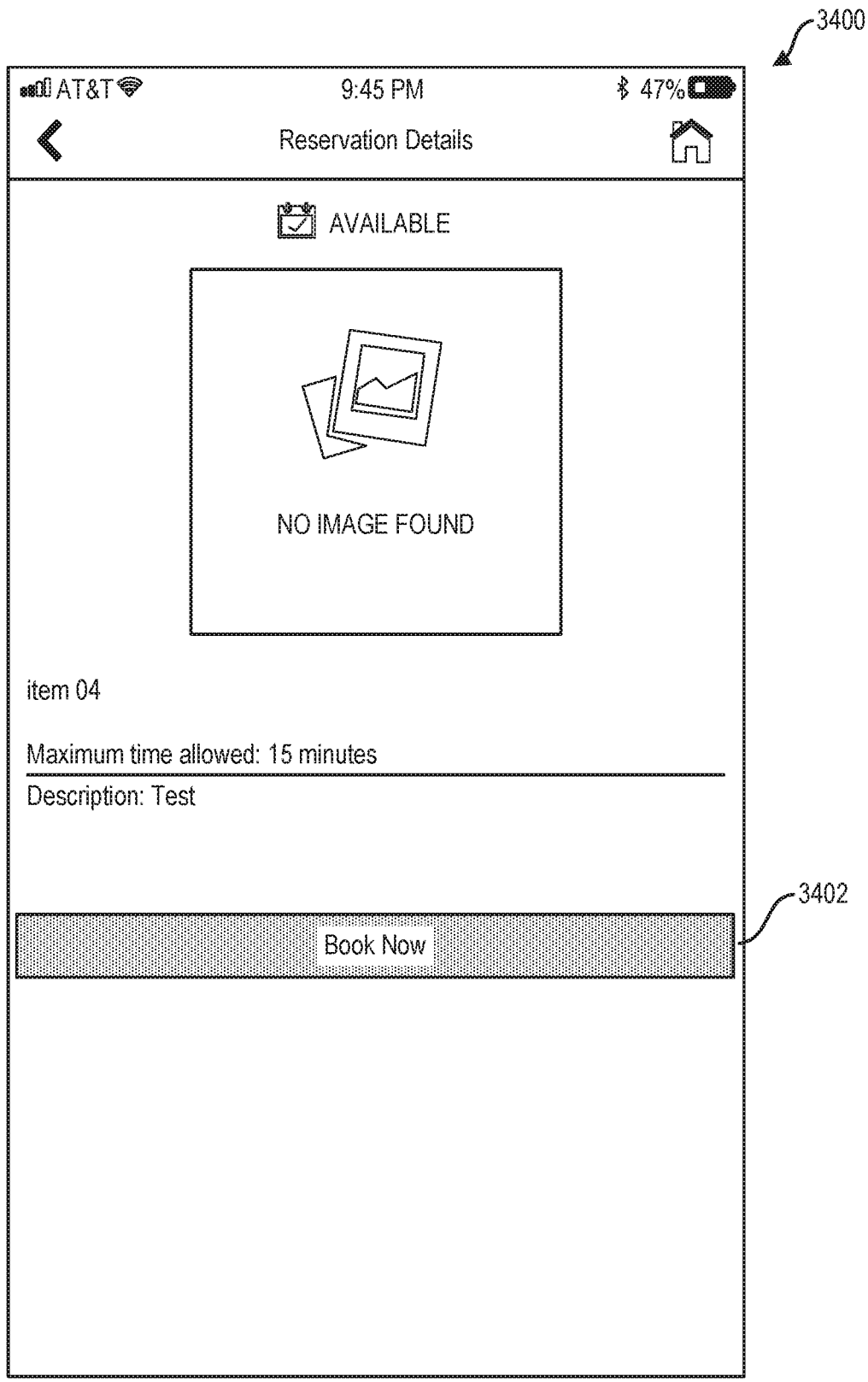
Figure 35:
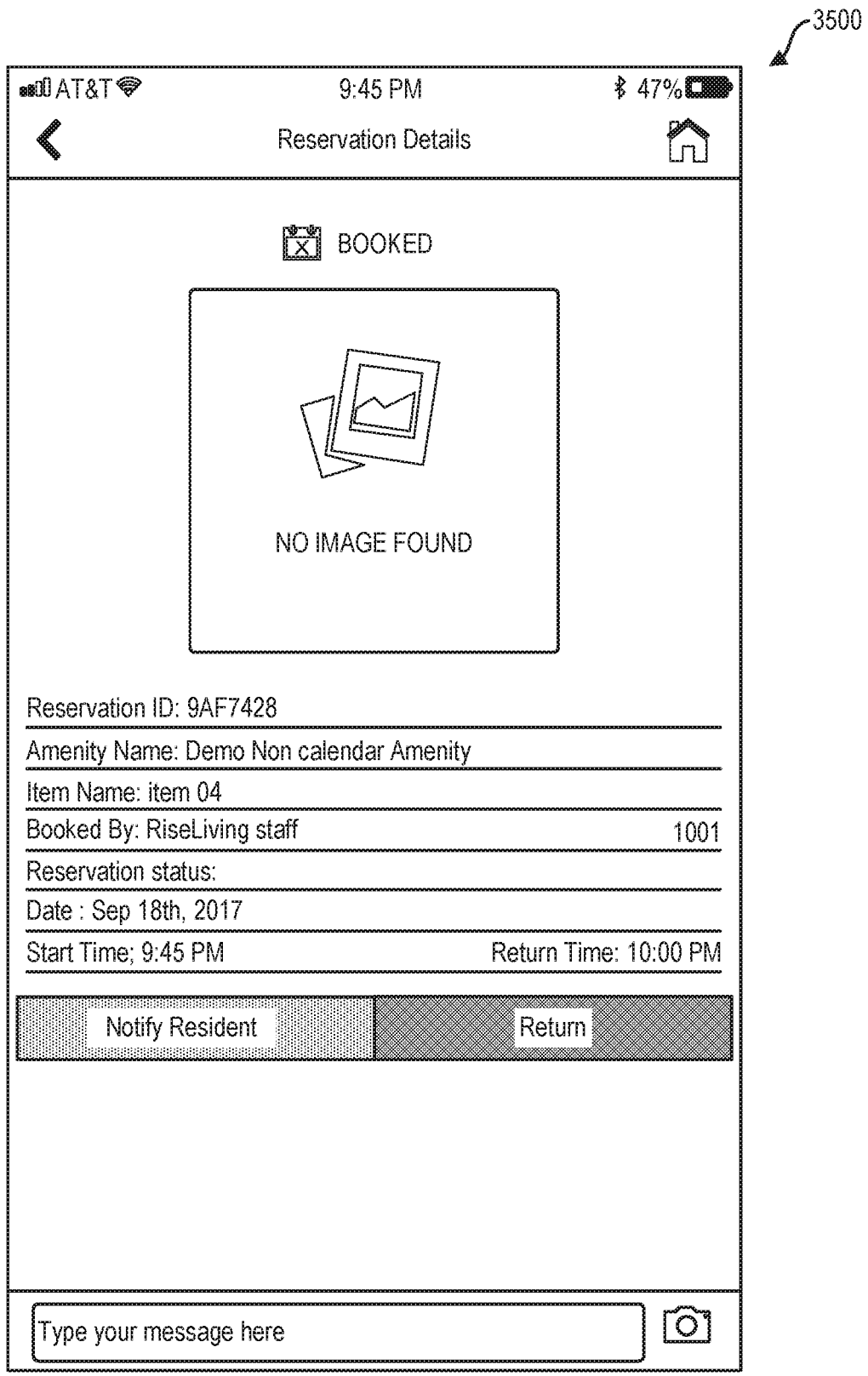

In FIG. 34, the application module 214 can be configured to display a new reservation check in/check out screen 3400 to the staff device 206. The screen can include a book now button 3402. Once the book now button is touched, the reservation item is "checked out" for that user device 204 and cannot be reserved by other user devices 204. All user devices 204 of the unit also get a push notification through TCP/IP on their user devices alerting them that an item has been checked-out against their unit number. In FIG. 35, the application module 214 can be configured to display a reservation detail screen 3500. The staff device 206 can be configured to accept or reject the reservation request, and the application module 214 can be configured to send a push notification via TCP/IP to the user device 104 depending on the response. The application module 214 can be configured to provide real-time communication between the user device 204, the staff device 206 and the portal device 208 on this specific request.

Figure 37:
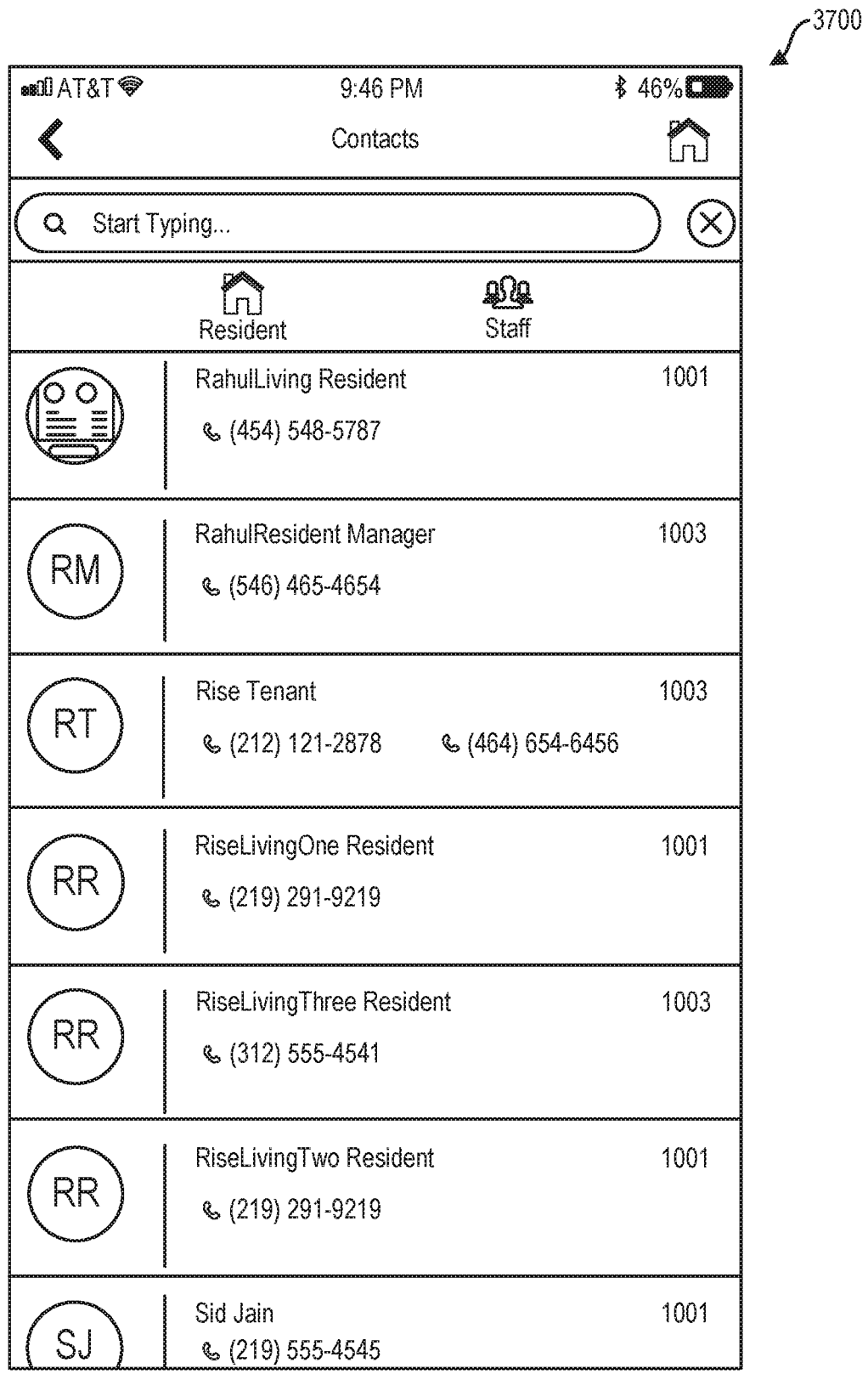

In FIG. 36, the application module 214 can be configured to display a list of existing reservations on the screen 3600. The server 202 can be configured to store the reservation information to be displayed and communicate the reservation information to the staff device 206. In FIG. 37, the application module 214 can be configured to display a screen 3700 with a list of contacts. If the staff members enters anything in the search bar, the list only shows records which matches that entry. If the list is being viewed on the staff device 206 which is capable of making phone calls, then touching the phone number automatically calls that number.

Figure 38:
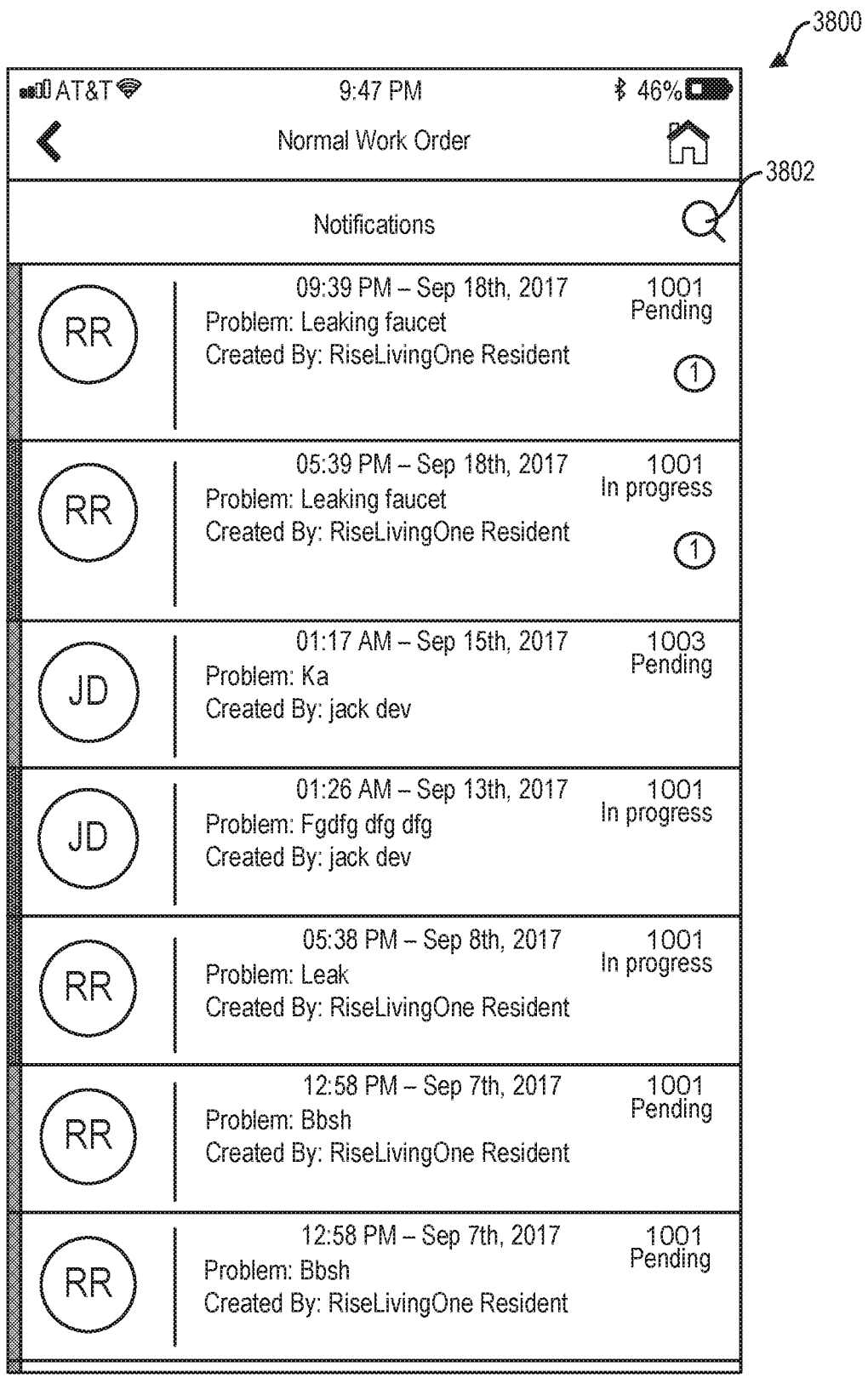

In FIG. 38, the application module 214 can be configured to display a screen 3800 with a list of work orders. The staff members can quickly look up open work orders, unconfirmed reservations, number of unpicked packages etc. In the list view, the application module 214 can be configured to display services in certain states. The application module 214 can be configured to provide a filter icon 3802. If the staff member wants to see service in additional states, the staff member can engage the filter icon 3802 and make a desired selection. In some examples, the application module 214 can be configured to cache the list on the staff device 206 for quick access.

Figure 39:
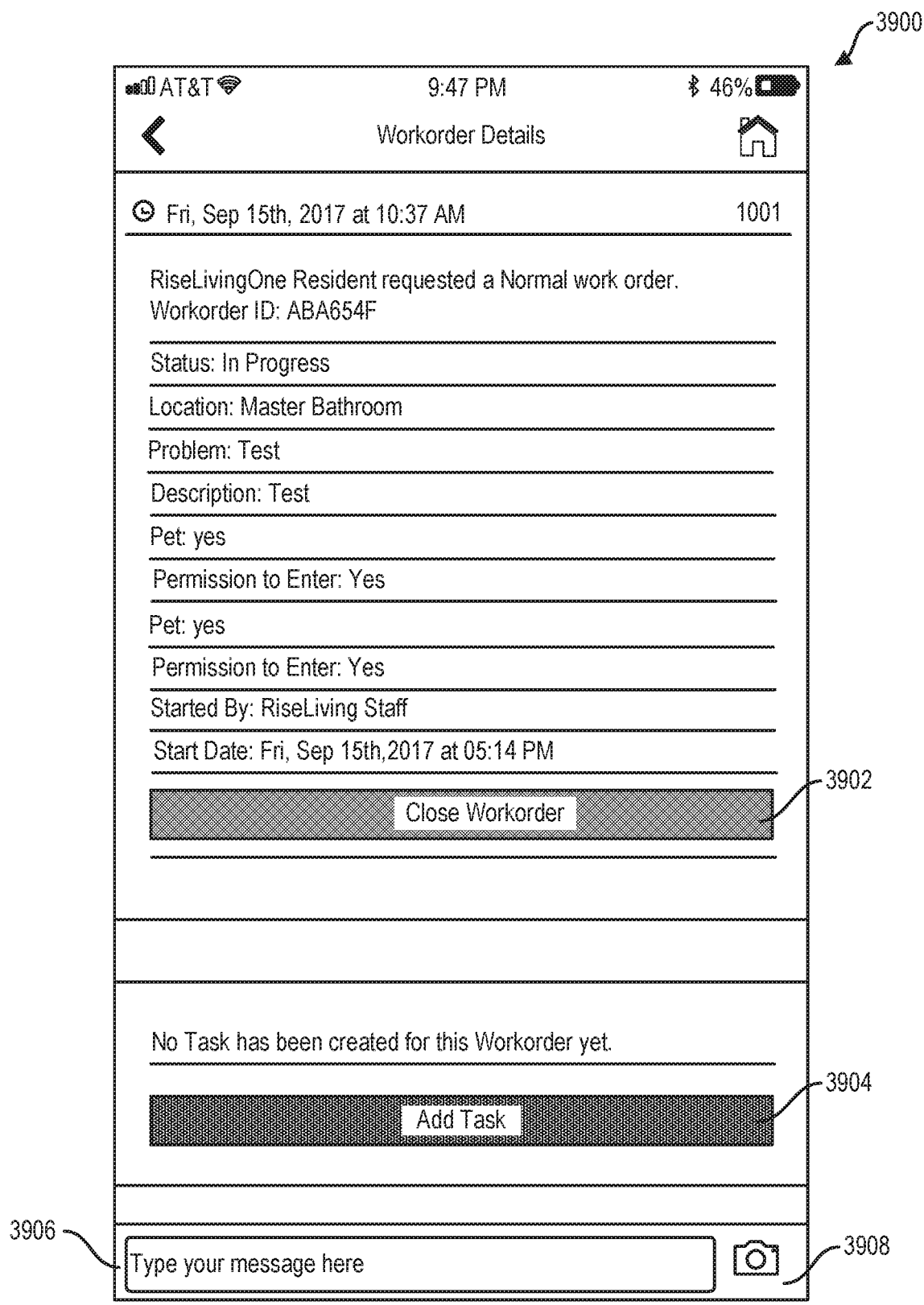

In FIG. 39, the application module 214 can be configured to display a screen 3900 with work order details. The member can start working on the work order by clicking on a start work order button. When the work order is started, the application module 214 can be configured to send the user on the user device 204 a push notification and/or an email that the work order has started. The application module 214 can be configured to display other buttons, e.g., a close work order button 3902 and an add task button 3904 for closing work order and add tasks to existing work orders, respectively. Tasks can include estimates and work tasks. The estimate task can be used to provide a quote to the user before doing any actual work. Once the user approves the estimate, staff can then add the work task to assign the actual work. In some examples, the estimate task is not required to add a work task. The task can be added directly without an estimate, e.g., for rental buildings.

The application module 214 can be configured to display a field 3906 for typing messages to the user regarding the work order, and a camera icon 3908 for taking and sending a picture to the user at the user device 204. The application module 214 can be configured to provide a two-way communication channel between the user device 204 and the staff device 206 for sending/receiving messages and pictures. Therefore, the users do not have to search through emails regarding the work order, and the application module 214 can be configured to display work order information and updates in real time.

Figure 40:
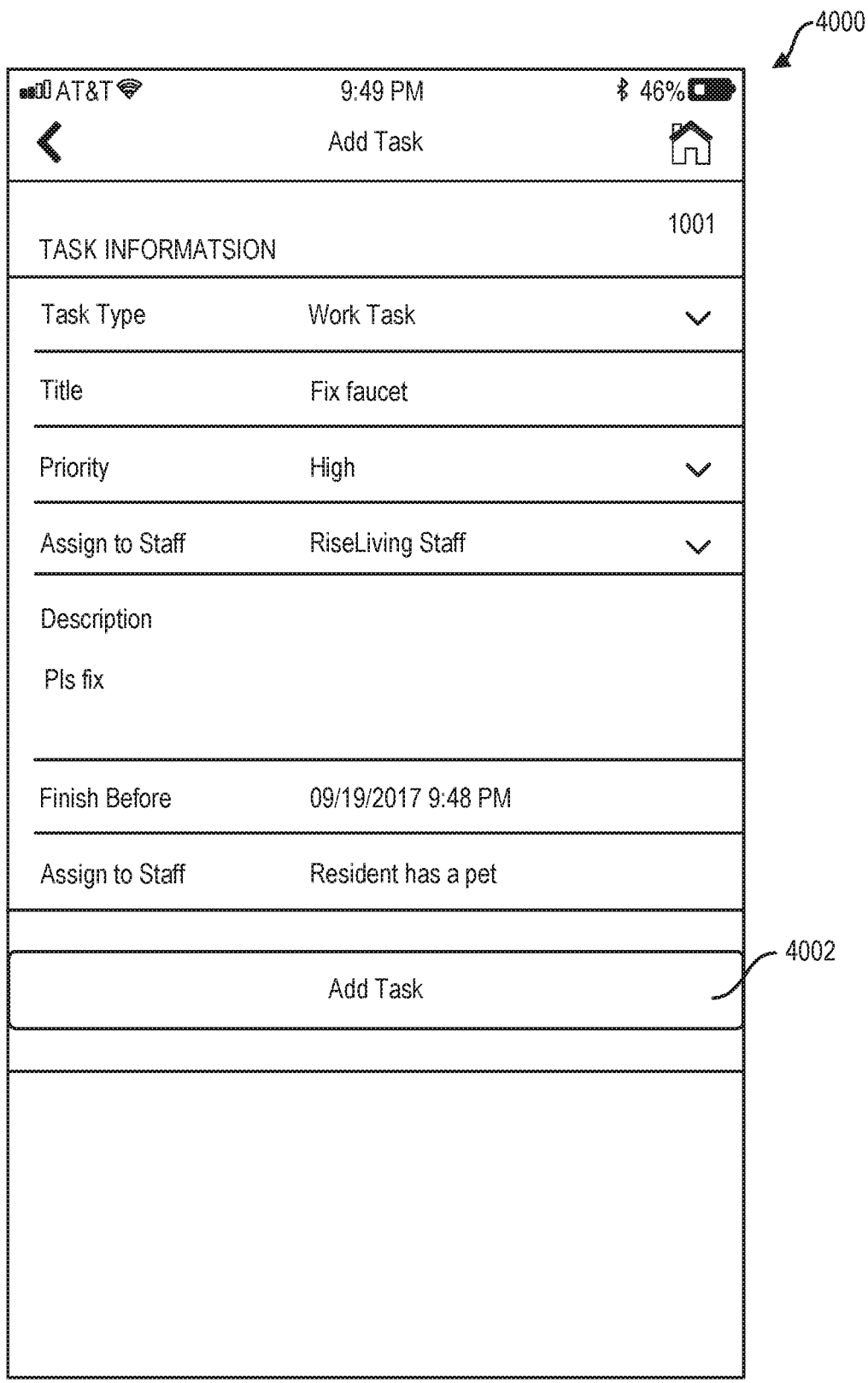
Figure 41:
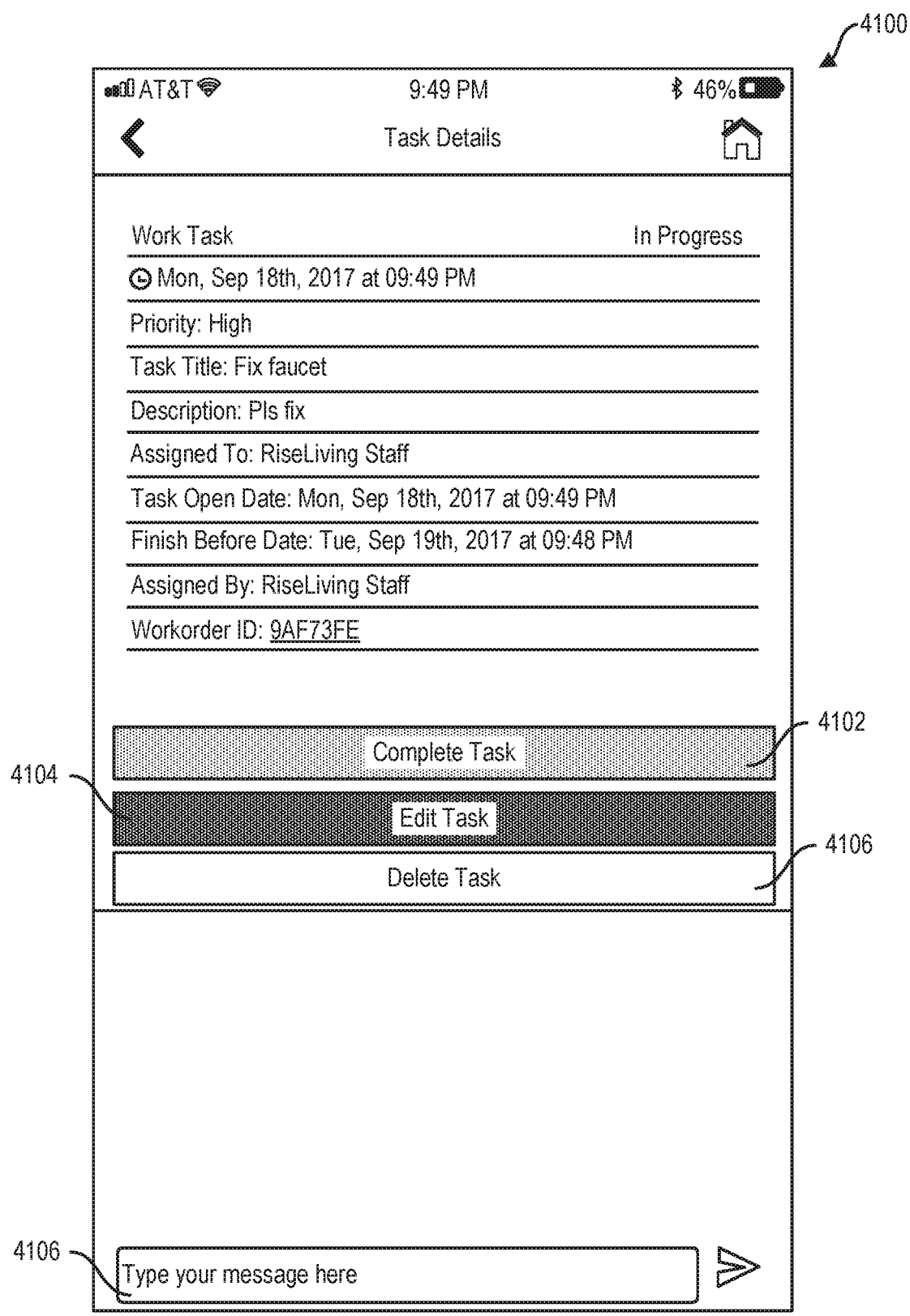
Figure 42:
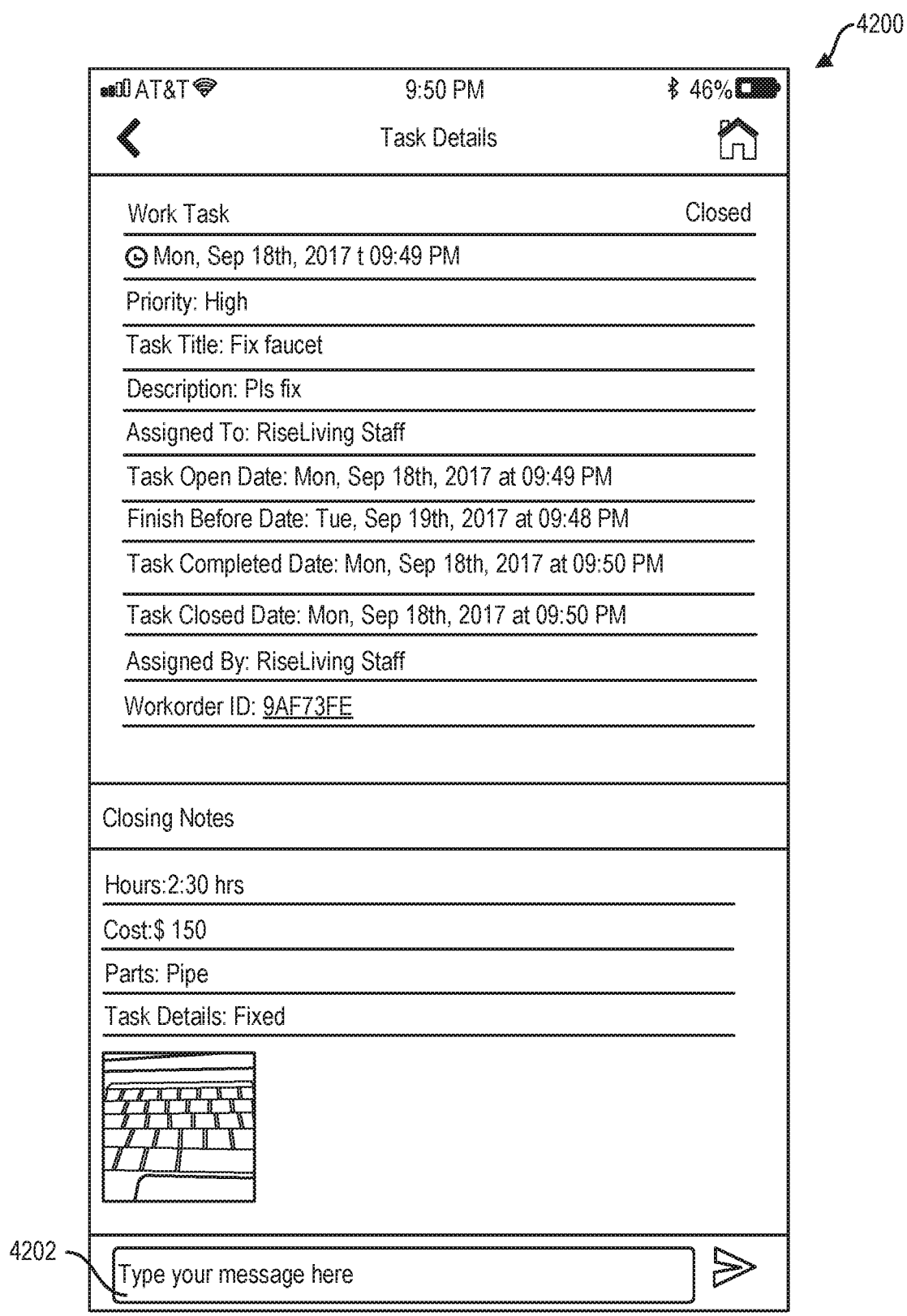
Figure 43:
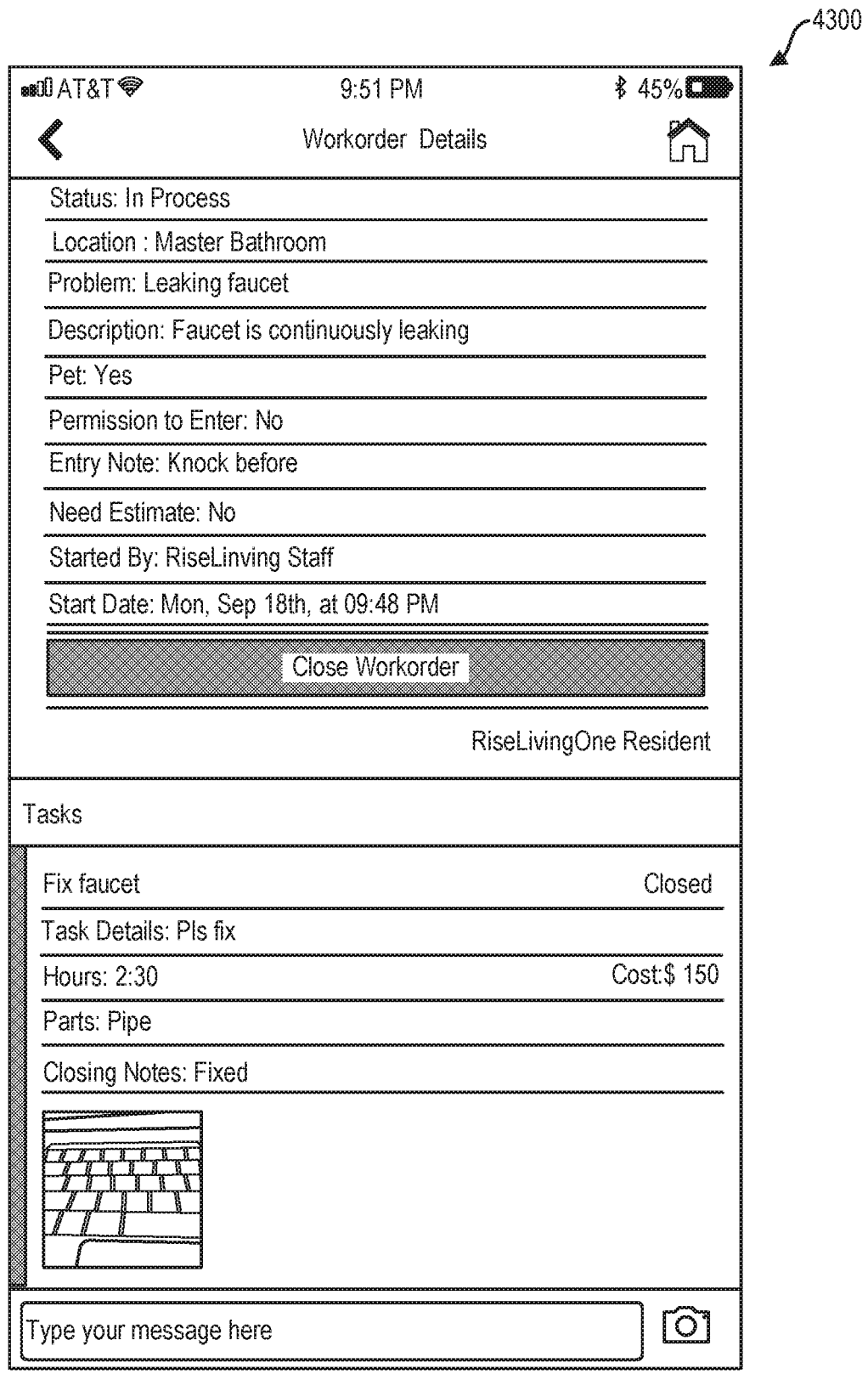

In FIG. 40, the application module 214 can be configured to display an add task screen 4000 with an add task button 4002 for adding tasks to existing work orders. In FIG. 41, the application module 214 can be configured to display a task details screen 4100 with a complete task button 4102, an edit task button 4104 a delete task button 4106 and a message field 4108. In FIG. 42, when the task is completed, the application module 214 can be configured to display task completed and closed screen 4200 with details of the completed task. The application module 214 can be configured to send the completed task information to a device of a work order manager to review and approve of the completed task, or have the staff re-do the task as needed. The application module can be configured to open a two-way communication between the managers and/or staff using the text field 4202. FIG. 43 shows more information of the task completed and closed screen 4300. Once all the tasks are completed the work order can be completed.

Figure 44A:
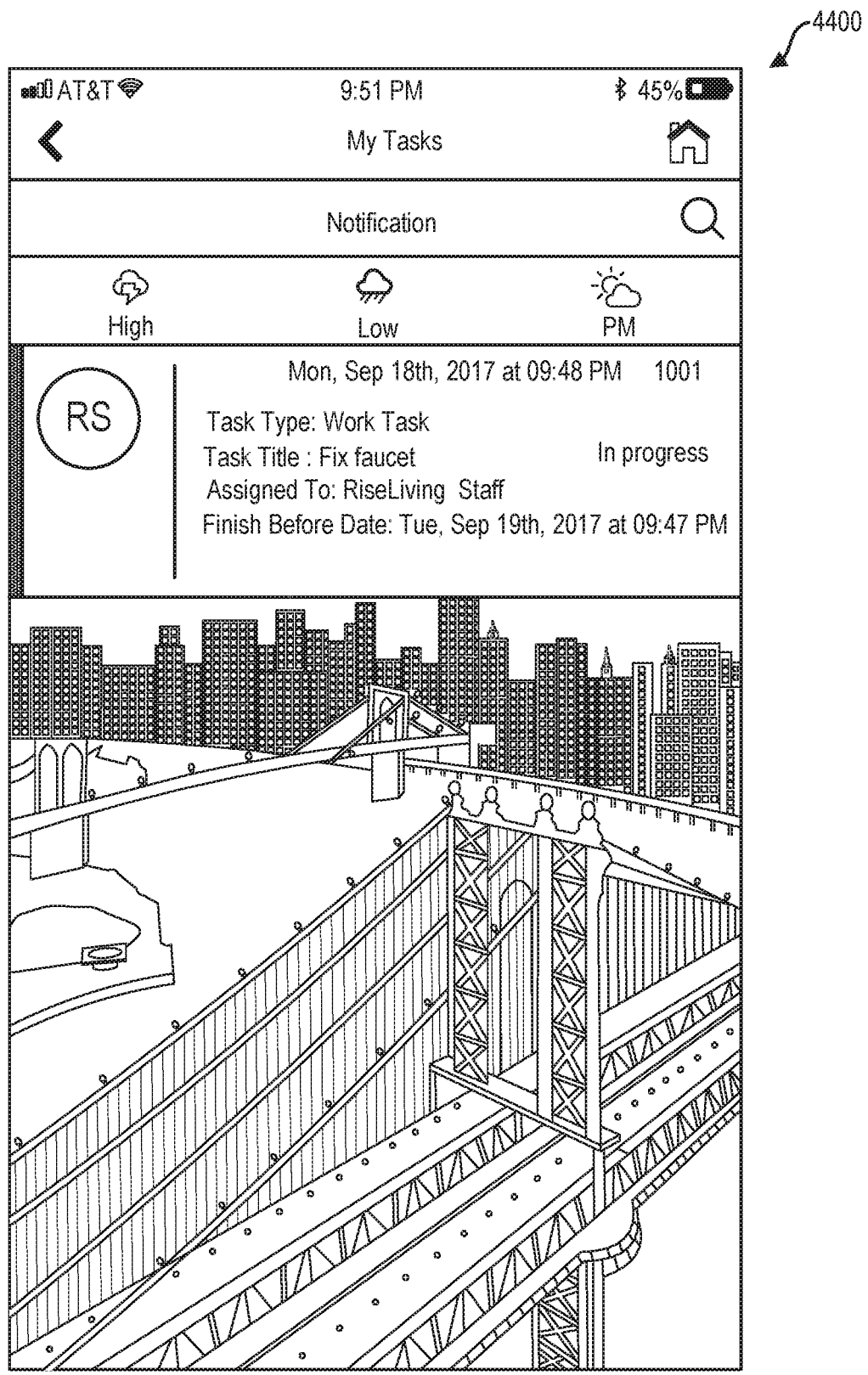
Figure 44B:
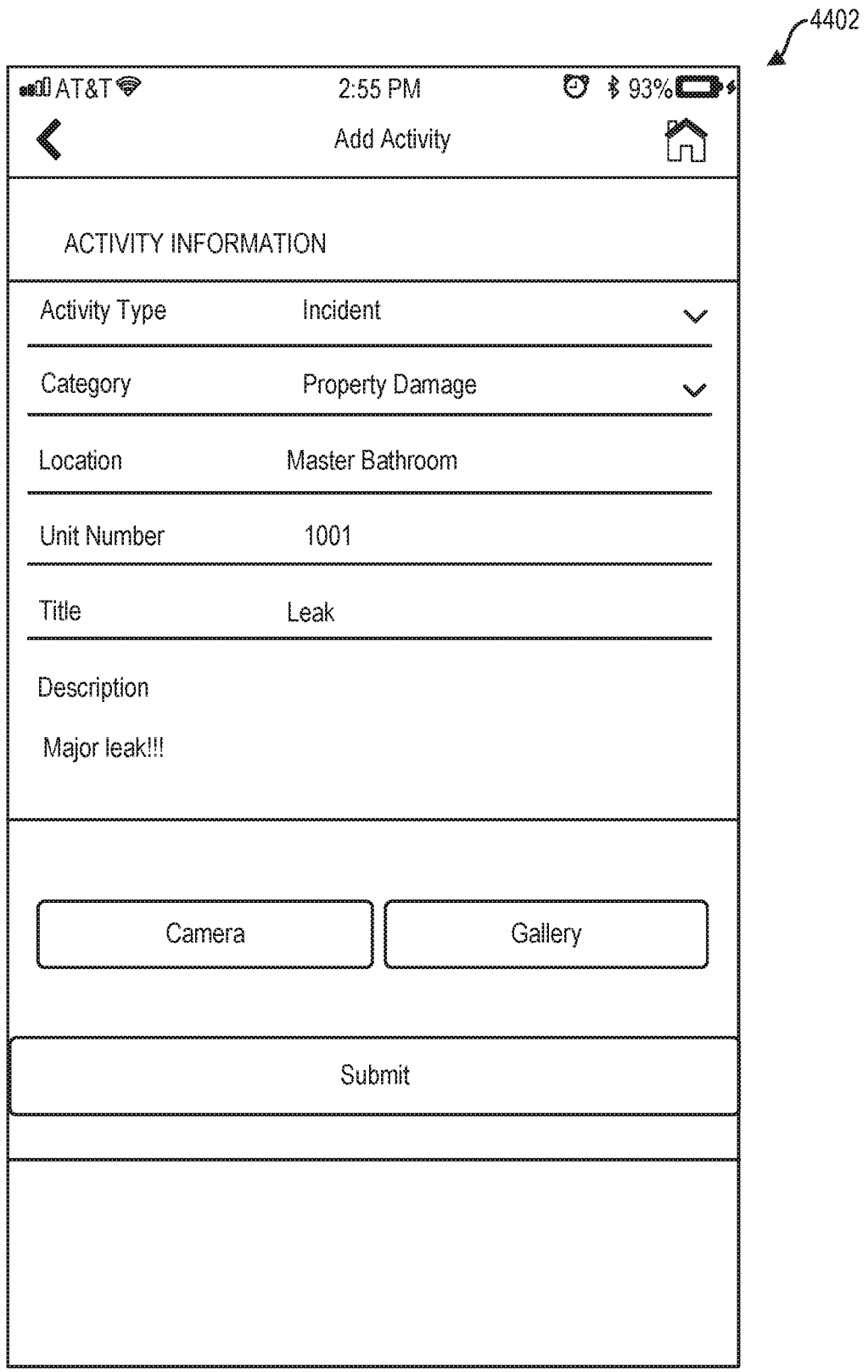
Figure 44C:
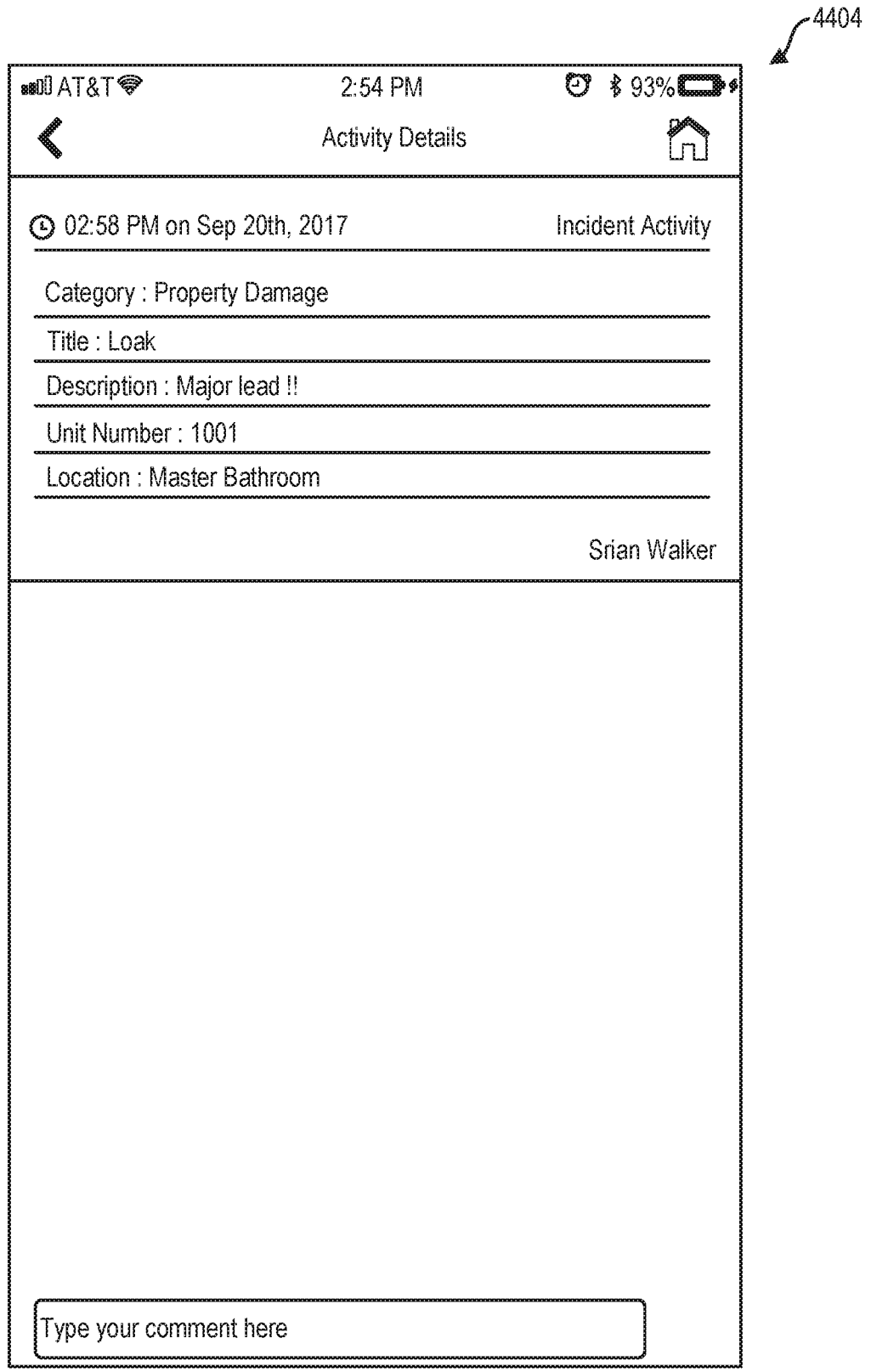

When a task is assigned, the application module 214 can be configured to send the staff device 206 of the assigned task a notification that the task is assigned to them. The staff device 206 can be configured to display a list of tasks by clicking on my tasks on the home screen. In FIG. 44A, the application module 214 can be configured to displays a task screen 4400 with specific tasks for the staff of the staff device 206. The application manager 214 can be configured to list High/Medium/PM priority tasks with their status. In FIGS. 44B-C, the application module 214 displays an activity log, including a screen 4402 for adding activities and a screen 4404 for displaying activity details. The staff device 206 can be configured to enter daily activity reports and incident reports via the application module 214. The incident report can include information including, but not limited to, a category, e.g., property damage, a title, a description, a unit number and a location, e.g., master bathroom. Managers can view the log of daily activities and incidents through the application module 214 and/or the web portal device 208. When the staff device 206 enters an incident report, the application module 214 can be configured to send a push notification instantly alerting another building user (e.g., the manager) of the incident on which they can take an action. Building users (e.g., managers) can communicate with the other staff devices 206 directly through the application module 214.

Figure 45:
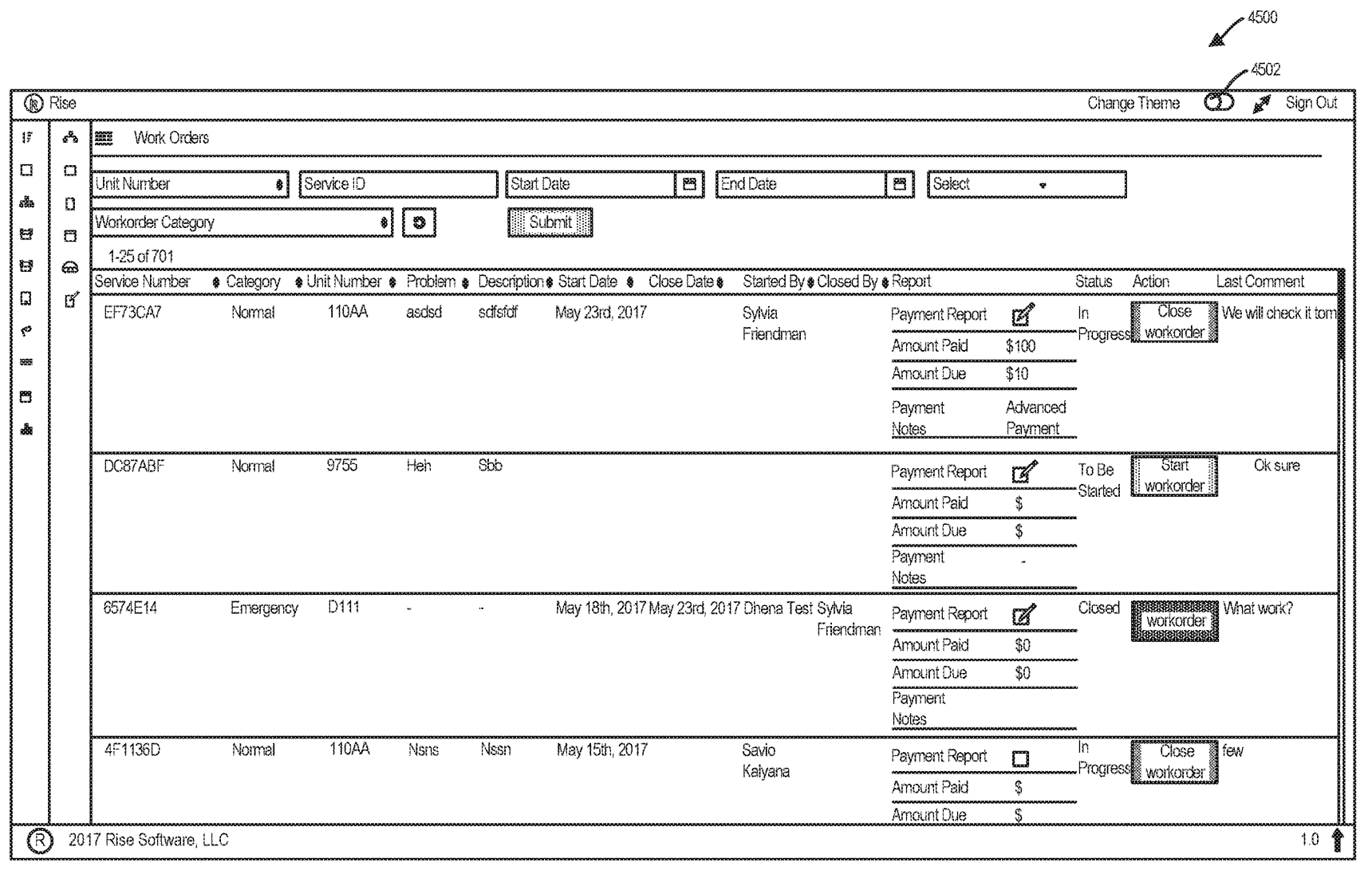
Figure 48:
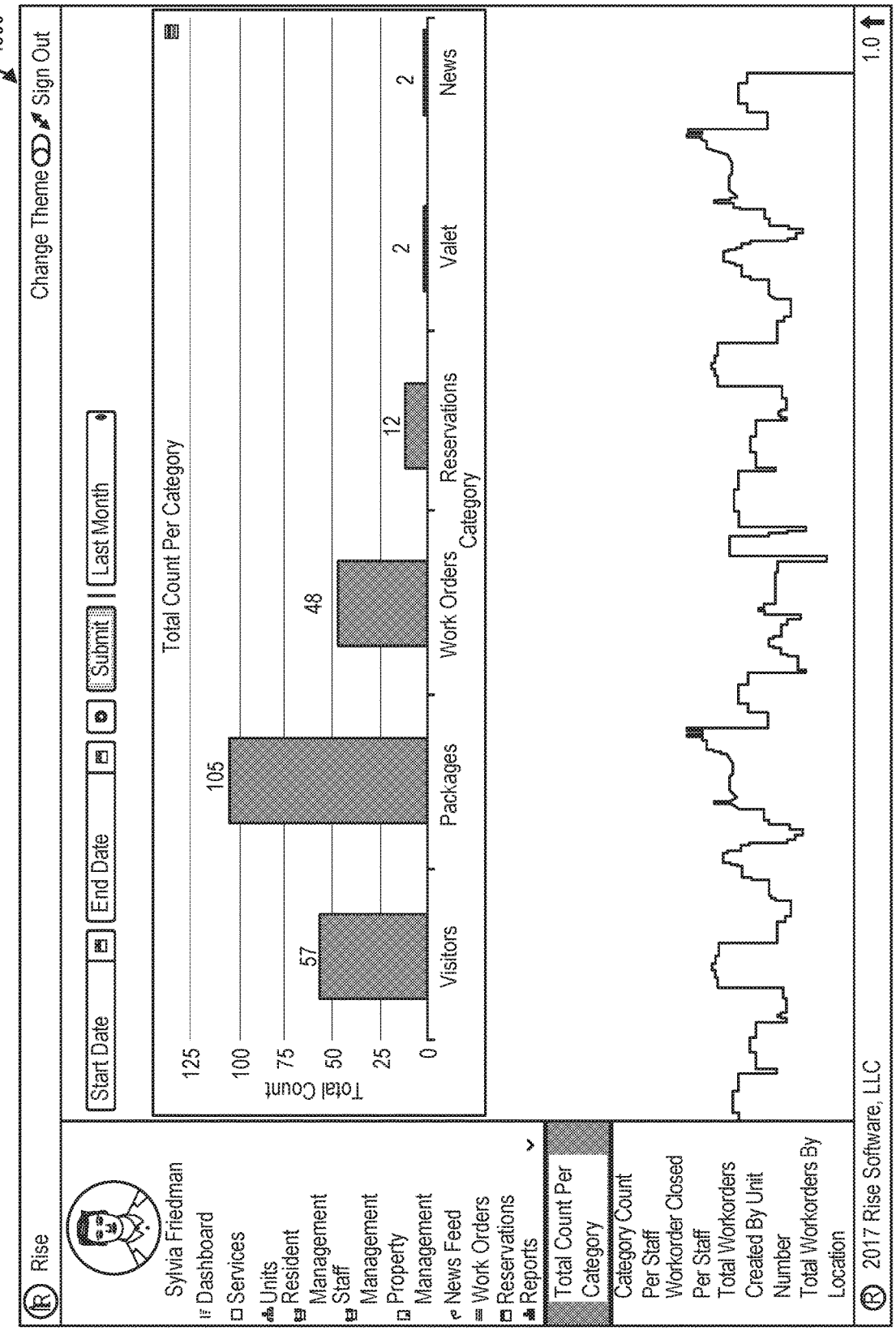
Figure 49:
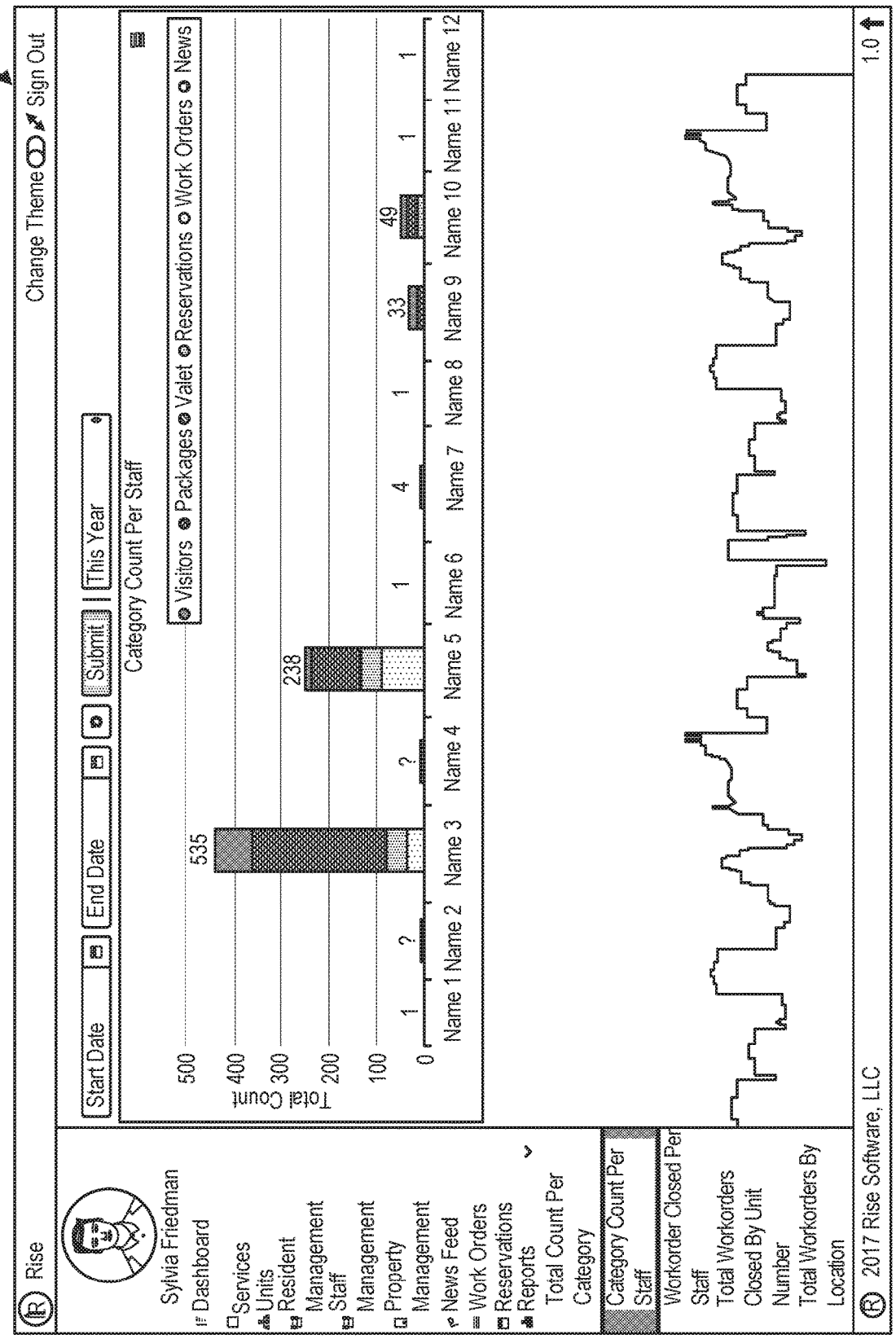
Figure 50:
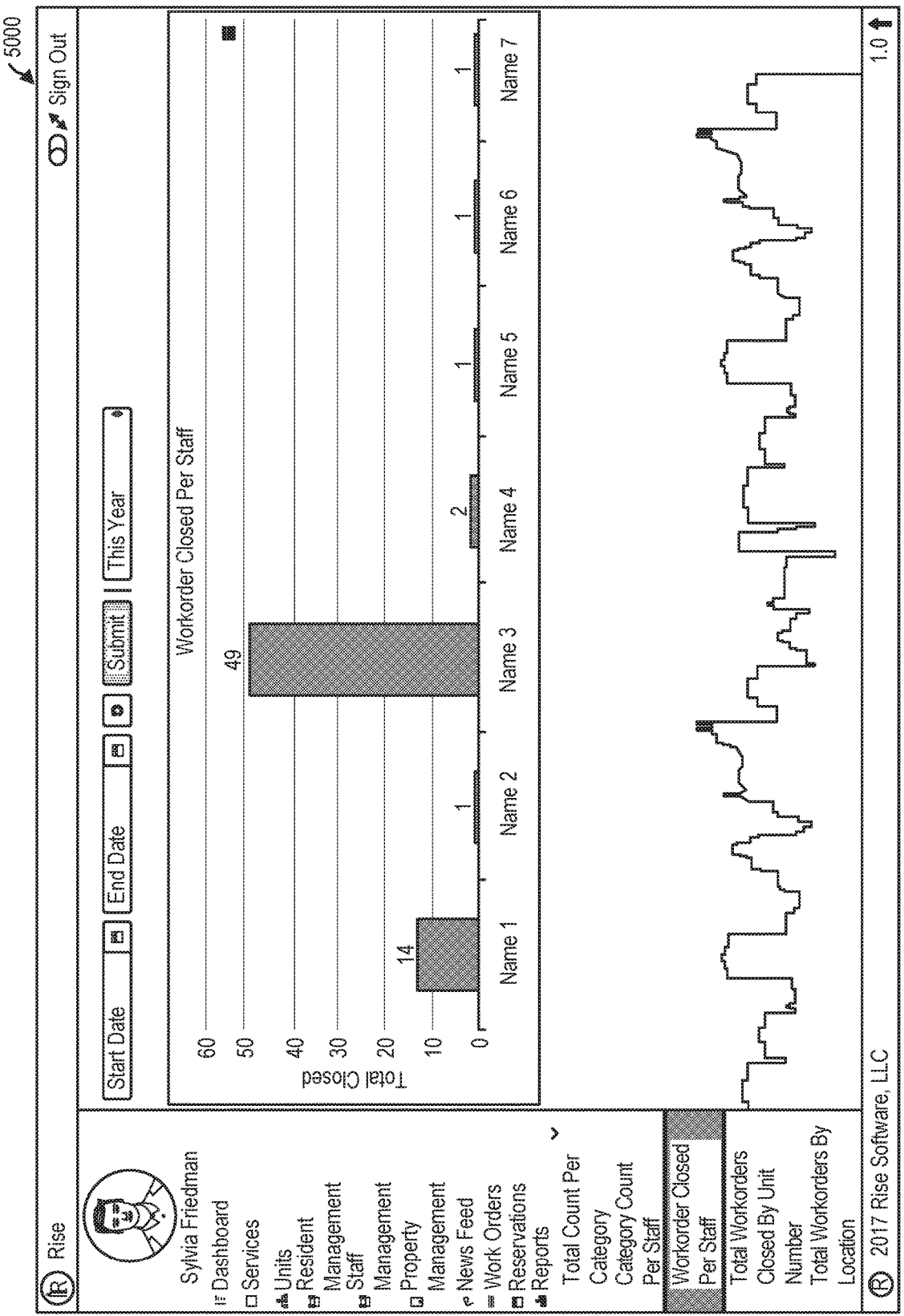

FIGS. 45-50 are exemplary screenshots of web portal screens displayed by the application module 214 on the portal device 208. In FIG. 45, the application module 214 can be configured to display work orders to a screen 4500 of the portal device 208, e.g., through a web browser via an Internet connection. In FIG. 46, the application module 214 can be configured to display reservations to a screen 4600 on the portal device 208. The portal device 208 can be configured to allow staff and/or managers to quickly review a status of work orders, reservations etc., and take action on them from the portal device 208. In FIG. 47, the application module 214 can be configured to display a dark theme for easy readability. In some examples, the application 214 can be configured to provide a switch 4702 to toggle the screen theme between black and white. In FIGS. 48-50, the application module 214 can be configured to display a reporting platform on the portal device 208. Using the reports, managers can quickly determine the overall health and efficiency of a property, e.g., a number of unpicked packages 4800, which staff or building tenant creates the most number of package requests 4900, which build member closes the most work orders 5000, etc. Other reports are possible.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    receiving, at a server, location information for a user device located at a given point of interest (POI), wherein the location information comprises beacon information which is utilized directly by a cloud server to locate the given POI to establish a geofence region;
    identifying, at the server, a given application usage state from a plurality of application usage states stored in a database based on the location information;
    retrieving, at the server, application configuration information based on the identified given application usage state; and
    causing the user device to set a usability of an application executing on the user device based on the application configuration information while the user device is located at the given POI.

2. The method of claim 1, wherein to set the usability of the application executing on the user device comprises configuring one or more application parameters of the application.

3. The method of claim 2, wherein the one or more application parameters comprises one of a functionality parameter, a feature parameter, a data parameter, and a combination thereof.

4. The method of claim 1, further comprising querying the database for the application usage information while the user device is located at the given POI.

5. The method of claim 1, further comprising:
    confirming periodically that the user device is located at the given POI; and
    causing the user device to set the application to a new application state in response to confirming that the user device is not located at the given POI.

6. The method of claim 1, further comprising validating the user device for the given POI based on one of the location information, device user information associated with the user device, and a combination thereof.

7. The method of claim 1, further comprising one of:
    communicating periodically with the user device to receive or retrieve the location information and/or user device information; and
    communicating periodically with a kiosk to receive or retrieve the location information and/or user device information.

8. The method of claim 1, further comprising monitoring for a validation confirmation message generated at a kiosk for a user of the user device, wherein the validation confirmation message provides an indication that the user has been validated for access to all or a portion of the given POI.

9. The method of claim 8, wherein identifying the given application usage state from the plurality of application states stored in the database is in response to receiving, at the server, the validation confirmation generated at the kiosk.

10. The method of claim 1, further comprising causing a relay signal to be generated at an access control system in response validating the user device for the given POI based on one of the location information, device user information associated with the user device, and a combination thereof, wherein the relay signal is used provide access to all or the portion of the given POI.

11. A system comprising:
    memory to store machine readable instructions and data, the data comprising an application usage database; and
    a processor to access the memory and execute the instructions, the instructions comprising:
    a device location component configured to monitor for location information for a user device; and
    an application control component configured to:
        evaluate the location information for the user device and virtual boundary information for a given virtual boundary associated with a given point of interest (POI) to determine whether the user device is located within the given virtual boundary, wherein the location information comprises beacon information which is utilized directly by a cloud server to locate the given POI to establish a geofence region;
        query the application usage database for application usage information for an application executing on the user device in response to determining that the user device is located within the given virtual boundary; and
        cause the user device to set a usability of the application executing on the user device based on the application usage information.

12. The system of claim 11, wherein to query the application database comprises:
    comparing user device information associated with a user and/or the user device and user identification information stored in the application usage database to identify the user of the user device, wherein the comparing is in response to determining that the user device is located within the given virtual boundary associated with the given POI; and
    retrieving the application configuration information associated with a given application usage state based on the comparison.

13. The system of claim 12, wherein the application usage database comprises a plurality of application usage states for the application executing on the device, wherein each application usage state is associated with one or more POIs, including the given POI, and is further associated with one or more virtual boundaries, including the given virtual boundary.

14. The system of claim 13, wherein each application usage state is further associated with the user identification information, the user identification information comprising one of an email associated with the user, a username and password associated with the user, a device identifier (ID) associated with the user device, a unique key assigned to the user, and a combination thereof.

15. The system of claim 14, wherein each application usage state is further associated with unique POI information and/or one or more application rules, wherein the or more application rules define an availability of one or more functions, features, and/or data of the application while the user device is located within the given virtual boundary.

16. The system of claim 14, wherein each application usage state is further associated with unique POI information and/or one or more application rules, wherein the or more application rules define a type of information that is to be provided to the application, when the information is to be provided to the application, how the information is to be provided to the application, how the information is to be displayed via the application on a display on the user device, and a combination thereof, while the user device is located within the given virtual boundary.

17. The system of claim 11, wherein to cause the user device to set the usability of the application executing on the user device comprises causing the user device to update or change one or more application parameters of the application executing on the user device.

18. The system of claim 11, wherein the device location component is configured to periodically provide the location information to the application control component, the application control component being configured to confirm that the user device is located within the virtual boundary based on the provided location information.

19. The system of claim 18, wherein to set the usability of the application executing on the user device correspond to setting the application to a first application usage state, wherein application control component is configured to set the application to a second usage state in response to determining that the user device is no longer located within the given virtual boundary, wherein the first application usage state is different than the second usage state.

20. The system of claim 11, wherein the application control component is configured to confirm periodically that the user device is located within the given virtual boundary and causing the user device to maintain the set application usability for the application in response to confirming that the user device is located within the given virtual boundary.

\* \* \* \* \*